US012700901B2

(12) United States Patent
Lo et al.

(10) Patent No.: US 12,700,901 B2
(45) Date of Patent: Aug. 4, 2026

(54) METHOD AND APPARATUS FOR SUPPORT OF MACHINE LEARNING OR ARTIFICIAL INTELLIGENCE-ASSISTED CSI FEEDBACK

(71) Applicant: Samsung Electronics Co., Ltd., Suwon-si (KR)

(72) Inventors: Caleb K. Lo, San Jose, CA (US); Gilwon Lee, McKinney, TX (US); Eko Onggosanusi, Coppell, TX (US); Md. Saifur Rahman, Plano, TX (US); Ravindranath Kanamangala, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 18/319,358

(22) Filed: May 17, 2023

(65) Prior Publication Data

US 2024/0088968 A1     Mar. 14, 2024

Related U.S. Application Data

(60) Provisional application No. 63/422,667, filed on Nov. 4, 2022, provisional application No. 63/407,461, filed
(Continued)

(51) Int. Cl.
*H04B 7/00* (2006.01)
*H04B 7/06* (2006.01)
(52) U.S. Cl.
CPC .................................. *H04B 7/0626* (2013.01)
(58) Field of Classification Search
None
See application file for complete search history.

(56) References Cited

U.S. PATENT DOCUMENTS

2019/0058517 A1 *   2/2019   Kang .................... H04B 7/0695
2021/0099211 A1     4/2021   Rahman et al.
(Continued)

FOREIGN PATENT DOCUMENTS

WO     2022000365 A1     1/2022
WO     2022077202 A1     4/2022

OTHER PUBLICATIONS

Partial European Search Report issued Jul. 24, 2025 regarding Application No. 23816401.6, 15 pages.
(Continued)

*Primary Examiner* — Abdelillah Elmejjarmi

(57) ABSTRACT

Methods and apparatuses for support of machine learning (ML) or artificial intelligence (AI) assisted channel state information (CSI) feedback. A method performed by a user equipment (UE) includes transmitting capability information indicating a capability of the UE to support a ML based parameter configuration associated with CSI reports; receiving configuration information that indicates parameters for the ML based parameter configuration associated with the CSI reports; and receiving CSI reference signals (RSs). The method further includes measuring the CSI-RSs; determining, based on the configuration information, the measured CSI-RSs, and information related to localized observations of channel statistics in one or more domains, configuration parameters in the one or more domains for the CSI reports; determining, based on the configuration parameters in the one or more domains, a CSI report; and transmitting the CSI report.

18 Claims, 30 Drawing Sheets

Related U.S. Application Data on Sep. 16, 2022, provisional application No. 63/348,765, filed on Jun. 3, 2022.

(56) References Cited

U.S. PATENT DOCUMENTS

| | | | | |
|---|---|---|---|---|
| 2021/0345134 | A1 | 11/2021 | Ottersten et al. | |
| 2021/0351885 | A1 | 11/2021 | Chavva et al. | |
| 2022/0052734 | A1* | 2/2022 | Faxer | H04B 7/0478 |
| 2022/0095308 | A1* | 3/2022 | Ashraf | H04B 7/063 |
| 2025/0016593 | A1* | 1/2025 | Narayanan | H04L 25/0254 |
| 2025/0038816 | A1* | 1/2025 | Beluri | H03M 7/70 |
| 2025/0071540 | A1* | 2/2025 | Wang | H04W 8/22 |
| 2025/0105956 | A1* | 3/2025 | Dai | H04L 5/0057 |
| 2025/0286589 | A1* | 9/2025 | Li | H04B 7/0417 |

OTHER PUBLICATIONS

Lenovo, "Further aspects of AI/ML for CSI feedback", 3GPP TSG RAN WG1 #109-e, R1-2204418, May 2022,8 pages.

International Search Report and Written Opinion issued Aug. 31, 2023 regarding International Application No. PCT/KR2023/007585, 8 pages.

"5G; NR; Physical channels and modulation (3GPP TS 38.211 version 17.4.0 Release 17)", ETSI TS 138 211 V17.4.0, Jan. 2023, 141 pages.

"3rd Generation Partnership Project; Technical Specification Group Radio Access Network; NR; Radio Resource Control (RRC) protocol specification (Release 17)", 3GPP TS 38.331 V17.4.0, Mar. 2023, 1321 pages.

"3rd Generation Partnership Project; Technical Specification Group Radio Access Network; NR; Medium Access Control (MAC) protocol specification (Release 17)", 3GPP TS 38.321 V17.4.0, Mar. 2023, 252 pages.

"3rd Generation Partnership Project; Technical Specification Group Radio Access Network; NR; Physical layer procedures for data (Release 17)," 3GPP TS 38.214 V17.2.0 , Jun. 2022, 228 pages.

Extended European Search Report issued Oct. 15, 2025 regarding Application No. 23816401.6, 13 pages.

* cited by examiner

```
┌─────────────────────────────────────────────┐
│ BS receives UE capability information        │
│ including support of ML approach for CSI     │
│ feedback                                     │
└─────────────────────────────────────────────┘
```
402

```
┌─────────────────────────────────────────────┐
│ BS sends configuration information to UE,    │
│ e.g. enabling/disabling of ML approach for   │
│ CSI feedback, ML model to be used, updated   │
│ ML model parameters, and/or whether model    │
│ parameters received from UE will be used     │
│ or not                                       │
└─────────────────────────────────────────────┘
```
404

```
┌─────────────────────────────────────────────┐
│ BS sends conventional CSI feedback           │
│ configuration to UE                          │
└─────────────────────────────────────────────┘
```
406

```
┌─────────────────────────────────────────────┐
│ BS receives conventional CSI reports from UE │
└─────────────────────────────────────────────┘
```
408

```
┌─────────────────────────────────────────────┐
│ BS receives ML-based CSI feedback switching  │
│ indication from UE                           │
└─────────────────────────────────────────────┘
```
410

```
┌─────────────────────────────────────────────┐
│ BS sends an ACK/NACK to UE                   │
└─────────────────────────────────────────────┘
```
411

```
┌─────────────────────────────────────────────┐
│ BS receives ML-based CSI reports from UE     │
└─────────────────────────────────────────────┘
```
412

FIG. 4

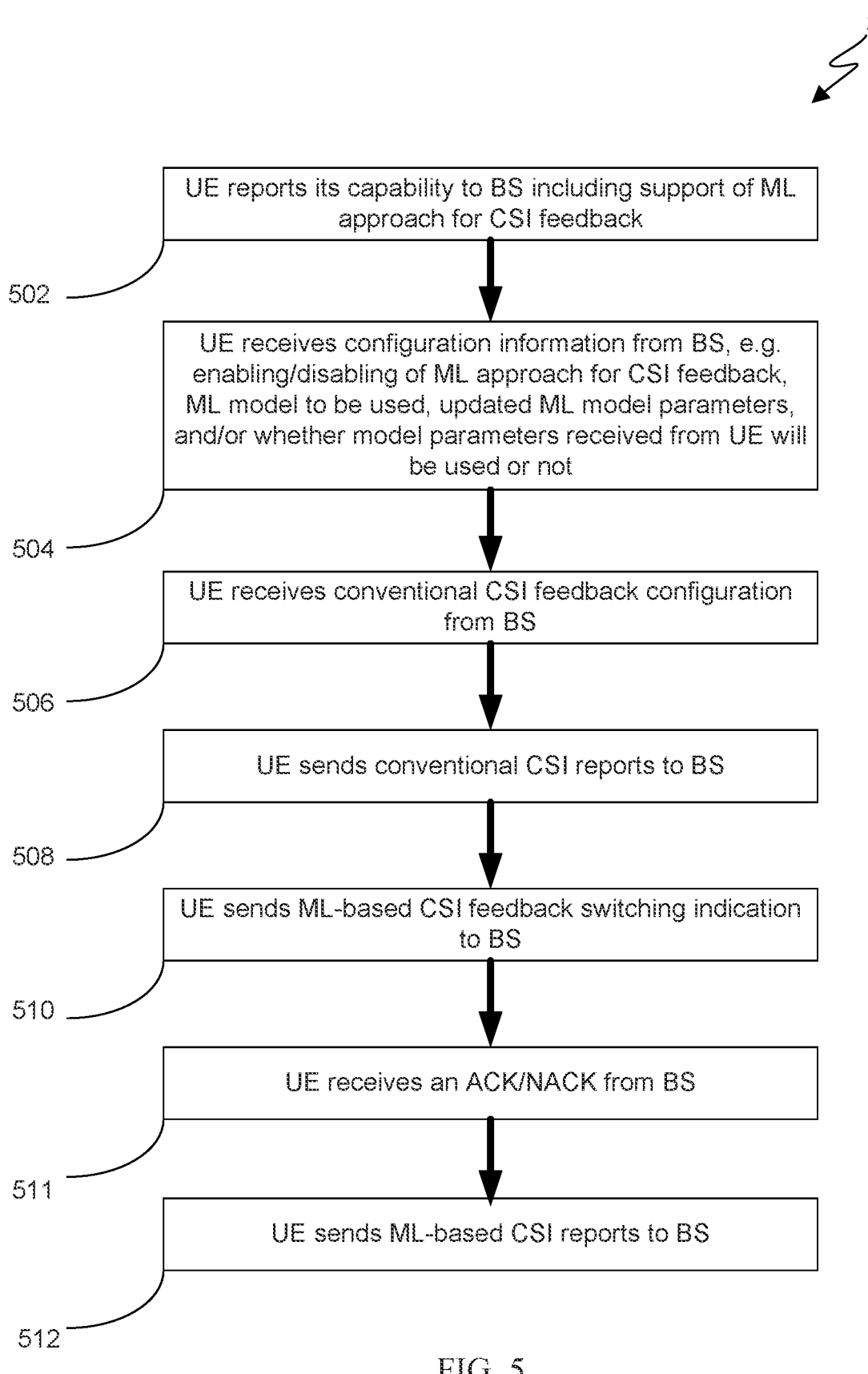

*500*

UE reports its capability to BS including support of ML approach for CSI feedback

502

UE receives configuration information from BS, e.g. enabling/disabling of ML approach for CSI feedback, ML model to be used, updated ML model parameters, and/or whether model parameters received from UE will be used or not

504

UE receives conventional CSI feedback configuration from BS

506

UE sends conventional CSI reports to BS

508

UE sends ML-based CSI feedback switching indication to BS

510

UE receives an ACK/NACK from BS

511

UE sends ML-based CSI reports to BS

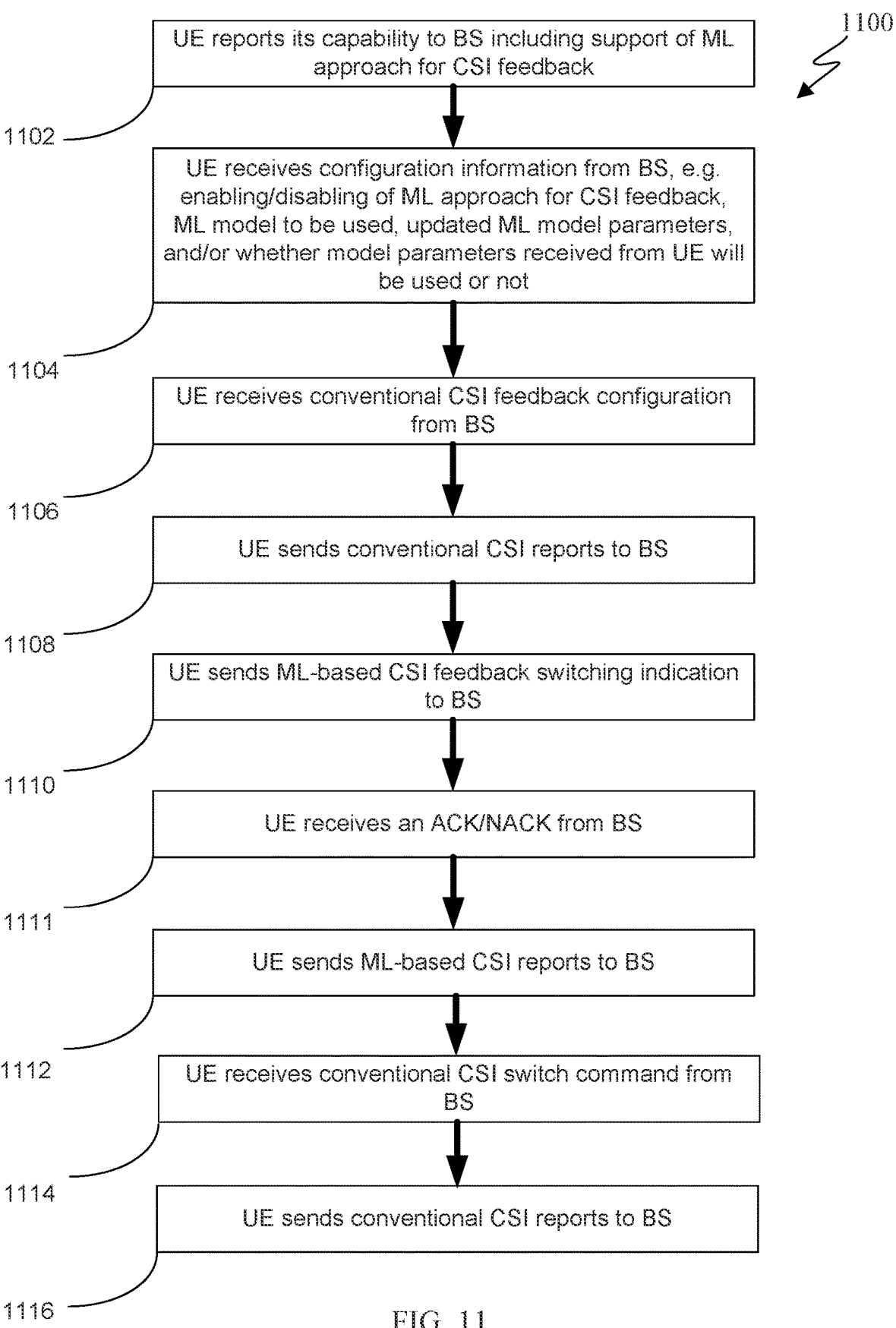

1100

1102 — UE reports its capability to BS including support of ML approach for CSI feedback 1104 — UE receives configuration information from BS, e.g. enabling/disabling of ML approach for CSI feedback, ML model to be used, updated ML model parameters, and/or whether model parameters received from UE will be used or not 1106 — UE receives conventional CSI feedback configuration from BS 1108 — UE sends conventional CSI reports to BS 1110 — UE sends ML-based CSI feedback switching indication to BS 1111 — UE receives an ACK/NACK from BS 1112 — UE sends ML-based CSI reports to BS 1114 — UE receives conventional CSI switch command from BS 1116 — UE sends conventional CSI reports to BS

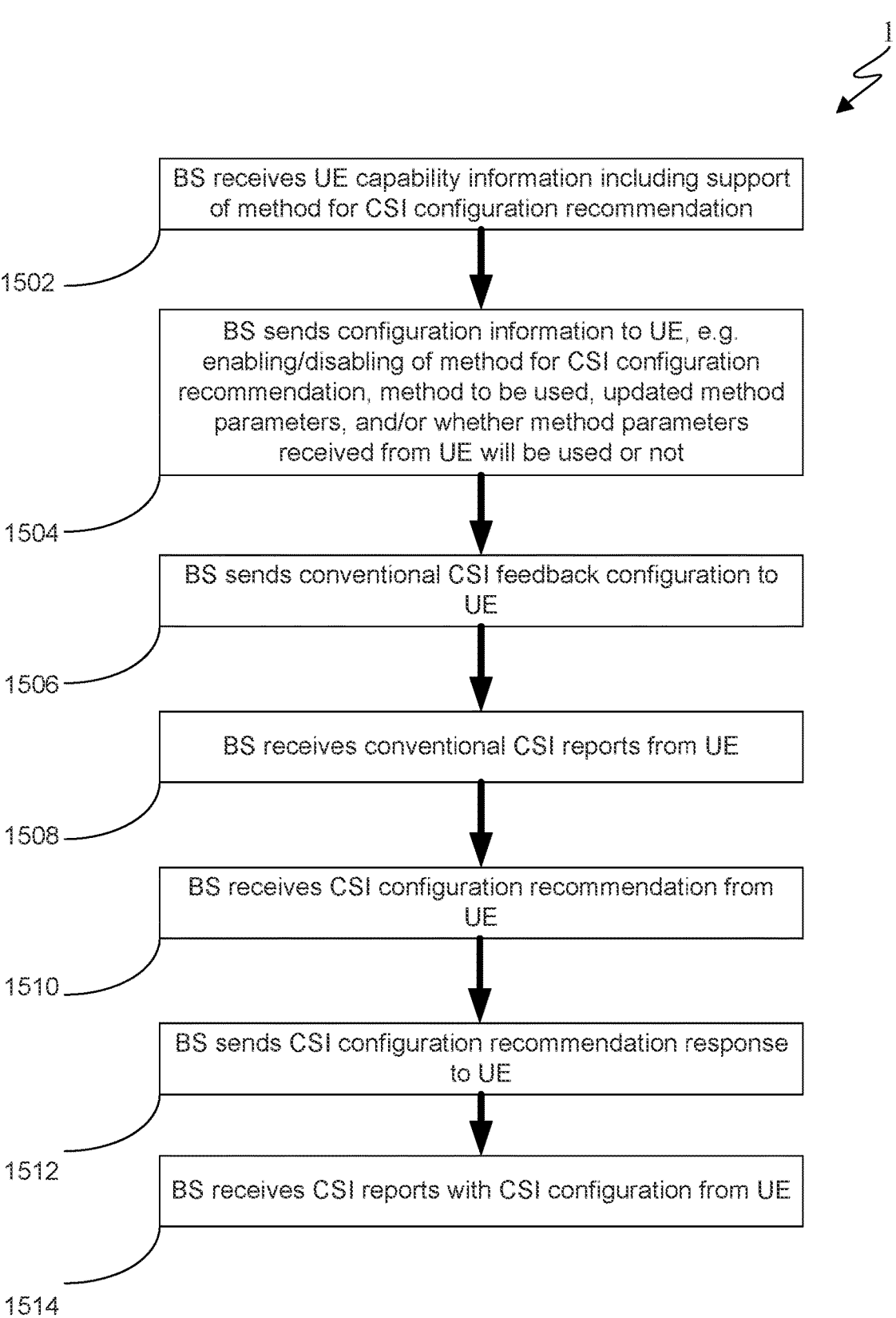

BS receives UE capability information including support of method for CSI configuration recommendation

1502

BS sends configuration information to UE, e.g. enabling/disabling of method for CSI configuration recommendation, method to be used, updated method parameters, and/or whether method parameters received from UE will be used or not

1504

BS sends conventional CSI feedback configuration to UE

1506

BS receives conventional CSI reports from UE

1508

BS receives CSI configuration recommendation from UE

1510

BS sends CSI configuration recommendation response to UE

1512

BS receives CSI reports with CSI configuration from UE

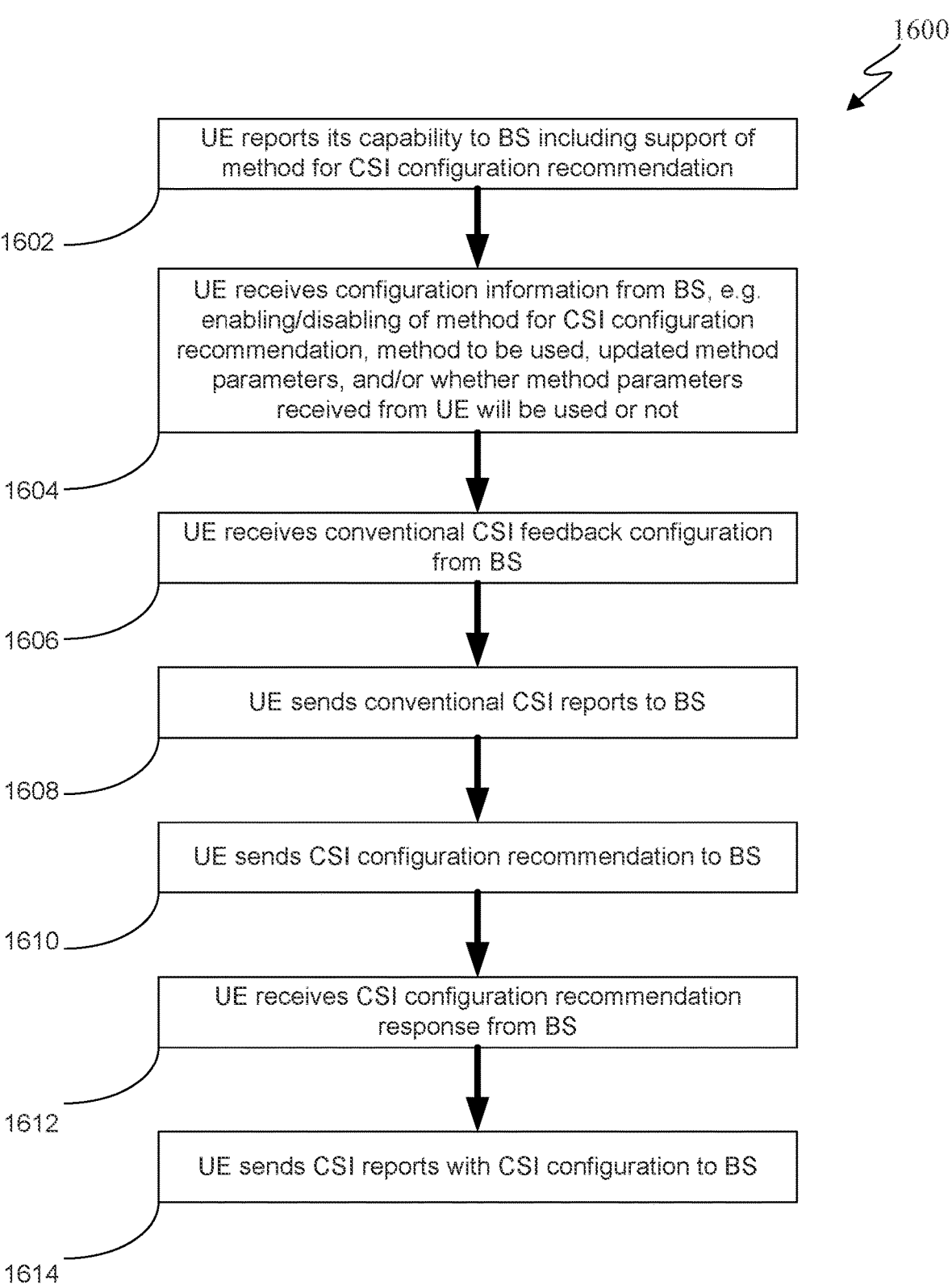

1602 — UE reports its capability to BS including support of method for CSI configuration recommendation 1604 — UE receives configuration information from BS, e.g. enabling/disabling of method for CSI configuration recommendation, method to be used, updated method parameters, and/or whether method parameters received from UE will be used or not 1606 — UE receives conventional CSI feedback configuration from BS 1608 — UE sends conventional CSI reports to BS 1610 — UE sends CSI configuration recommendation to BS 1612 — UE receives CSI configuration recommendation response from BS 1614 — UE sends CSI reports with CSI configuration to BS

FIG. 16

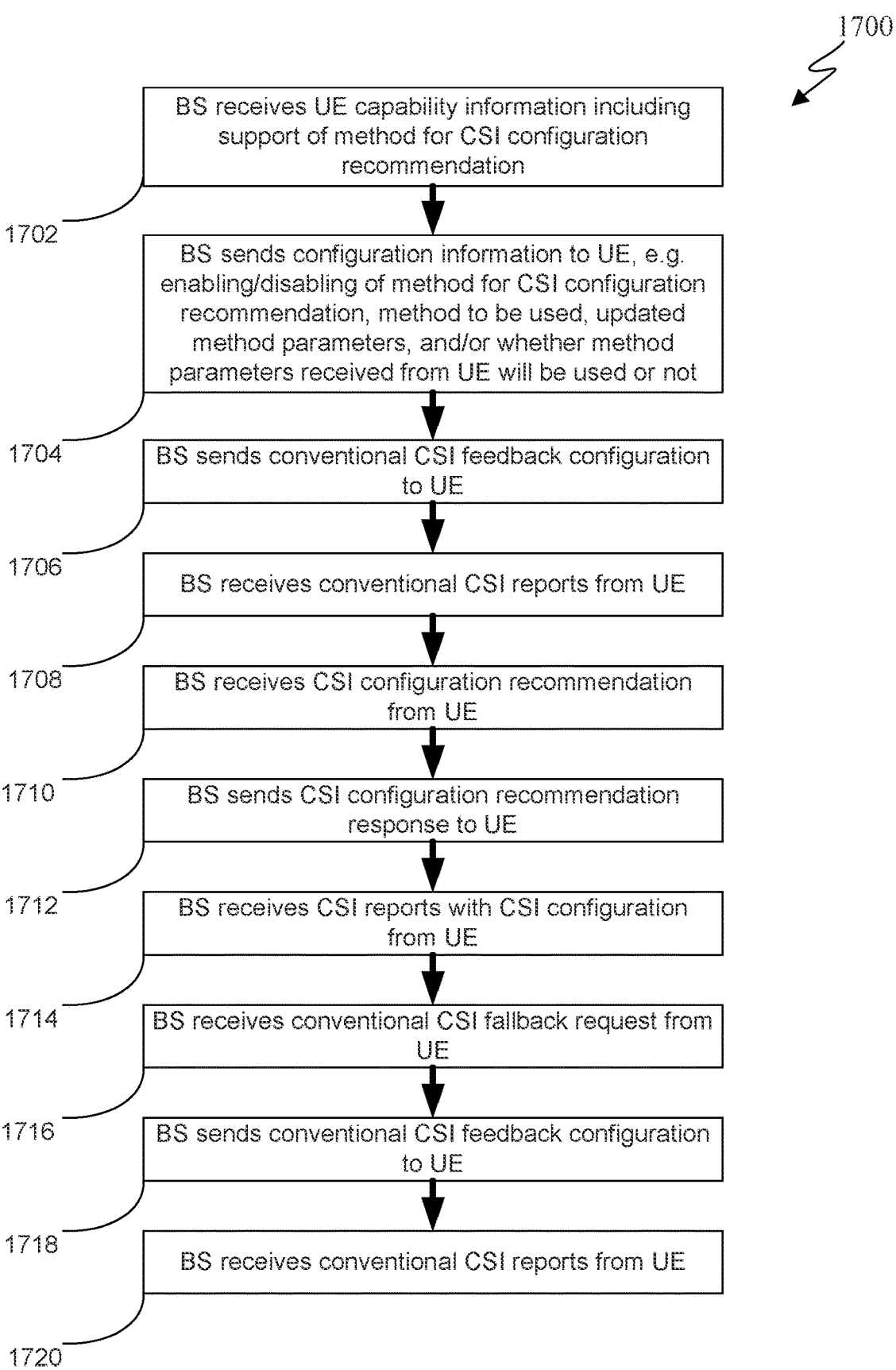

1700

1702   BS receives UE capability information including support of method for CSI configuration recommendation 1704   BS sends configuration information to UE, e.g. enabling/disabling of method for CSI configuration recommendation, method to be used, updated method parameters, and/or whether method parameters received from UE will be used or not 1706   BS sends conventional CSI feedback configuration to UE 1708   BS receives conventional CSI reports from UE 1710   BS receives CSI configuration recommendation from UE 1712   BS sends CSI configuration recommendation response to UE 1714   BS receives CSI reports with CSI configuration from UE 1716   BS receives conventional CSI fallback request from UE 1718   BS sends conventional CSI feedback configuration to UE 1720   BS receives conventional CSI reports from UE

FIG. 17

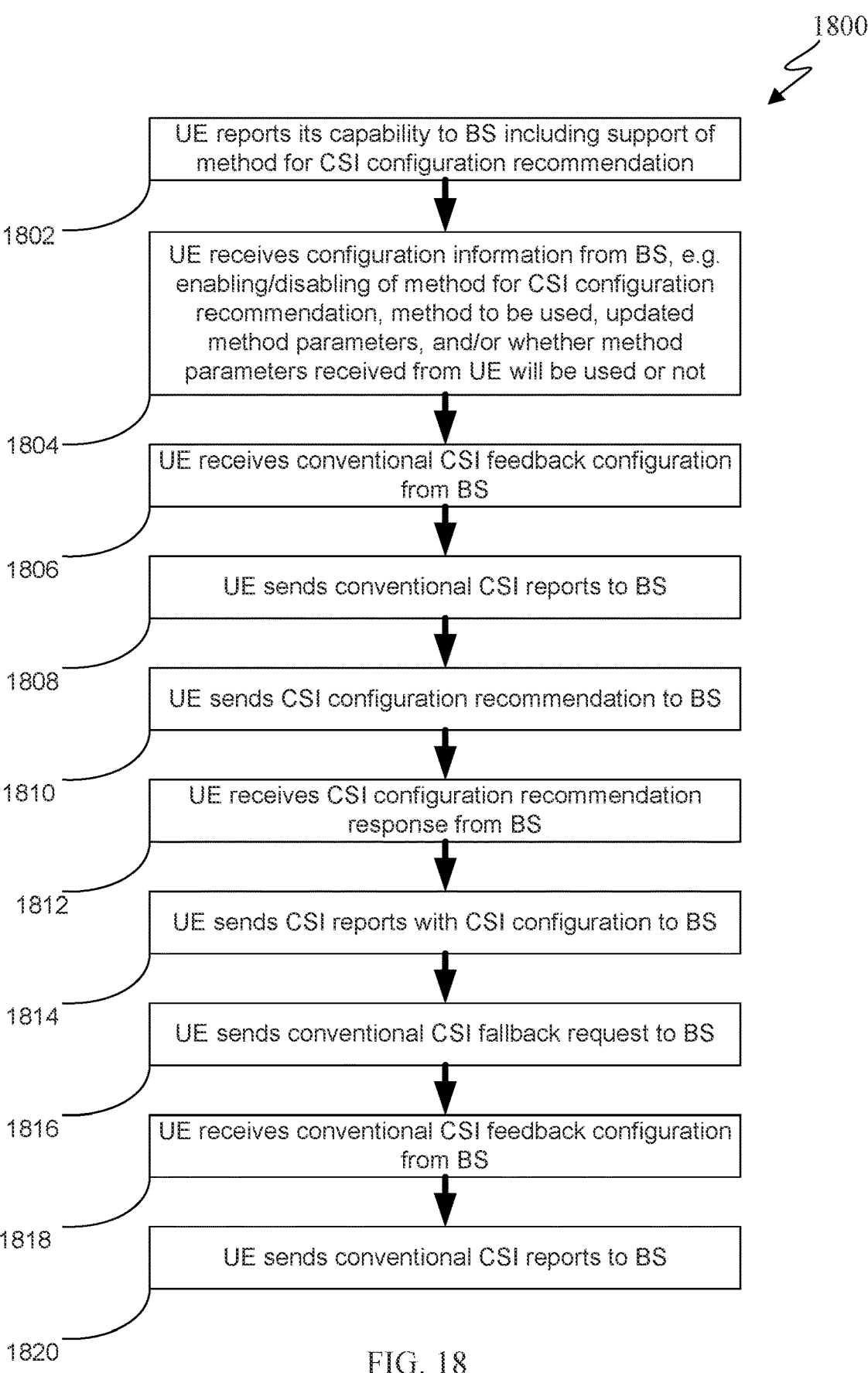

1800

1802 — UE reports its capability to BS including support of method for CSI configuration recommendation 1804 — UE receives configuration information from BS, e.g. enabling/disabling of method for CSI configuration recommendation, method to be used, updated method parameters, and/or whether method parameters received from UE will be used or not 1806 — UE receives conventional CSI feedback configuration from BS 1808 — UE sends conventional CSI reports to BS 1810 — UE sends CSI configuration recommendation to BS 1812 — UE receives CSI configuration recommendation response from BS 1814 — UE sends CSI reports with CSI configuration to BS 1816 — UE sends conventional CSI fallback request to BS 1818 — UE receives conventional CSI feedback configuration from BS 1820 — UE sends conventional CSI reports to BS

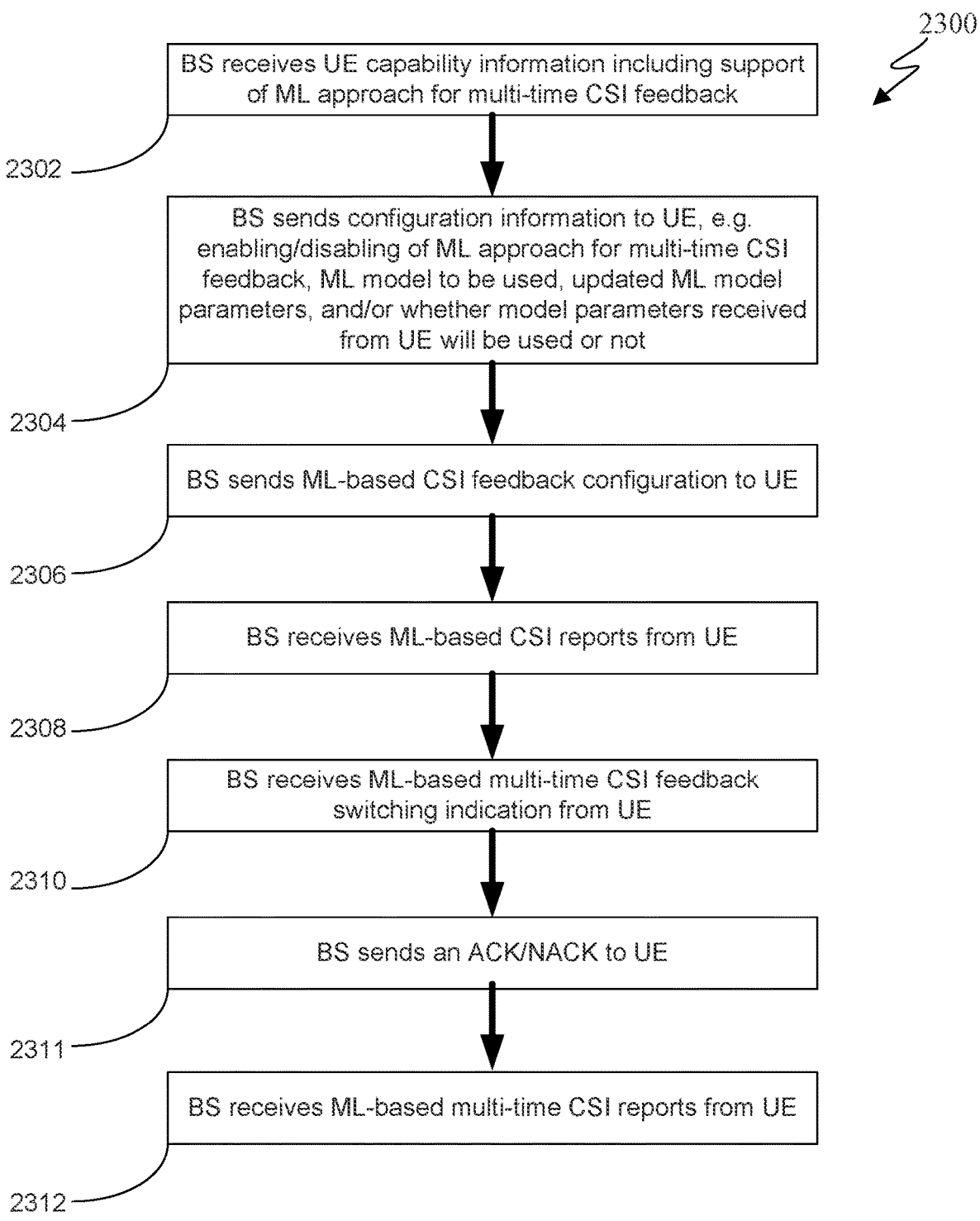

2300

BS receives UE capability information including support of ML approach for multi-time CSI feedback

2302

BS sends configuration information to UE, e.g. enabling/disabling of ML approach for multi-time CSI feedback, ML model to be used, updated ML model parameters, and/or whether model parameters received from UE will be used or not

2304

BS sends ML-based CSI feedback configuration to UE

2306

BS receives ML-based CSI reports from UE

2308

BS receives ML-based multi-time CSI feedback switching indication from UE

2310

BS sends an ACK/NACK to UE

2311

BS receives ML-based multi-time CSI reports from UE

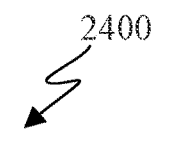

2400

UE reports its capability to BS including support of ML approach for multi-time CSI feedback

2402

UE receives configuration information from BS, e.g. enabling/disabling of ML approach for multi-time CSI feedback, ML model to be used, updated ML model parameters, and/or whether model parameters received from UE will be used or not

2404

UE receives ML-based CSI feedback configuration from BS

2406

UE sends ML-based CSI reports to BS

2408

UE sends ML-based multi-time CSI feedback switching indication to BS

2410

UE sends ML-based multi-time CSI reports to BS

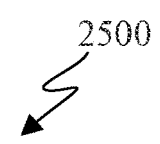

2500

---

BS receives UE capability information including support of ML approach for multi-time CSI feedback

2502

↓

BS sends configuration information to UE, e.g. enabling/disabling of ML approach for multi-time CSI feedback, ML model to be used, updated ML model parameters, and/or whether model parameters received from UE will be used or not

2504

↓

BS sends ML-based CSI feedback configuration to UE

2506

↓

BS receives ML-based CSI reports from UE

2508

↓

BS receives assistance information from UE

2510

↓

BS sends ML-based multi-time CSI feedback configuration to UE

2512

↓

BS receives ML-based multi-time CSI reports from UE

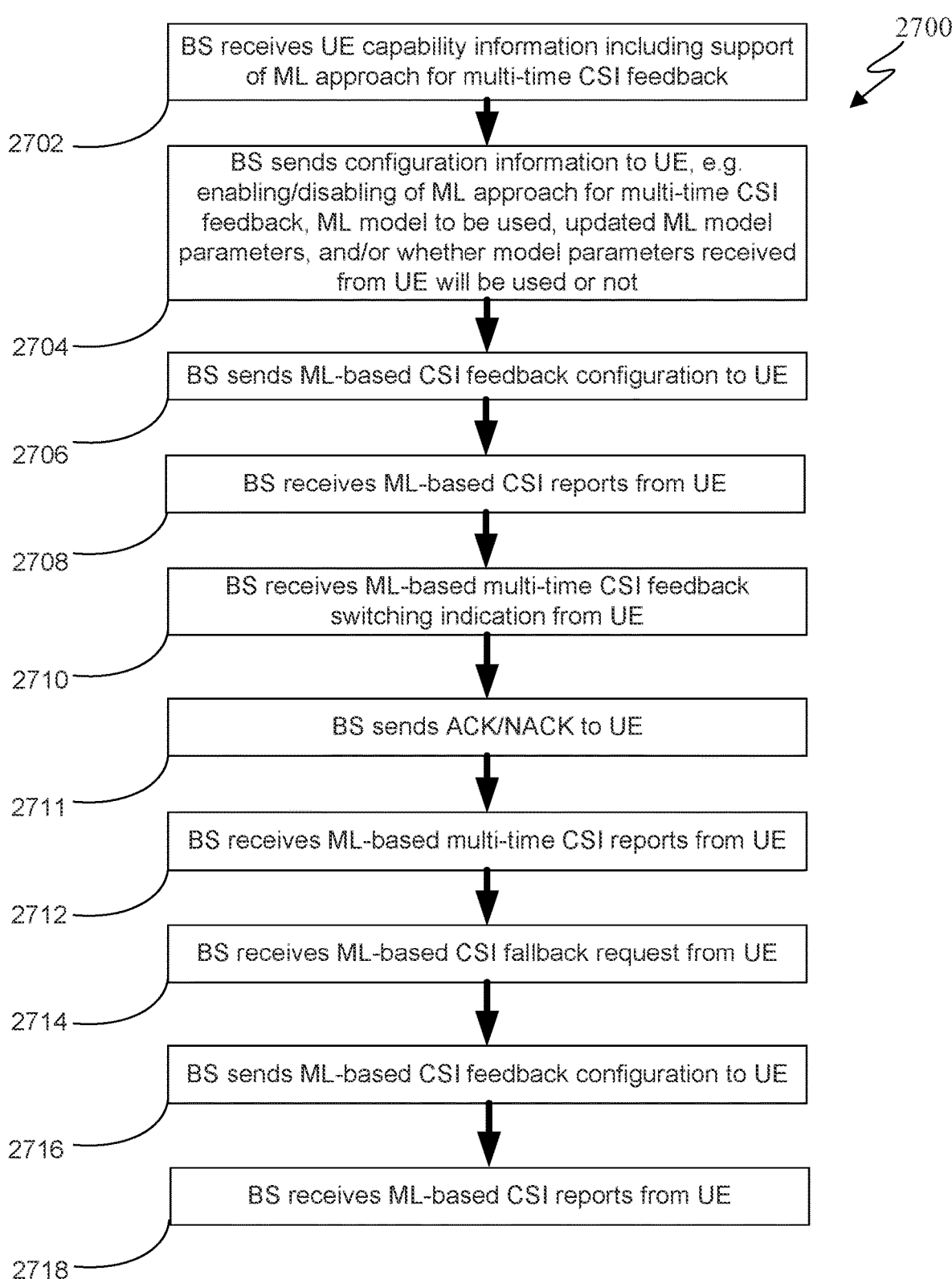

2700

2702 — BS receives UE capability information including support of ML approach for multi-time CSI feedback 2704 — BS sends configuration information to UE, e.g. enabling/disabling of ML approach for multi-time CSI feedback, ML model to be used, updated ML model parameters, and/or whether model parameters received from UE will be used or not 2706 — BS sends ML-based CSI feedback configuration to UE 2708 — BS receives ML-based CSI reports from UE 2710 — BS receives ML-based multi-time CSI feedback switching indication from UE 2711 — BS sends ACK/NACK to UE 2712 — BS receives ML-based multi-time CSI reports from UE 2714 — BS receives ML-based CSI fallback request from UE 2716 — BS sends ML-based CSI feedback configuration to UE 2718 — BS receives ML-based CSI reports from UE

FIG. 27

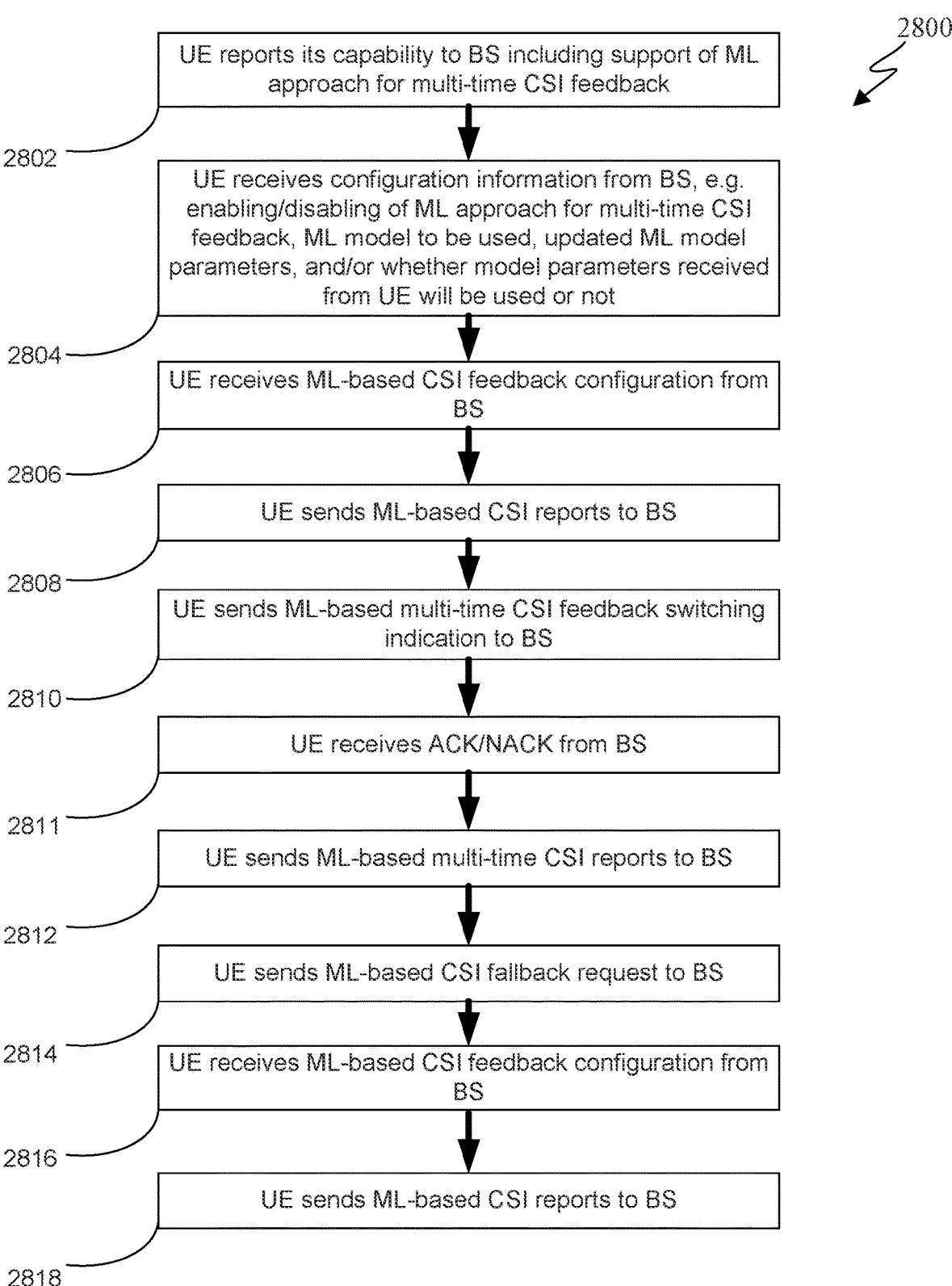

2800

UE reports its capability to BS including support of ML approach for multi-time CSI feedback

2802

UE receives configuration information from BS, e.g. enabling/disabling of ML approach for multi-time CSI feedback, ML model to be used, updated ML model parameters, and/or whether model parameters received from UE will be used or not

2804

UE receives ML-based CSI feedback configuration from BS

2806

UE sends ML-based CSI reports to BS

2808

UE sends ML-based multi-time CSI feedback switching indication to BS

2810

UE receives ACK/NACK from BS

2811

UE sends ML-based multi-time CSI reports to BS

2812

UE sends ML-based CSI fallback request to BS

2814

UE receives ML-based CSI feedback configuration from BS

2816

UE sends ML-based CSI reports to BS

METHOD AND APPARATUS FOR SUPPORT OF MACHINE LEARNING OR ARTIFICIAL INTELLIGENCE-ASSISTED CSI FEEDBACK

CROSS-REFERENCE TO RELATED APPLICATION AND CLAIM OF PRIORITY

This application claims priority under 35 U.S.C. § 119(e) to U.S. Provisional Patent Application No. 63/348,765, filed on Jun. 3, 2022, U.S. Provisional Patent Application No. 63/407,461 filed on Sep. 16, 2022, and U.S. Provisional Patent Application No. 63/422,667 filed on Nov. 4, 2022. The above-identified provisional patent applications are hereby incorporated by reference in their entirety.

TECHNICAL FIELD

The present disclosure relates generally to wireless communication systems and, more specifically, to a method and apparatus for support of machine learning (ML) or artificial intelligence (AI)-assisted channel state information (CSI) feedback.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to support of ML or AI-assisted CSI feedback.

In one embodiment, a user equipment (UE) is provided. The UE includes a transceiver configured to transmit capability information indicating a capability of the UE to support a ML based parameter configuration associated with CSI reports, receive configuration information that indicates parameters for the ML based parameter configuration associated with the CSI reports, and receive CSI reference signals (RSs). The UE further includes a processor operably coupled to the transceiver. The processor is configured to measure the CSI-RSs; determine, based on the configuration information, the measured CSI-RSs, and information related to localized observations of channel statistics in one or more domains, configuration parameters in the one or more domains for the CSI reports; and determine, based on the configuration parameters in the one or more domains, a CSI report. The transceiver is configured to transmit the CSI report.

In another embodiment, a base station (BS) is provided. The BS includes a transceiver configured to receive capability information indicating a capability of a UE to support a ML based parameter configuration associated with CSI reports, transmit configuration information that indicates parameters for the ML based parameter configuration associated with the CSI reports, transmit CSI-RSs, and receive the CSI report associated with configuration parameters in one or more domains. The configuration parameters in the one or more domains are associated with the configuration information, the CSI-RSs, and information related to localized observations of channel statistics in the one or more domains.

In yet another embodiment, a method performed by a UE is provided. The method includes transmitting capability information indicating a capability of the UE to support a ML based parameter configuration associated with CSI reports; receiving configuration information that indicates parameters for the ML based parameter configuration associated with the CSI reports; and receiving CSI-RSs. The method further includes measuring the CSI-RSs; determining, based on the configuration information, the measured CSI-RSs, and information related to localized observations of channel statistics in one or more domains, configuration parameters in the one or more domains for the CSI reports; determining, based on the configuration parameters in the one or more domains, a CSI report; and transmitting the CSI report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates an example method for operations at a BS to support a UE-initiated switch to an AI/ML-based CSI feedback/report method according to embodiments of the present disclosure;

FIG. 5 illustrates an example method for operations at a UE to support a UE-initiated switch to an AI/ML-based CSI feedback/report method according to embodiments of the present disclosure;

FIG. 11 illustrates an example method for operations at a UE to support a BS-initiated fallback to conventional CSI feedback/report method according to embodiments of the present disclosure;

FIG. 15 illustrates an example method for operations at a BS to support a UE-assisted CSI configuration recommendation according to embodiments of the present disclosure;

FIG. 16 illustrates an example method for operations at a UE to support a UE-assisted CSI configuration recommendation according to embodiments of the present disclosure;

FIG. 17 illustrates an example method for operations at a BS to support a UE-initiated fallback to a conventional CSI feedback/report method according to embodiments of the present disclosure;

FIG. 18 illustrates an example method for operations at a UE to support a UE-initiated fallback to a conventional CSI feedback/report method according to embodiments of the present disclosure;

FIG. 23 illustrates an example method for operations at a BS to support a UE-initiated switch to an AI/ML-based multi-time CSI feedback/report method according to embodiments of the present disclosure;

FIG. 24 illustrates an example method for operations at a UE to support a UE-initiated switch to an AI/ML-based multi-time CSI feedback/report method according to embodiments of the present disclosure;

FIG. 25 illustrates an example method for operations at a BS to support a BS-initiated or BS-controlled switch to an AI/ML-based multi-time CSI feedback/report method according to embodiments of the present disclosure;

FIG. 27 illustrates an example method for operations at a BS to support a UE-initiated fallback from an AI/ML-based multi-time CSI feedback/report method to an AI/ML-based CSI feedback/report method according to embodiments of the present disclosure;

FIG. 28 illustrates an example method for operations at a UE to support a UE-initiated fallback from an AI/ML-based multi-time CSI feedback/report method to an AI/ML-based CSI feedback/report method according to embodiments of the present disclosure;

DETAILED DESCRIPTION

Figure 1:
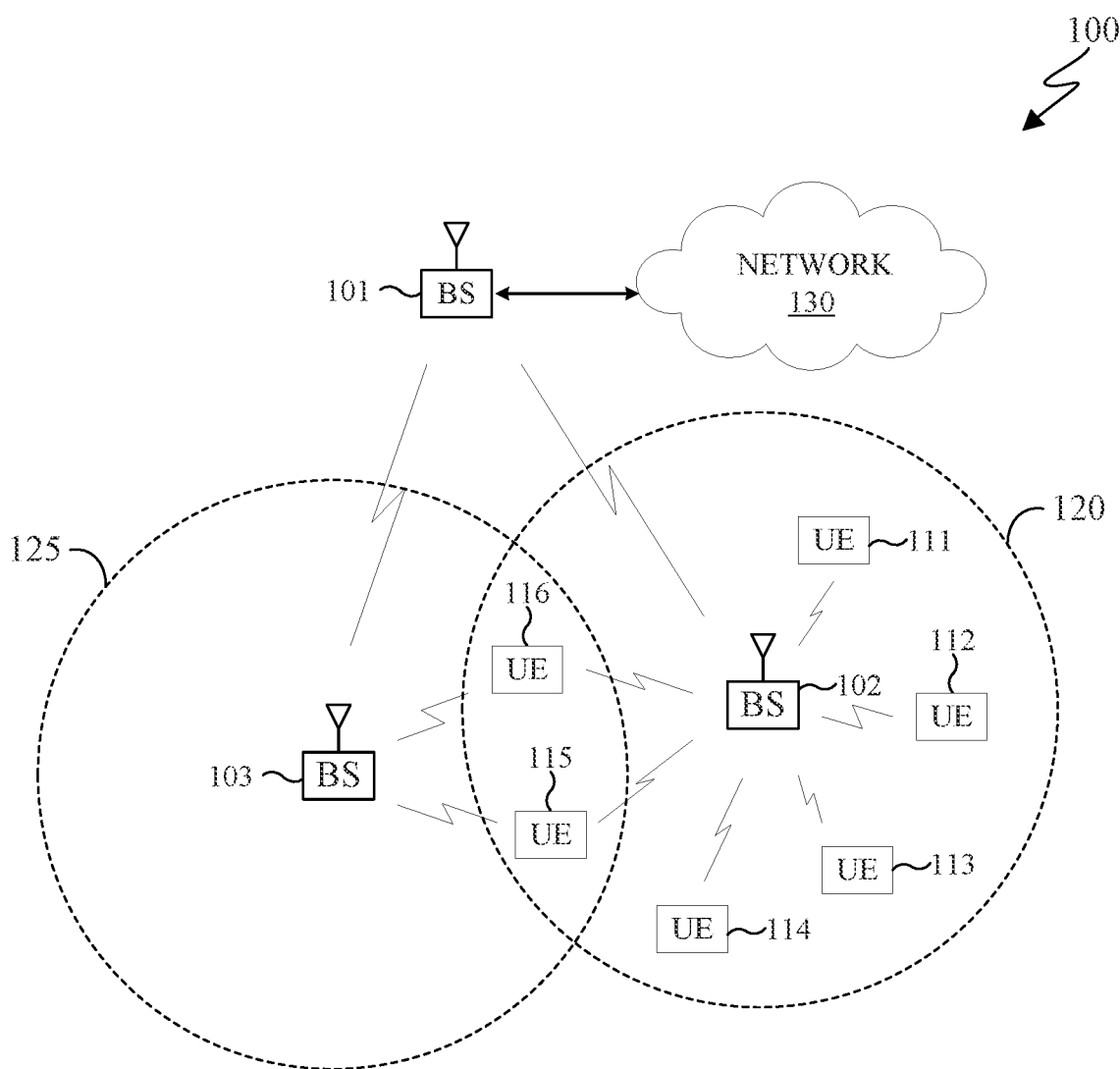
FIG. 1 illustrates an example wireless network according to embodiments of the present disclosure.

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: [1] 3GPP, TS 38.211 v17.4.0, 5G; NR; "Physical channels and modulation"; [2] 3GPP, TS 38.331 v17.4.0, 5G; NR; Radio Resource Control (RRC); Protocol specification; [3] 3GPP, TS 38.321 v17.4.0, 5G; NR; Medium Access Control (MAC); Protocol specification; [4] 3GPP, TS 38.214 v17.2.0, 5G; NR; Physical layer procedures for data.

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
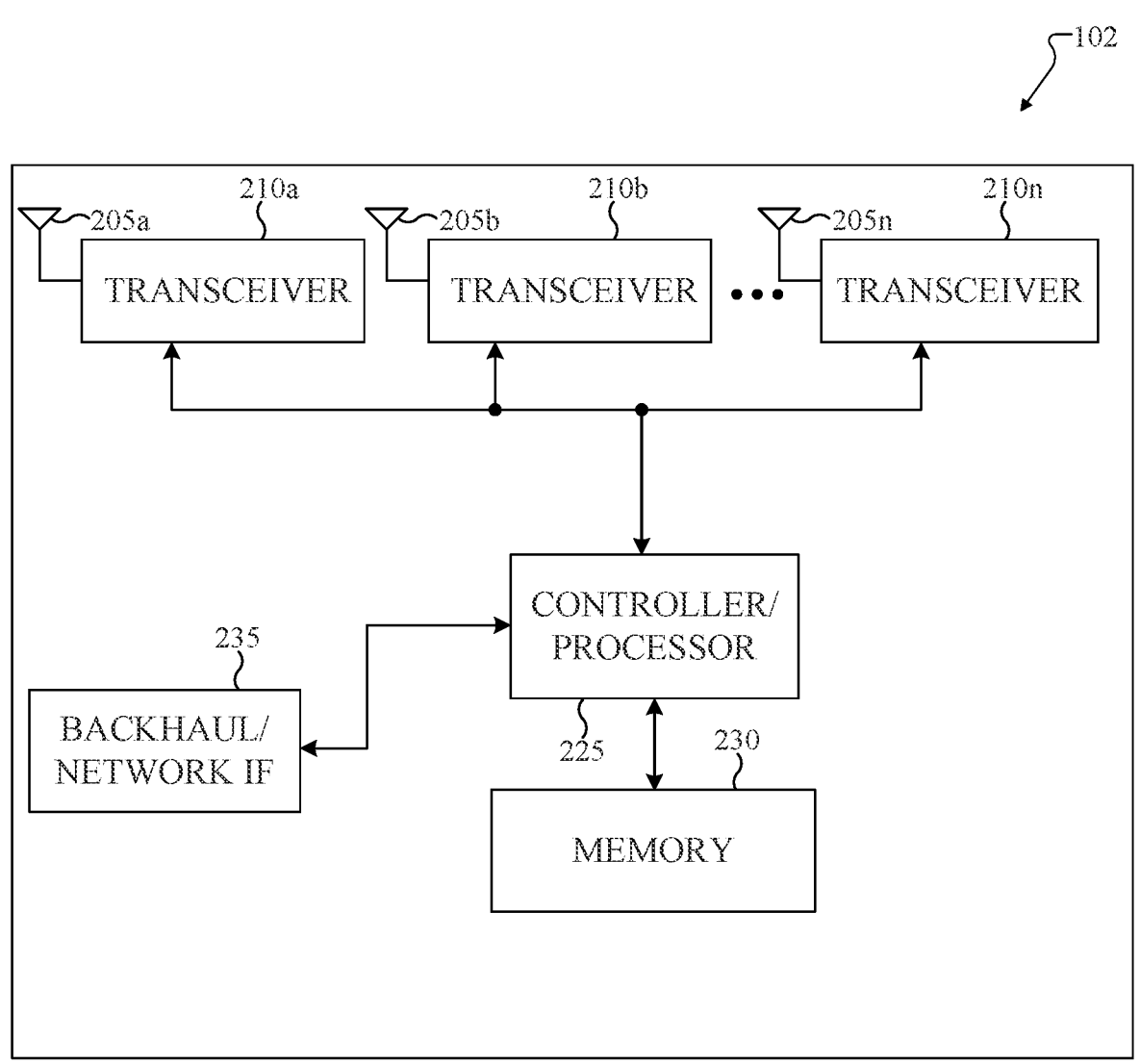
FIG. 2 illustrates an example gNodeB (gNB) according to embodiments of the present disclosure.
Figure 3:
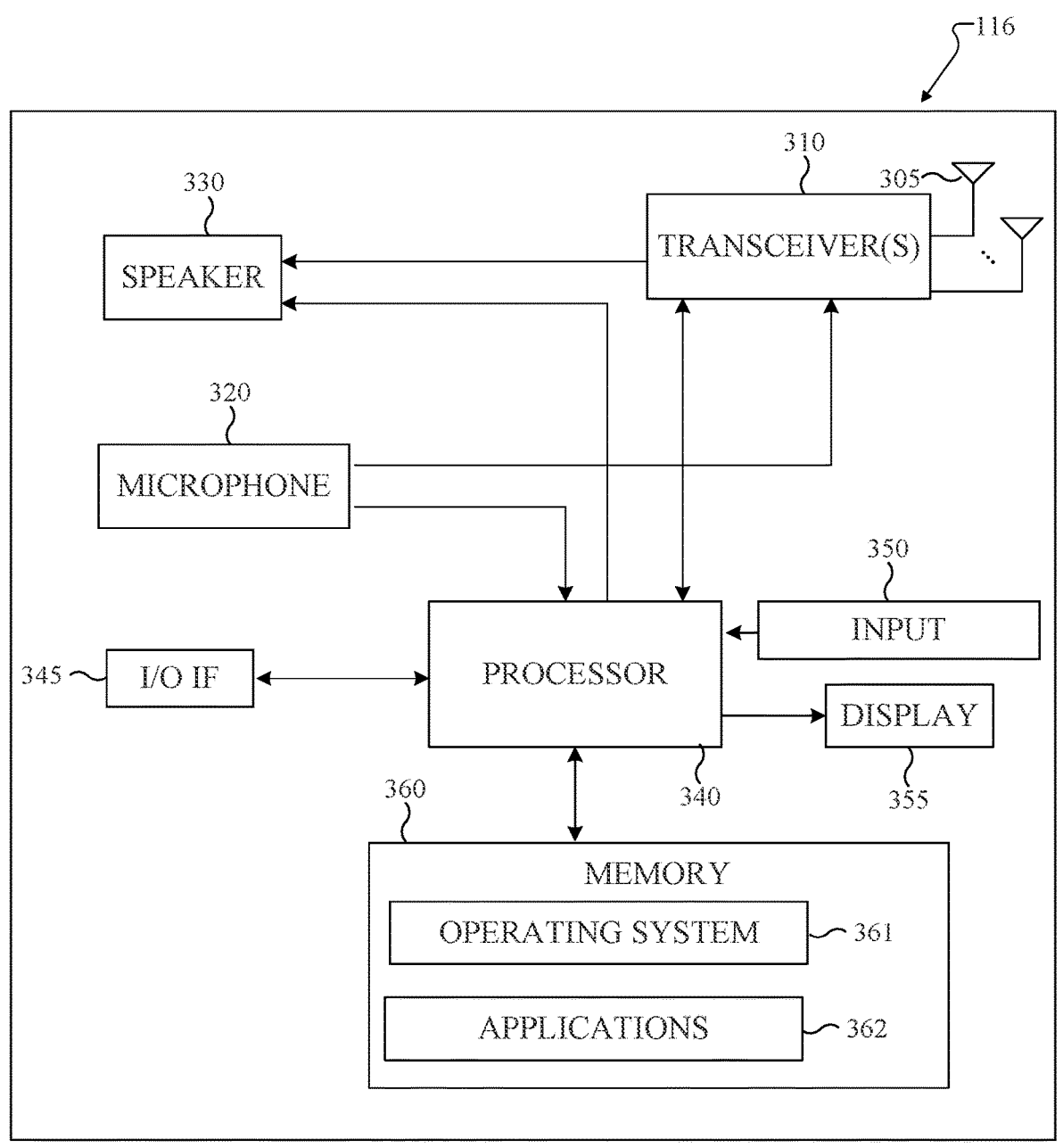
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for supporting ML or AI-assisted CSI feedback. In certain embodiments, one or more of the BSs 101-103 include circuitry, programming, or a combination thereof for supporting ML or AI-assisted CSI feedback.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for ML or AI-assisted CSI feedback. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for ML or AI-assisted CSI feedback as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

In 5G NR, a significant improvement in throughput can be obtained by supporting MU-MIMO transmission, where one gNB simultaneously transmits multiple data streams to multiple UEs. MU-MIMO transmission relies on the availability of accurate DL CSI at the gNB; in frequency domain duplex (FDD) systems, each UE measures DL CSI and reports its measurements. Each CSI report can include PMI (the dominant channel directions), RI (the number of dominant channel directions), and/or CQI (the best modulation and code rate that the channel can support).

The overhead of DL CSI increases with the number of antenna ports at the gNB and the number of SBs. Current 5G systems support tens of SBs and a maximum of 32 antenna ports at the gNB. Each UE uses pre-defined codebooks (e.g., Type I and Type II) for compressing DL CSI before it is reported to the gNB. These codebooks exploit channel correlations in the spatial and frequency domains; the application of these codebooks has significantly reduced the overhead of DL CSI feedback. In Release-18, these codebooks are being extended to exploit channel correlations in the temporal domain; the application of these codebooks could yield additional reductions in the overhead of DL CSI feedback.

CBSR can be applied when generating PMI; for example, a gNB can use its knowledge of inter-cell interference conditions to restrict the spatial domain (SD)/frequency domain (FD) information that can be reported by a UE. Also, a gNB can restrict the range of coefficient amplitudes that can be reported by a UE.

Enabling a UE to assist a gNB in determining an appropriate CSI configuration may offer several advantages over having a gNB autonomously determine an appropriate CSI configuration. For example, a gNB can use SRS to estimate the UL (and DL, depending on reciprocity) channel from a UE. The minimum periodicity of SRS is 2 ms, though; in contrast, the spacing between consecutive DMRS can be configured to be less than 1 ms. Thus, a UE can perform finer-grained measurements of the DL channel using received DMRS, compared to a gNB measuring the UL channel using received SRS.

As another example, a UE can report local information that may not be available to a gNB. A UE can use its cameras to detect an oncoming vehicle that will cross its LOS path with a gNB in T seconds. A UE can then report this information to a gNB and make a pre-emptive recommendation for a CSI configuration (e.g., not reporting any SD beams that would overlap with its LOS path with a gNB in T seconds).

The number of antenna ports at the gNB and the number of SBs are expected to increase for future systems to meet more stringent performance requirements—yet the overhead reduction from pre-defined codebooks may not scale accordingly. Thus, it may be advantageous to configure a UE to support alternate methods of compressing DL CSI. For example, further overhead reductions can result from configuring a UE to use an AI/ML-based codebook that performs joint compression across the spatial, frequency, and temporal domains. As another example, further overhead reductions can result from configuring a UE to use an AI/ML-based method to determine the Type II codebook parameters, where this codebook performs compression across the spatial, frequency, and temporal domains. The connection between overhead reduction and temporal-domain correlations motivates the application of AI/ML techniques to generate/report temporal CSI feedback.

As an additional example, performance improvements can result from configuring a UE to use an AI/ML-based method to predict future CSI instances, especially in medium/high-speed scenarios; this bolsters the case for using AI/ML techniques to generate/report temporal CSI feedback.

Various embodiments of the present disclosure recognize that AI/ML-based techniques for generating/reporting CSI feedback are not supported in the 5G-NR standard. In addition, various embodiments of the present disclosure recognize that UE-assisted CSI configuration for generating/ reporting CSI feedback is not supported in the 5G-NR standard. Further, various embodiments of the present disclosure recognize that AI/ML-based techniques for generating/reporting temporal CSI feedback are not supported in the 5G-NR standard.

Accordingly, various embodiments of the present disclosure provide techniques that the network can use to configure a UE to generate CSI feedback using AI/ML-based techniques in conjunction with pre-defined codebooks. The corresponding signaling details are also discussed. In addition, various embodiments of the present disclosure provide techniques that the network can use to configure a UE to assist it in applying CSI configuration when generating/ reporting CSI feedback. The corresponding signaling details are also discussed. Further, various embodiments of the present disclosure provide techniques that the network can use to configure a UE to generate temporal CSI feedback using AI/ML-based techniques in conjunction with pre-defined codebooks. The corresponding signaling details are also discussed.

For illustrative purposes, a term "AI/ML-based CSI feedback/report" is used to refer to a method for generating CSI report different from the conventional CSI that utilizes a fixed/pre-determined codebook of precoding vectors/matrices enumerated by a PMI. For instance, the "AI/ML-based CSI feedback/report" can utilize a machine which utilizes pre-calculated and/or pre-stored CSI for the purpose of offline training. The "AI/ML-based CSI feedback/report" can also utilize a machine which utilizes newly-collected CSI for the purpose of online training. The "AI/ML-based CSI feedback/report" can also utilize multiple machines, e.g., a gNB and multiple UEs, for the purpose of federated learning. In terms of AI/ML model architecture, "AI/ML-based CSI feedback/report" can utilize a single- or multiple-layer of convolutional auto-encoder. The "AI/ML-based CSI feedback/report" can also utilize a recurrent auto-encoder. The "AI/ML-based CSI feedback/report" can also utilize a transformer neural network.

Other terms that refer to a same method can also be used.

FIG. 4 illustrates an example method 400 for operations at a BS to support a UE-initiated switch to an AI/ML-based CSI feedback/report method according to embodiments of the present disclosure. The embodiment of the example method 400 for operations at a BS to support a UE-initiated switch to an AI/ML-based CSI feedback/report method illustrated in FIG. 4 is for illustration only. FIG. 4 does not limit the scope of this disclosure to any particular implementation of the example method 400 for operations at a BS to support a UE-initiated switch to an AI/ML-based CSI feedback/report method.

As illustrated in FIG. 4, the method 400 starts at operation 402, where a BS (such as the BS 102) receives UE capability information from a UE, including the support of an ML approach for generating/reporting CSI feedback. At operation 404, the BS sends configuration information to the UE, which can include ML-related configuration information such as enabling/disabling of an ML approach for generating/reporting CSI feedback, an ML model to be used, trained model parameters, and/or whether model parameter updates reported by the UE will be used or not. At operation 406, the BS sends a conventional CSI feedback configuration message to the UE. In one example, this message can correspond to the CSI feedback based on the Type II codebook (cf. 5.2.2.2.3/4/5/6/7, [4]). In one example, this message can correspond to the CSI feedback based on the Type I codebook (cf. 5.2.2.2.1/2, [4]) or the Type II codebook (cf. 5.2.2.2.3/4/5/6/7, [4]). At operation 408, the BS receives a CSI report from the UE that has been generated based on a conventional feedback/report method. In one example, this method can correspond to the CSI feedback based on the Type II codebook. In one example, this method can correspond to the CSI feedback based on the Type I codebook or the Type II codebook. At operation 410, the BS receives a message from the UE that indicates a switch to an AI/ML-based CSI feedback/report method. In one example, a dedicated/new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback as, e.g., a 1-bit indication in a CSI report. At operation 412, the BS receives a CSI report from the UE that has been generated based on an AI/ML-based feedback/report method.

In another example, the BS can pre-determine/configure information about the switching time to an AI/ML-based CSI feedback/report method. In this case, operation 410 does not need to be performed; the BS can receive AI/ML-based CSI reports from the UE at a pre-determined/configured time in operation 412.

In another example, between operation 410 and operation 412, the BS can perform operation 411, where the BS can send an ACK/NACK to the UE in response to a received message from the UE that indicates a switch to an AI/ML-based CSI feedback/report method. If the BS sends an ACK, then the UE switches to an AI/ML-based CSI feedback/report method; the BS receives AI/ML-based CSI reports from a UE in operation 412. If the BS sends a NACK, then the BS receives conventional CSI reports from the UE in operation 412. In operation 411, in another example, the BS can send a configuration message for an AI/ML-based CSI feedback/report method to a UE.

In another example, the BS can include a configuration message regarding a conventional CSI feedback/report method to the UE in operation 404. In this case, operation 406 does not need to be performed; the BS can begin receiving conventional CSI reports from the UE in operation 408.

In another example, the BS can enable/disable operations 410, 411, and 412, e.g., via RRC configuration. If these operations are disabled, then the BS continues receiving conventional CSI reports from the UE in operation 408.

FIG. 5 illustrates an example method 500 for operations at a UE to support a UE-initiated switch to an AI/ML-based CSI feedback/report method according to embodiments of the present disclosure. The embodiment of the example method 500 for operations at a UE to support a UE-initiated switch to an AI/ML-based CSI feedback/report method illustrated in FIG. 5 is for illustration only. FIG. 5 does not limit the scope of this disclosure to any particular implementation of the example method 500 for operations at a UE to support a UE-initiated switch to an AI/ML-based CSI feedback/report method.

As illustrated in FIG. 5, the method 500 begins at operation 502, where a UE (such as the UE 116) reports capability information to a BS, including the support of an ML approach for generating/reporting CSI feedback. At operation 504, the UE receives configuration information from the BS, which can include ML-related configuration information such as enabling/disabling of an ML approach for generating/reporting CSI feedback, an ML model to be used, trained model parameters, and/or whether model parameter updates reported by the UE will be used or not. At operation 506, the UE receives a conventional CSI feedback configuration message from the BS. In one example, this message can correspond to the CSI feedback based on the Type II codebook. In one example, this message can correspond to the CSI feedback based on the Type I codebook or the Type II codebook. At operation 508, the UE sends CSI reports to the BS that have been generated by a conventional feedback/report method. In one example, this method can correspond to the CSI feedback based on the Type II codebook. In one example, this method can correspond to the CSI feedback based on the Type I codebook or the Type II codebook. At operation 510, the UE sends a message to the BS that indicates a switch to an AI/ML-based CSI feedback/report method. In one example, a dedicated/new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. At operation 512, the UE sends CSI reports to the BS that have been generated by an AI/ML-based feedback/report method.

In another example, the BS can pre-determine/configure information about the switching time to an AI/ML-based CSI feedback/report method. In this case, operation 510 does not need to be performed; the UE can send AI/ML-based CSI reports to the BS at a pre-determined/configured time in operation 512.

In another example, between operation 510 and operation 512, the UE can perform operation 511. In operation 511, the UE can receive an ACK/NACK from the BS in response to a received message from the UE that indicates a switch to an AI/ML-based CSI feedback/report method. If the UE receives an ACK, then the UE switches to an AI/ML-based CSI feedback/report method; the UE sends AI/ML-based CSI reports to the BS in operation 512. If the UE receives a NACK, then the UE sends conventional CSI reports to the BS in operation 512. In operation 511, in another example, the UE can receive a configuration message for an AI/ML-based CSI feedback/report method from the BS.

In another example, the UE can receive a configuration message regarding a conventional CSI feedback/report method from the BS in operation 504. In this case, operation 506 does not need to be performed; the UE can begin sending conventional CSI reports to the BS in operation 508.

In another example, the BS can enable/disable operations 510, 511, and 512, e.g., via RRC configuration. If these operations are disabled, then the UE continues sending conventional CSI reports to the BS in operation 508.

Figure 6:
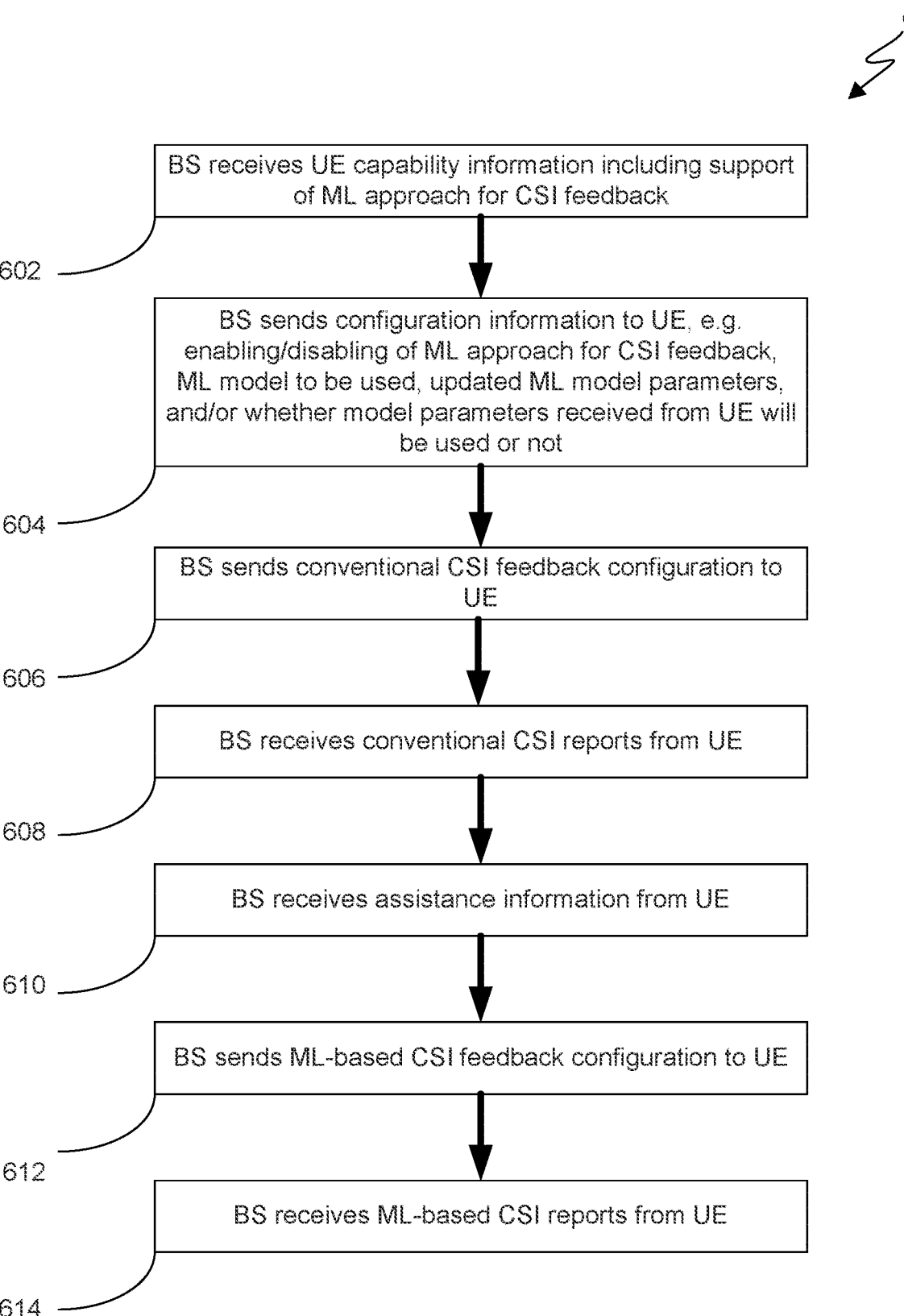
FIG. 6 illustrates an example method for operations at a BS to support a BS-initiated switch to an AI/ML-based CSI feedback/report method according to embodiments of the present disclosure.

FIG. 6 illustrates an example method 600 for operations at a BS to support a BS-initiated switch to an AI/ML-based CSI feedback/report method according to embodiments of the present disclosure. The embodiment of the example method 600 for operations at a BS to support a BS-initiated switch to an AI/ML-based CSI feedback/report illustrated in FIG. 6 is for illustration only. FIG. 6 does not limit the scope of this disclosure to any particular implementation of the example method 600 for operations at a BS to support a BS-initiated switch to an AI/ML-based CSI feedback/report method.

As illustrated in FIG. 6, the method 600 begins at operation 602, where a BS (such as the BS 102) receives UE capability information from a UE, including the support of an ML approach for generating/reporting CSI feedback. At operation 604, the BS sends configuration information to the UE, which can include ML-related configuration information such as enabling/disabling of an ML approach for generating/reporting CSI feedback, an ML model to be used, trained model parameters, and/or whether model parameter updates reported by the UE will be used or not. At operation 606, the BS sends a conventional CSI feedback configuration message to the UE. In one example, this message can correspond to the CSI feedback based on the Type II codebook. In one example, this message can correspond to the CSI feedback based on the Type I codebook or the Type II codebook. At operation 608, the BS receives CSI reports from the UE that have been generated by a conventional feedback/report method. In one example, this method can correspond to the CSI feedback based on the Type II codebook. In one example, this method can correspond to the CSI feedback based on the Type I codebook or the Type II codebook. At operation 610, the BS receives assistance information from the UE; the assistance information can include a recommendation for switching to an AI/ML-based CSI feedback/report method, which will be described in the "UE assistance information" section later in this disclosure. At operation 612, the BS sends an AI/ML-based CSI feedback configuration message to the UE. At operation 614, the BS receives CSI reports from the UE that have been generated by an AI/ML-based feedback/report method.

In another example, the BS can include a configuration message regarding a conventional CSI feedback/report method to a UE in operation 604. In this case, operation 606 does not need to be performed; a BS can begin receiving conventional CSI reports from a UE in operation 608.

Figure 7:
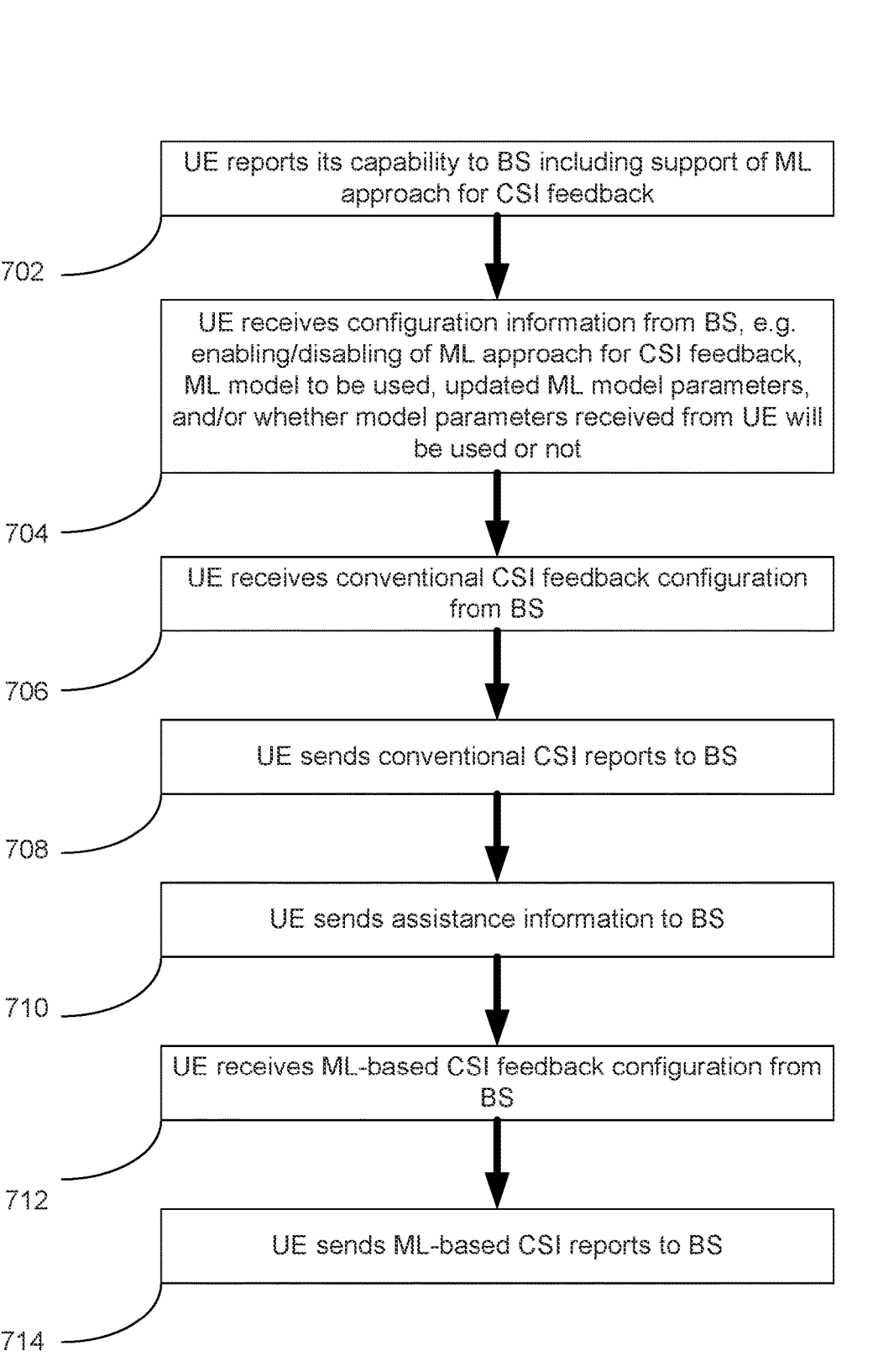
FIG. 7 illustrates an example method for operations at a UE to support a BS-initiated switch to an AI/ML-based CSI feedback/report method according to embodiments of the present disclosure.

FIG. 7 illustrates an example method 700 for operations at a UE to support a BS-initiated switch to an AI/ML-based CSI feedback/report method according to embodiments of the present disclosure. The embodiment of the example method 700 for operations at a UE to support a BS-initiated switch to an AI/ML-based CSI feedback/report method illustrated in FIG. 7 is for illustration only. FIG. 7 does not limit the scope of this disclosure to any particular implementation of the example method 700 for operations at a UE to support a BS-initiated switch to an AI/ML-based CSI feedback/report method.

As illustrated in FIG. 7, the method begins at operation 702, where a UE (such as the UE 116) reports capability information to a BS, including the support of an ML approach for generating/reporting CSI feedback. At operation 704, the UE receives configuration information from the BS, which can include ML-related configuration information such as enabling/disabling of an ML approach for generating/reporting CSI feedback, an ML model to be used, trained model parameters, and/or whether model parameter updates reported by the UE will be used or not. At operation 706, the UE receives a conventional CSI feedback configuration message from the BS. In one example, this message can correspond to the CSI feedback based on the Type II codebook. In one example, this message can correspond to the CSI feedback based on the Type I codebook or the Type II codebook. At operation 708, the UE sends CSI reports to the BS that have been generated by a conventional feedback/report method. In one example, this method can correspond to the CSI feedback based on the Type II codebook. In one example, this method can correspond to the CSI feedback based on the Type I codebook or the Type II codebook. At operation 710, the UE sends assistance information to the BS; the assistance information can include a recommendation for switching to an AI/ML-based CSI feedback/report method, which will be described in the "UE assistance information" section later in this disclosure. At operation 712, the UE receives an AI/ML-based CSI feedback configuration message from the BS. UE feeds to the trained model one or more of (i) configuration received in the AI/ML-based CSI feedback configuration message (ii) pre-processed CSI-RS measurements, and (iii) observed channel statistics. The trained model outputs parameters (for example, vectors, coefficients or phase) corresponding to CSI report. UE identifies the CSI report based on the parameters output by the trained model. In one example, the identified CSI report is post processed to comply with a particular format or to meet a certain constraint. For example, when the configuration includes a maximum size for a CSI report, the determined CSI report is post processed such that the maximum size constraint of the CSI report is met. In another example, UE can infer the output parameters based on local observations such that the identified CSI report is based on the inferred parameters. At operation 714, the UE sends CSI reports to the BS that have been generated by an AI/ML-based feedback/report method.

In another example, the UE can receive a configuration message regarding a conventional CSI feedback/report method from the BS in operation 704. In this case, operation 706 does not need to be performed; the UE can begin sending conventional CSI reports to the BS in operation 708.

Figure 8:
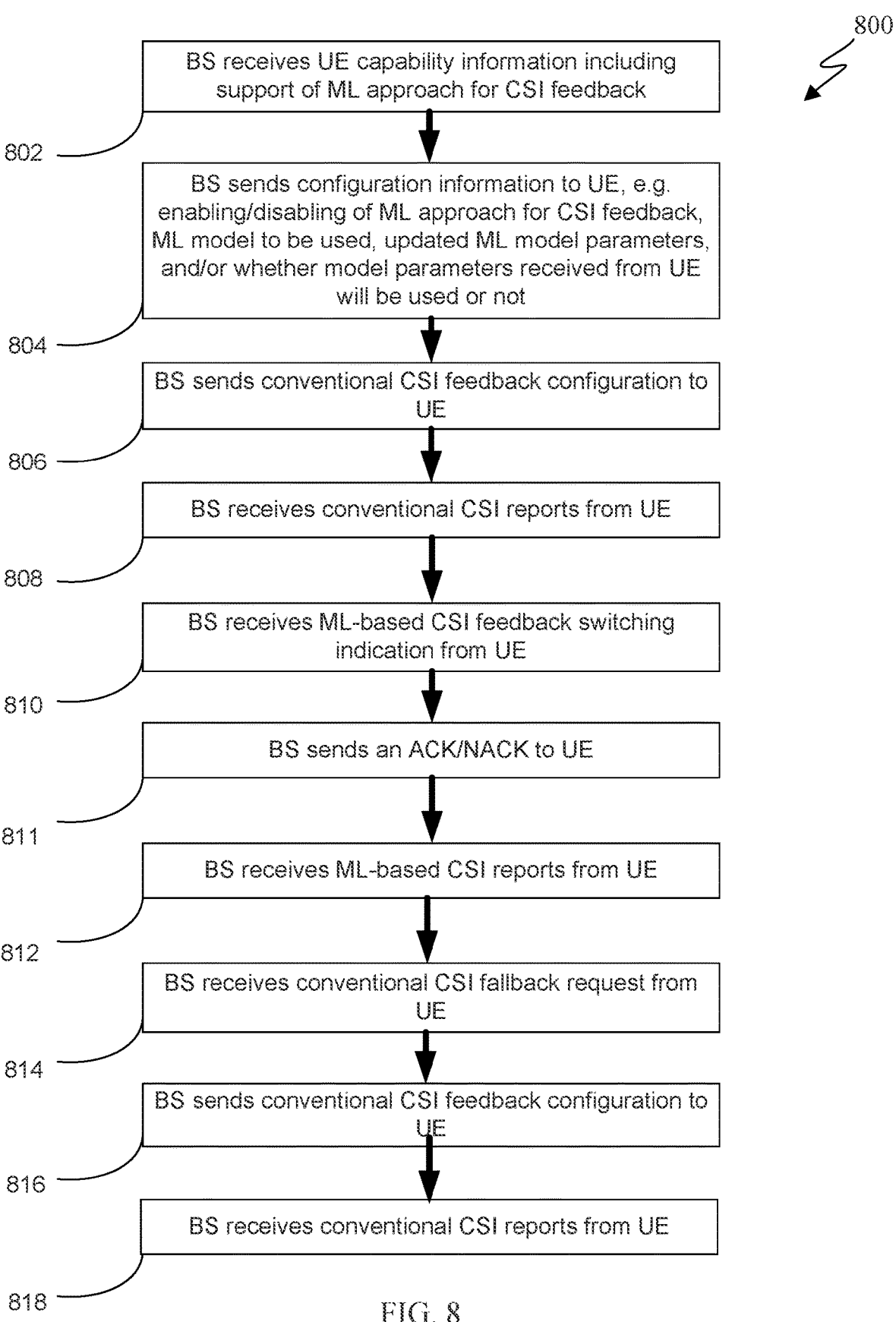
FIG. 8 illustrates an example method for operations at a BS to support a UE-initiated fallback to conventional CSI feedback/report method according to embodiments of the present disclosure.

FIG. 8 illustrates an example method 800 for operations at a BS to support a UE-initiated fallback to conventional CSI feedback/report method according to embodiments of the present disclosure. The embodiment of the example method 800 for operations at a BS to support a UE-initiated fallback to conventional CSI feedback/report method illustrated in FIG. 8 is for illustration only. FIG. 8 does not limit the scope of this disclosure to any particular implementation of the example method 800 for operations at a BS to support a UE-initiated fallback to conventional CSI feedback/report method.

As illustrated in FIG. 8, the method 800 begins at operation 802, where a BS (such as the BS 102) receives UE capability information from a UE, including the support of an ML approach for generating/reporting CSI feedback. At operation 804, the BS sends configuration information to the UE, which can include ML-related configuration information such as enabling/disabling of an ML approach for generating/reporting CSI feedback, an ML model to be used, trained model parameters, and/or whether model parameter updates reported by the UE will be used or not. At operation 806, the BS sends a conventional CSI feedback configuration message to the UE. In one example, this message can correspond to the CSI feedback based on the Type II codebook. In one example, this message can correspond to the CSI feedback based on the Type I codebook or the Type II codebook. At operation 808, the BS receives CSI reports from the UE that have been generated by a conventional feedback/report method. In one example, this method can correspond to the CSI feedback based on the Type II codebook. In one example, this method can correspond to the CSI feedback based on the Type I codebook or the Type II codebook. At operation 810, the BS receives a message from the UE that indicates a switch to an AI/ML-based CSI feedback/report method. In one example, a dedicated/new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. At operation 812, the BS receives CSI reports from the UE that have been generated by an AI/ML-based feedback/report method. At operation 814, the BS receives a message from the UE that corresponds to a request to fall back to a conventional CSI feedback/report method, which will be described in the "Conventional CSI fallback request" section later in this disclosure. In one example, this method can correspond to the CSI feedback based on the Type II codebook. In one example, this method can correspond to the CSI feedback based on the Type I codebook or the Type II codebook. At operation 816, the BS sends a conventional CSI feedback configuration message to the UE. In one example, this message can correspond to the CSI feedback based on the Type II codebook. In one example, this message can correspond to the CSI feedback based on the Type I codebook or the Type II codebook. At operation 818, the BS receives CSI reports from the UE that have been generated by a conventional feedback/report method. In one example, this method can correspond to the CSI feedback based on the Type II codebook. In one example, this method can correspond to the CSI feedback based on the Type I codebook or the Type II codebook.

In another example, the BS can pre-determine/configure information about the switching time to an AI/ML-based CSI feedback/report method. In this case, operation 810 does not need to be performed; the BS can receive AI/ML-based CSI reports from the UE at a pre-determined/configured time in operation 812.

In another example, between operation 810 and operation 812, the BS can perform an operation 811. In operation 811, the BS can send an ACK/NACK to the UE in response to a received message from the UE that indicates a switch to an AI/ML-based CSI feedback/report method. If the BS sends an ACK, then the UE switches to an AI/ML-based CSI feedback/report method; the BS receives AI/ML-based CSI reports from the UE in operation 812. If the BS sends a NACK, then the BS receives conventional CSI reports from a UE in operation 812. In operation 811, in another example, the BS can send a configuration message for an AI/ML-based CSI feedback/report method to the UE.

In another example, the BS can include a configuration message regarding a conventional CSI feedback/report method to the UE in operation 804. In this case, operation 806 does not need to be performed; the BS can begin receiving conventional CSI reports from the UE in operation 808.

In another example, the BS can enable/disable operations 810, 811, and 812, e.g., via RRC configuration. If these operations are disabled, then the BS continues receiving conventional CSI reports from the UE in operation 808.

Figure 9:
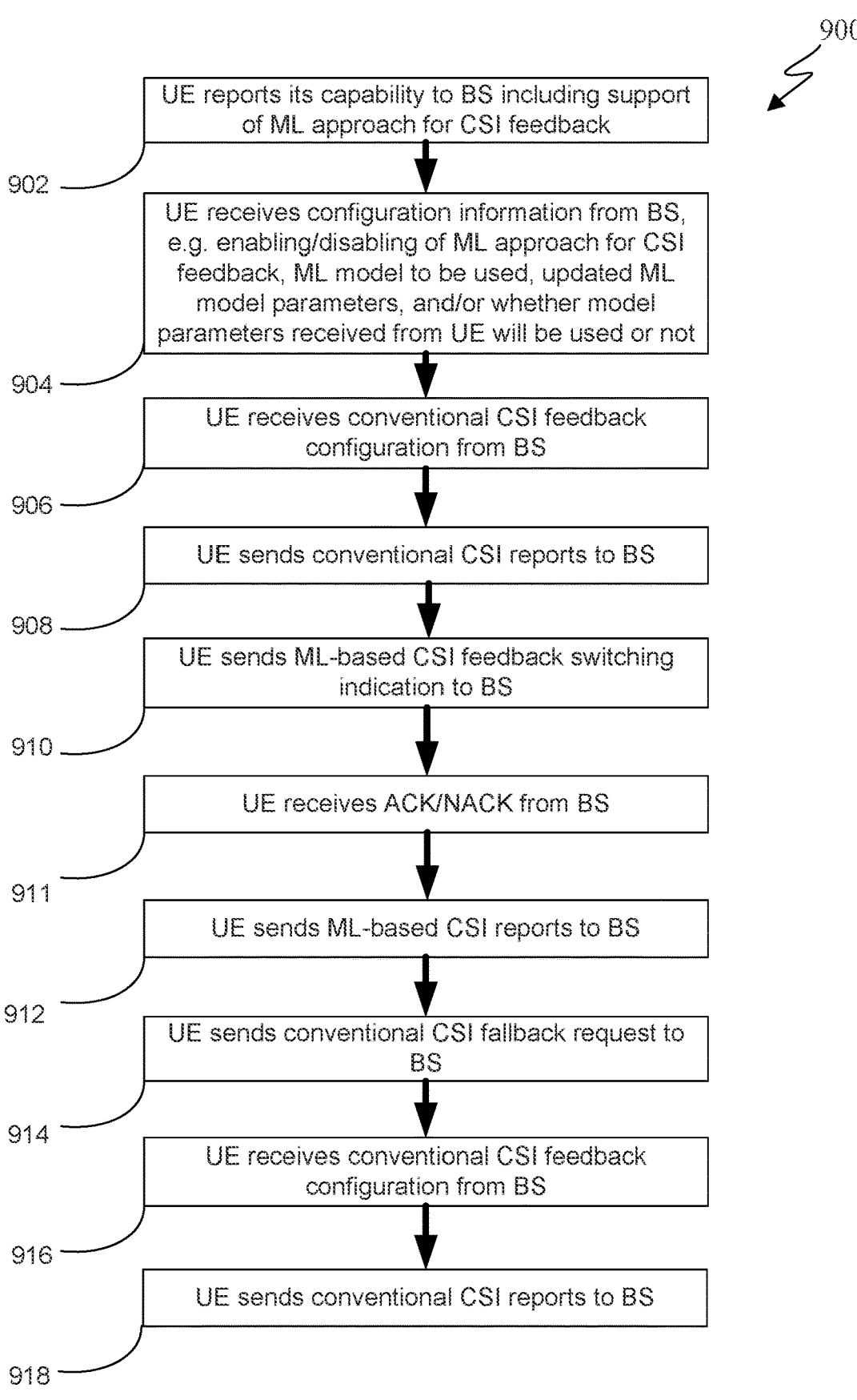
FIG. 9 illustrates an example method for operations at a UE to support a UE-initiated fallback to conventional CSI feedback/report method according to embodiments of the present disclosure.

FIG. 9 illustrates an example method 900 for operations at a UE to support a UE-initiated fallback to conventional CSI feedback/report method according to embodiments of the present disclosure. The embodiment of the example method 900 for operations at a UE to support a UE-initiated fallback to conventional CSI feedback/report method illustrated in FIG. 9 is for illustration only. FIG. 9 does not limit the scope of this disclosure to any particular implementation of the example method 900 for operations at a UE to support a UE-initiated fallback to conventional CSI feedback/report method.

As illustrated in FIG. 9, the method 900 begins at operation 902, where a UE (such as the UE 116) receives configuration information from a BS, which can include ML-related configuration information such as enabling/disabling of an ML approach for generating/reporting CSI feedback, an ML model to be used, trained model parameters, and/or whether model parameter updates reported by the UE will be used or not. At operation 906, the UE receives a conventional CSI feedback configuration message from the BS. In one example, this message can correspond to the CSI feedback based on the Type II codebook. In one example, this message can correspond to the CSI feedback based on the Type I codebook or the Type II codebook. At operation 908, the UE sends CSI reports to the BS that have been generated by a conventional feedback/report method. In one example, this method can correspond to the CSI feedback based on the Type II codebook. In one example, this method can correspond to the CSI feedback based on the Type I codebook or the Type II codebook. At operation 910, the UE sends a message to the BS that indicates a switch to an AI/ML-based CSI feedback/report method. In one example, a dedicated/new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. At operation 912, the UE sends CSI reports to the BS that have been generated by an AI/ML-based feedback/report method. At operation 914, a UE sends a message to a BS that corresponds to a request to fall back to a conventional CSI feedback/report method, which will be described in the "Conventional CSI fallback request" section later in this disclosure. In one example, this method can correspond to the CSI feedback based on the Type II codebook. In one example, this method can correspond to the CSI feedback based on the Type I codebook or the Type II codebook. At operation 916, the UE receives a conventional CSI feedback configuration message from the BS. In one example, this message can correspond to the CSI feedback based on the Type II codebook. In one example, this message can correspond to the CSI feedback based on the Type I codebook or the Type II codebook. At operation 918, the UE sends CSI reports to the BS that have been generated by a conventional feedback/report method. In one example, this method can correspond to the CSI feedback based on the Type II codebook. In one example, this method can correspond to the CSI feedback based on the Type I codebook or the Type II codebook.

In another example, the BS can pre-determine/configure information about the switching time to an AI/ML-based CSI feedback/report method. In this case, operation 910 does not need to be performed; the UE can send AI/ML-based CSI reports to the BS at a pre-determined/configured time in operation 912.

In another example, between operation 910 and operation 912, the UE can perform an operation 911. In operation 911, the UE can receive an ACK/NACK from the BS in response to a received message from the UE that indicates a switch to an AI/ML-based CSI feedback/report method. If the UE receives an ACK, then the UE switches to an AI/ML-based CSI feedback/report method; the UE sends AI/ML-based CSI reports to the BS in operation 912. If the UE receives a NACK, then the UE sends conventional CSI reports to the BS in operation 912. In operation 911, in another example, a UE can receive a configuration message for an AI/ML-based CSI feedback/report method from the BS.

In another example, the UE can receive a configuration message regarding a conventional CSI feedback/report method from the BS in operation 904. In this case, operation 906 does not need to be performed; the UE can begin sending conventional CSI reports to the BS in operation 908.

In another example, the BS can enable/disable operations 910, 911, and 912, e.g., via RRC configuration. If these operations are disabled, then the UE continues sending conventional CSI reports to the BS in operation 908.

Figure 10:
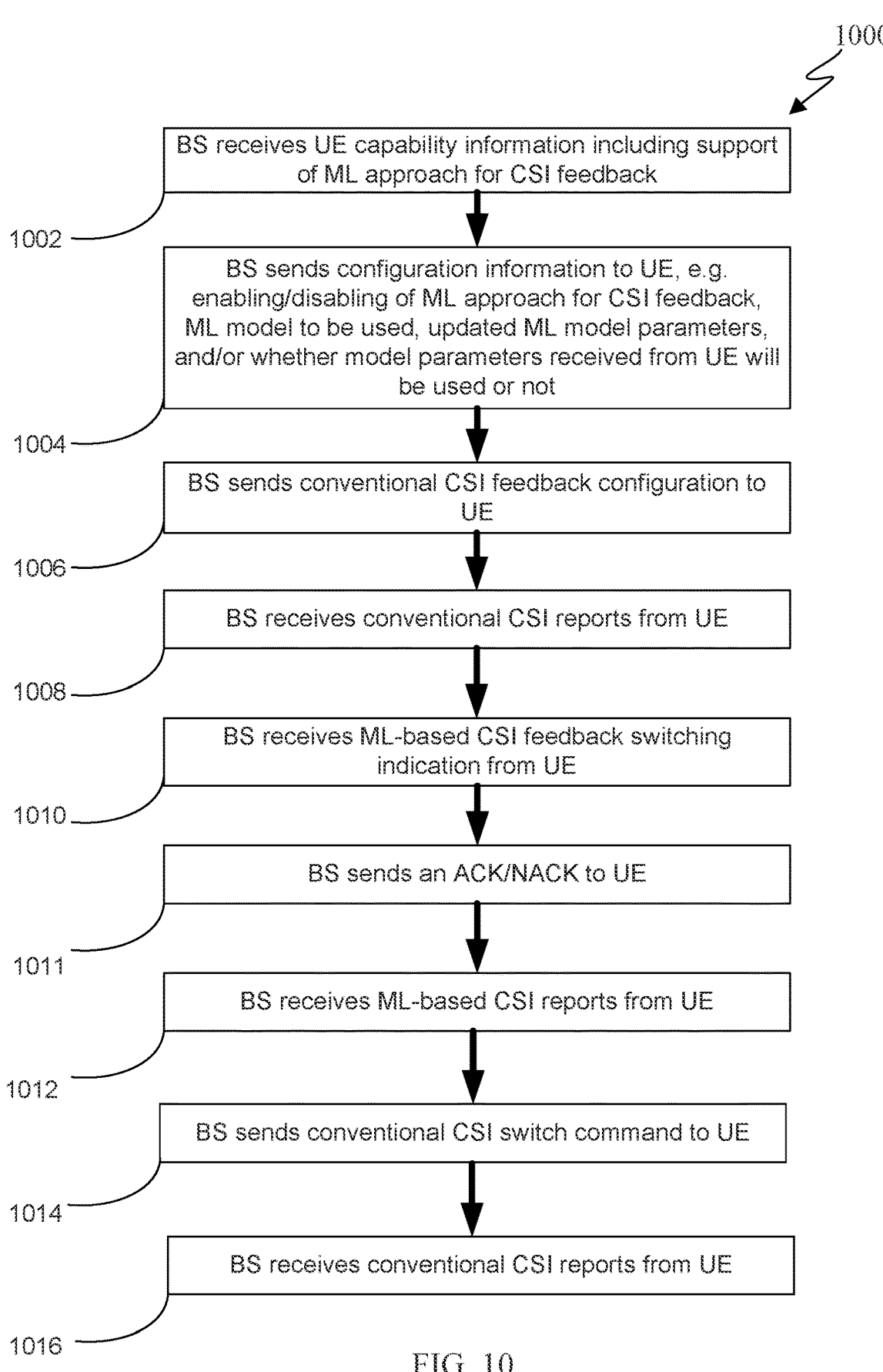
FIG. 10 illustrates an example method for operations at a BS to support a BS-initiated fallback to conventional CSI feedback/report method according to embodiments of the present disclosure.

FIG. 10 illustrates an example method 1000 for operations at a BS to support a BS-initiated fallback to conventional CSI feedback/report method according to embodiments of the present disclosure. The embodiment of the example method 1000 for operations at a BS to support a BS-initiated fallback to conventional CSI feedback/report method illustrated in FIG. 10 is for illustration only. FIG. 10 does not limit the scope of this disclosure to any particular implementation of the example method 1000 for operations at a BS to support a BS-initiated fallback to conventional CSI feedback/report method.

As illustrated in FIG. 10, the method 1000 begins at operation 1002, where a BS (such as the BS 102) receives UE capability information from a UE, including the support of an ML approach for generating/reporting CSI feedback. At operation 1004, the BS sends configuration information to the UE, which can include ML-related configuration information such as enabling/disabling of an ML approach for generating/reporting CSI feedback, an ML model to be used, trained model parameters, and/or whether model parameter updates reported by a UE will be used or not. At operation 1006, the BS sends a conventional CSI feedback configuration message to the UE. In one example, this message can correspond to the CSI feedback based on the Type II codebook. In one example, this message can correspond to the CSI feedback based on the Type I codebook or the Type II codebook. At operation 1008, the BS receives CSI reports from the UE that have been generated by a conventional feedback/report method. In one example, this method can correspond to the CSI feedback based on the Type II codebook. In one example, this method can correspond to the CSI feedback based on the Type I codebook or the Type II codebook. At operation 1010, the BS receives a message from the UE that indicates a switch to an AI/ML-based CSI feedback/report method. In one example, a dedicated/new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. At operation 1012, the BS receives CSI reports from the UE that have been generated by an AI/ML-based feedback/report method. At operation 1014, the BS sends a message to the UE that corresponds to a command to fall back to a conventional CSI feedback/report method. In one example, this method can correspond to the CSI feedback based on the Type II codebook. In one example, this method can correspond to the CSI feedback based on the Type I codebook or the Type II codebook. At operation 1016, the BS receives CSI reports from the UE that have been generated by a conventional feedback/report method. In one example, this method can correspond to the CSI feedback based on the Type II codebook. In one example, this method can correspond to the CSI feedback based on the Type I codebook or the Type II codebook.

In another example, the BS can pre-determine/configure information about the switching time to an AI/ML-based CSI feedback/report method. In this case, operation 1010 does not need to be performed; the BS can receive AI/ML-based CSI reports from the UE at a pre-determined/config- ured time in operation 1012.

In another example, between operation 1010 and opera- tion 1012, the BS can perform an operation 1011. In opera- tion 1011, the BS can send an ACK/NACK to the UE in response to a received message from the UE that indicates a switch to an AI/ML-based CSI feedback/report method. If the BS sends an ACK, then the UE switches to an AI/ML-based CSI feedback/report method; the BS receives AI/ML-based CSI reports from the UE in operation 1012. If the BS sends a NACK, then the BS receives conventional CSI reports from the UE in operation 1012. In operation 1011, in another example, the BS can send a configuration message for an AI/ML-based CSI feedback/report method to the UE.

In another example, the BS can include a configuration message regarding a conventional CSI feedback/report method to the UE in operation 1004. In this case, operation 1006 does not need to be performed; the BS can begin receiving conventional CSI reports from the UE in operation 1008.

In another example, the BS can enable/disable operations 1010, 1011, and 1012, e.g., via RRC configuration. If these operations are disabled, then the BS continues receiving conventional CSI reports from the UE in operation 1008.

FIG. 11 illustrates an example method 1100 for operations at a UE to support a BS-initiated fallback to conventional CSI feedback/report method according to embodiments of the present disclosure. The embodiment of the example method 1100 for operations at a UE to support a BS-initiated fallback to conventional CSI feedback/report method illus- trated in FIG. 11 is for illustration only. FIG. 11 does not limit the scope of this disclosure to any particular imple- mentation of the example method 1100 for operations at a UE to support a BS-initiated fallback to conventional CSI feedback/report method.

As illustrated in FIG. 11, the method 1100 begins at operation 1102, where a UE (such as the UE 116) reports capability information to a BS, including the support of an ML approach for generating/reporting CSI feedback. At operation 1104, the UE receives configuration information from the BS, which can include ML-related configuration information such as enabling/disabling of an ML approach for generating/reporting CSI feedback, an ML model to be used, trained model parameters, and/or whether model parameter updates reported by the UE will be used or not. At operation 1106, the UE receives a conventional CSI feed- back configuration message from the BS. In one example, this message can correspond to the CSI feedback based on the Type II codebook. In one example, this message can correspond to the CSI feedback based on the Type I code- book or the Type II codebook. At operation 1108, the UE sends CSI reports to the BS that have been generated by a conventional feedback/report method. In one example, this method can correspond to the CSI feedback based on the Type II codebook. In one example, this method can corre- spond to the CSI feedback based on the Type I codebook or the Type II codebook. At operation 1110, the UE sends a message to the BS that indicates a switch to an AI/ML-based CSI feedback/report method. In one example, a dedicated/ new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. At operation 1112, the UE sends CSI reports to the BS that have been generated by an AI/ML-based feedback/ report method. At operation 1114, the UE receives a message from the BS that corresponds to a command to fall back to a conventional CSI feedback/report method. In one example, this method can correspond to the CSI feedback based on the Type II codebook. In one example, this method can corre- spond to the CSI feedback based on the Type I codebook or the Type II codebook. At operation 1116, the UE sends CSI reports to the BS that have been generated by a conventional feedback/report method. In one example, this method can correspond to the CSI feedback based on the Type II codebook. In one example, this method can correspond to the CSI feedback based on the Type I codebook or the Type II codebook.

In another example, the BS can pre-determine/configure information about the switching time to an AI/ML-based CSI feedback/report method. In this case, operation 1110 does not need to be performed; the UE can send AI/ML-based CSI reports to the BS at a pre-determined/configured time in operation 1112.

In another example, between operation 1110 and opera- tion 1112, the UE can perform an operation 1111. In opera- tion 1111, the UE can receive an ACK/NACK from the BS in response to a received message from the UE that indicates a switch to an AI/ML-based CSI feedback/report method. If the UE receives an ACK, then the UE switches to an AI/ML-based CSI feedback/report method; the UE sends AI/ML-based CSI reports to the BS in operation 1712. If the UE receives a NACK, then the UE sends conventional CSI reports to the BS in operation 1112. In operation 1111, in another example, the UE can receive a configuration mes- sage for an AI/ML-based CSI feedback/report method from the BS.

In another example, the UE can receive a configuration message regarding a conventional CSI feedback/report method from the BS in operation 1104. In this case, opera- tion 1106 does not need to be performed; the UE can begin sending conventional CSI reports to the BS in operation 1108.

In another example, the BS can enable/disable operations 1110, 1111, and 1112, e.g., via RRC configuration. If these operations are disabled, then the UE continues sending conventional CSI reports to the BS in operation 1108.

In one embodiment, a BS can configure a UE to send an indication of switching to an AI/ML-based CSI feedback/ report method via RRC configuration. Table 1 is an example of modifying an IE PUCCH-Config to configure a UE to send this switching indication. In this example, format5, if present, corresponds to a new PUCCH format for this switching indication. mlCBSwitchResourceToAddModList and mlCBSwitchResourceToReleaseList, if present, corre- spond to PUCCH resources that can be added or released, respectively, for this switching indication. In one example, an existing PUCCH format (e.g., format 3 or 4) can be used for this indication.

TABLE 1

```
PUCCH-Config ::= SEQUENCE {
    ...
    format5              SetupRelease { PUCCH-FormatConfig } OPTIONAL, -- Need
M
    mlCBSwitchResourceToAddModList        SEQUENCE (SIZE (1..maxNrofMLCB-
Resources)) of mlCBSwitchResourceConfig OPTIONAL, -- Need N
    mlCBSwitchResourceToReleaseList       SEQUENCE (SIZE (1..maxNrofMLCB-
Resources)) of mlCBSwitchResourceId OPTIONAL, -- Need N
    ...
}
```

In one embodiment, a BS can configure a UE to send an indication of switching to an AI/ML-based CSI feedback/ report method via MAC CE activation command.

In one embodiment, a BS can configure a UE to send an indication of switching to an AI/ML-based CSI feedback/ report method via DCI.

In another embodiment, a BS can configure a UE to use an AI/ML-based CSI feedback/report method via a PDCCH order, where a new DCI format can be defined and this PDCCH order can be triggered by this new DCI format.

In another example, a BS can configure a UE to use an AI/ML-based CSI feedback/report method via MAC CE activation command.

In another example, a BS can configure a UE to use an AI/ML-based CSI feedback/report method via RRC configuration. Table 2 is an example of modifying an IE CodebookConfig to configure a UE to use AI/ML-based codebooks for generating/reporting CSI feedback. For CodebookConfig, enabledCodebooks, if present, determines which AI/ML-based codebooks are enabled; switchSlot, if present, determines the set of slots where these AI/ML-based codebooks are enabled. csi-ResourceConfigId, if present, corresponds to the IDs of these AI/ML-based code-books. In one example, one AI/ML-based codebook is defined for each CSI-ResourceConfig (with a corresponding entry in csi-ResourceConfigId). In another example, one AI/ML-based codebook is defined for all CSI-ResourceConfigs (where each CSI-ResourceConfig has an entry in csi-ResourceConfigId).

tions of $(n1, n2)$, where appropriate pre-processing can be performed on the input to this AI/ML-based codebook.

The CodebookConfig IE can also be modified to configure a UE to use AI/ML-based codebooks for generating/report-ing CSI feedback in a multi-TRP system, wherein the UE can receive DL reception from or transmit UL transmission to multiple TRPs. In one example, a TRP is functionally equivalent to (or corresponds to) a NZP CSI-RS resource, or a CSI-RS resource set, or a group of antenna ports. In one example, one AI/ML-based codebook is defined for each TRP (where each TRP can belong to a particular CORESET pool; each codebook can have a corresponding CORESET Pool ID). In another example, one AI/ML-based codebook is defined for all TRPs (where the CORESET Pool ID for each TRP is mapped to this codebook).

In another embodiment, a BS can configure a UE to use AI/ML-based CSI component(s) of a codebook via RRC configuration. In one example, the codebook can include AI/ML-based CSI component(s) and conventional codebook component(s). Table 3 is an example of modifying an IE CodebookConfig to configure a UE to use an AI/ML-based component of a conventional codebook for generating/ reporting CSI feedback. typeII-AI-r16 corresponds to an AI/ML-based component of type2, which corresponds to the Type II codebook. If typeII-AI-r16 is enabled, then an AI/ML-based method is used to determine the output of the Type II codebook, given a particular input. In one example, an AI/ML-based component of a conventional codebook can be configured to learn the number of SD beams and perform

TABLE 2

```
CodebookConfig ::= SEQUENCE {
    codebookType         CHOICE {
        type1            SEQUENCE {
            ...
        },
        type2            SEQUENCE {
            ...
        },
        typeAI           SEQUENCE {
            enabledCodebooks       SEQUENCE (SIZE (1..NrAICodebooks)) OF BOOLEAN
OPTIONAL, -- Need M
            switchSlot             SEQUENCE (SIZE (1..NrAICodebooks)) OF INTEGER
(0..numSlots-1) OPTIONAL, -- Need M
            csi-ResourceConfigId       SEQUENCE (SIZE (1..NrCsiResourceConfigs)) OF
INTEGER (1..NrAiCodebooks) OPTIONAL, -- Need M
            ...
        },
    }
}
```

Let $(n1, n2)$ represent the number of antenna ports in the first $(n1)$ and second $(n2)$ dimensions. In one example, one AI/ML-based codebook can be defined for each supported combination of $(n1, n2)$. In another example, one AI/ML-based codebook can be defined for all supported combina- SD beam group selection; it can also be configured to learn the number of FD beams and perform FD beam group selection. In another example, an AI/ML-based component of a conventional codebook can be configured to jointly learn the number of SD/FD beams and perform SD/FD beam group selection. If reportNumSDBeams is enabled, then the UE reports the inferred number of SD beams. If report-NumFDBeams is enabled, then the UE reports the inferred number of FD beams. An AI/ML-based component of a conventional codebook can also be configured to learn the number of nonzero coefficients for computing a linear combination of SD and FD beams. If reportNumNZCoefs is enabled, then the UE reports the inferred number of nonzero coefficients for computing a linear combination of SD and FD beams. An AI/ML-based component of a conventional codebook can also be configured to learn the size of the PSK alphabet (e.g., QPSK or 8-PSK). If reportPhaseAlphabet is enabled, then the UE reports the size of the PSK alphabet (e.g., QPSK or 8-PSK).

TABLE 3

```
CodebookConfig ::= SEQUENCE {
    codebookType              CHOICE {
        type1   SEQUENCE {
            ...
        },
        type2   SEQUENCE {
            subtype           CHOICE {
                typeII-r16            SEQUENCE {
                    ...
                },
                typeII-PortSelect-r16 SEQUENCE {
                    ...
                },
                typeII-AI-r16         SEQUENCE {
                    ...
                    reportNumSDBeams         BOOLEAN,
                    reportNumFDBeams         BOOLEAN,
                    reportNumNZCoefs         BOOLEAN,
                    reportPhaseAlphabet      BOOLEAN,
                },
            },
        }
    }
}
```

Table 4 is another example of modifying an IE CodebookConfig to configure a UE to use an AI/ML-based component of a conventional codebook for generating/reporting CSI feedback. typeII-PortSelect-r16 corresponds to the Port Selection subtype of the Type II codebook. If selection codebook (cf. 5.2.2.2.4/6, [4]) and/or the restriction for RI for the parameter TypeII-PortSelection-RI-Restriction (cf. 5.2.2.2.4/6, [4]).

TABLE 4

```
CodebookConfig ::= SEQUENCE {
    codebookType              CHOICE {
        type1   SEQUENCE {
            ...
        },
        type2   SEQUENCE {
            subtype               CHOICE {
                typeII-r16                SEQUENCE {
                    ...
                },
                typeII-PortSelect-r16 SEQUENCE {
                    ...
                    enableAI              BOOLEAN,
                },
                typeII-AI-r16         SEQUENCE {
                    ...
                },
            },
        }
    }
}
```

In another example, an IE CodebookConfig can be modified to support an AI/ML-based method being used to determine the output of the typeII-r16 subtype of the Type II codebook, given a particular input. A Boolean parameter enableAI can be defined in typeII-r16 in that case.

In another embodiment, a BS can configure a UE to include CQI when generating AI/ML-based CSI feedback via RRC configuration. Table 5 is an example of modifying an IE CodebookConfig to configure an AI/ML-based codebook that includes CQI when generating/reporting CSI feedback. For CodebookConfig, encodeCQI, if present, determines whether CQI should be included when CSI feedback is generated; cqi-FormatIndicator, if present, indicates whether wideband CQI or per-subband CQI has been computed. cqi-Table, if present, indicates the CQI table that has been used to calculate CQI; this can be used as assistance information for training an AI/ML-based CSI feedback/report method.

TABLE 5

```
CodebookConfig ::= SEQUENCE {
    codebookType       CHOICE {
        type1   SEQUENCE {
            ...
        },
        type2   SEQUENCE {
            ...
        },
        typeAI         SEQUENCE {
            encodeCQI       BOOLEAN OPTIONAL, -- Need M
            cqi-FormatIndicator ENUMERATED { widebandCQI, subbandCQI } OPTIONAL,
-- Need R
            cqi-Table           ENUMERATED {table1, table2, table3, spare} OPTIONAL, -- Need
R
            ...
        },
    }
}
``` enableAI is enabled, then an AI/ML-based method is used to determine the output of the Port Selection subtype of the Type II codebook, given a particular input. In one example, an AI/ML-based method can determine the size of the port In another embodiment, a BS can configure a UE to support frequency hopping for AI/ML-based codebooks via RRC configuration, where this BS has already configured frequency hopping for CSI-RS to this UE. Table 6 is an example of modifying an IE CodebookConfig to configure an AI/ML-based codebook for generating/reporting CSI feedback that supports frequency hopping for CSI-RS. For CodebookConfig, frequencyHopping, if present, determines whether a CSI-RS pattern that corresponds to this AI/ML-based codebook hops within a slot or between slots; frequencyHoppingOffset, if present, determines the hopping pattern of this CSI-RS pattern across the available SBs. In another example, the frequency hopping can be configured via IE NZP-CSI-RS-Resource that configures a NZP CSI-RS resource, or via IE CSI-ResourceConfig that configures S≥1 CSI resource sets, or via IE CSI-ReportConfig that configures a CSI report.

In one example, the PDSCH-ServingCellConfig IE can include training/inference assistance information from other UEs, including training error (e.g., cosine similarity, NMSE, etc.), hyperparameters (e.g., learning rate, number of training epochs, split between training and testing data, etc.), etc. In another example, the PDSCH-ServingCellConfig IE can include training instructions, including a command for a UE to train both an encoder and a decoder for an AI/ML-based codebook and then report the trained encoder/decoder parameters to a BS; a UE can also be commanded to only train an encoder for an AI/ML-based codebook (and use the parameters for a trained decoder from a BS).

TABLE 6

```
CodebookConfig ::= SEQUENCE {
   codebookType   CHOICE {
      type1   SEQUENCE {
         ...
      },
      type2   SEQUENCE {
         ...
      },
      typeAI      SEQUENCE {
         frequencyHopping   ENUMERATED {intraSlot, interSlot} OPTIONAL, -- Need
S
         frequencyHoppingOffset   SEQUENCE (SIZE(1..numHops)) OF INTEGER
(1..numSubBands) OPTIONAL, -- Need M
         ...
      },
   }
}
```

In another embodiment, a BS can configure a UE to train AI/ML-based codebooks via RRC configuration. Table 7 is an example of modifying an IE PDSCH-ServingCellConfig to configure training of AI/ML-based codebooks. For PDSCH-ServingCellConfig, mlEncoderParams, if present, can include at least one set of mlEncoderTrainParams; each set of mlEncoderTrainParams can include trained encoder weights and biases for another UE that has trained an AI-based codebook. These trained encoder weights and biases can assist this UE in training an AI/ML-based codebook. mlDecoderParams, if present, can include trained decoder weights and biases; in one example, these decoder weights and biases can be obtained from training at a BS. In another example, each UE can train its own decoder and then report its trained decoder weights and biases to a BS, which can then average them and report these averaged values in mlDecoderParams. The information in mlEncoderParams and mlDecoderParams can be tagged with the ID for the corresponding codebook, e.g., the ID of the corresponding CSI-ResourceConfig, the ID of the corresponding CORESET pool, etc.

In one embodiment, a new MAC CE can be defined for the UE assistance information report. This MAC CE can be identified by a MAC subheader with a logical channel ID that can be specified in Table 6.2.1-2 in [3]. This MAC CE can have a variable size and consist of the following fields:

Block Error Rate: This field indicates the observed block error rate of the UE, e.g., the block error rate that has been computed over the last 1000 received transport blocks.

Throughput: This field indicates the observed throughput of the UE, e.g., the throughput in megabits/second that has been computed over the last 1000 received transport blocks.

Estimated Coherence Time: This field indicates the UE's estimate of the DL channel coherence time in milliseconds.

Estimated Coherence Bandwidth: This field indicates the UE's estimate of the DL channel coherence bandwidth in kilohertz.

IR1: This field indicates the presence of the octet(s) containing the Recommended Codebook field. If the IR1 field is set to 1, the octet(s) containing the Recommended Codebook field is (are) present. If the IR1 field is set to 0, the octet(s) containing the Recommended Codebook field is (are) not present.

TABLE 7

```
PDSCH-ServingCellConfig ::= SEQUENCE {
   codebookType         CHOICE {
      ...
      pdsch-MlCodebook   SEQUENCE {
         mlEnabled          BOOLEAN
         mlAlgorithm          INTEGER (1..M)
         mlEncoderParams      SEQUENCE (SIZE (1..numUEs)) of mlEncoderTrainParams
OPTIONAL, -- Need N
         mlDecoderParams  mlDecoderTrainParams OPTIONAL, -- Need N
      },
   }
}
```

Recommended Codebook: This field indicates the UE's recommended codebook for generating/reporting CSI feedback, e.g., an index to a table of codebooks.

IR2: This field indicates the presence of the octet containing the AI-based CB Parameters field. If the IR2 field is set to 1, the octet containing the AI-based CB Parameters field is present. If the IR2 field is set to 0, the octet containing the AI-based CB Parameters field is not present.

AI-based CB Parameters: This field indicates parameters that correspond to this UE's trained AI/ML-based CSI feedback/report method, e.g., a set of trained weights and biases.

IR3: This field indicates the presence of the octet containing the Train/Infer Assistance Info field. If the IR3 field is set to 1, the octet containing the Train/Infer Assistance Info field is present. If the IR3 field is set to 0, the octet containing the Train/Infer Assistance Info field is not present.

Train/Infer Assistance Info: This field indicates training/ inference assistance information that corresponds to this UE's trained AI/ML-based CSI feedback/report method, e.g., training error, hyperparameters, etc.

Figure 12:
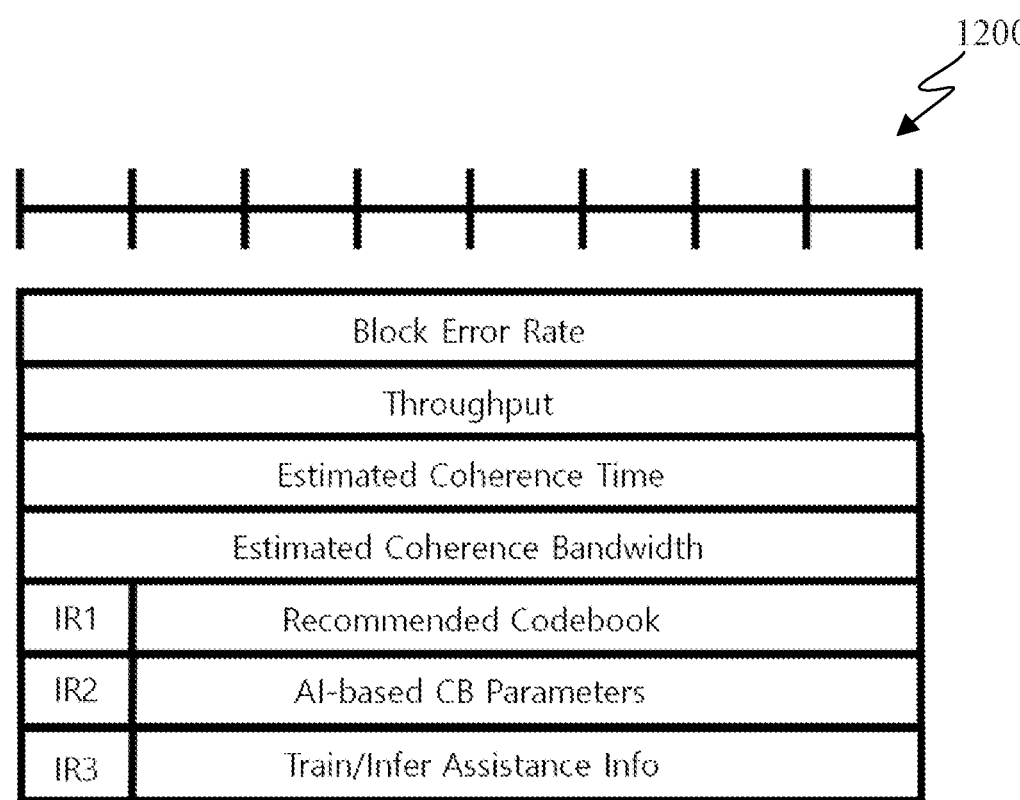
FIG. 12 illustrates an example of a new MAC CE for the UE assistance information report according to embodiments of the present disclosure.

FIG. 12 illustrates an example 1200 of a new MAC CE for the UE assistance information report according to embodiments of the present disclosure. The embodiment of the example 1200 of a new MAC CE for the UE assistance information report illustrated in FIG. 12 is for illustration only. FIG. 12 does not limit the scope of this disclosure to any particular implementation of the example 1200 of a new MAC CE for the UE assistance information report.

As illustrated in FIG. 12, the Block Error Rate, UE Throughput, Estimated Coherence Time, and Estimated Coherence Bandwidth fields each have a length of 8 bits. The Recommended Codebook, AI-based CB Parameters, and the Train/Infer Assistance Info fields each have a length of 7 bits.

In one embodiment, a new MAC CE can be defined for the conventional CSI fallback request. This MAC CE can be identified by a MAC subheader with a logical channel ID that can be specified in Table 6.2.1-2 in [3]. This MAC CE can have a variable size and consist of the following fields:

Conventional CB Fallback: This field can include one or more of the following information:

Conventional codebook type, e.g., Type II

Conventional codebook sub-type, e.g., a component of a conventional codebook

For example, if one codebook has been configured for each CSI-ResourceConfig, then the Conventional CB Fallback field can include the ID of the conventional codebook for a particular CSI-ResourceConfig. In another example, if one codebook has been configured for each CORESET pool, then the Conventional CB Fallback field can include the ID of the conventional codebook for a particular CORESET pool.

Figure 13:
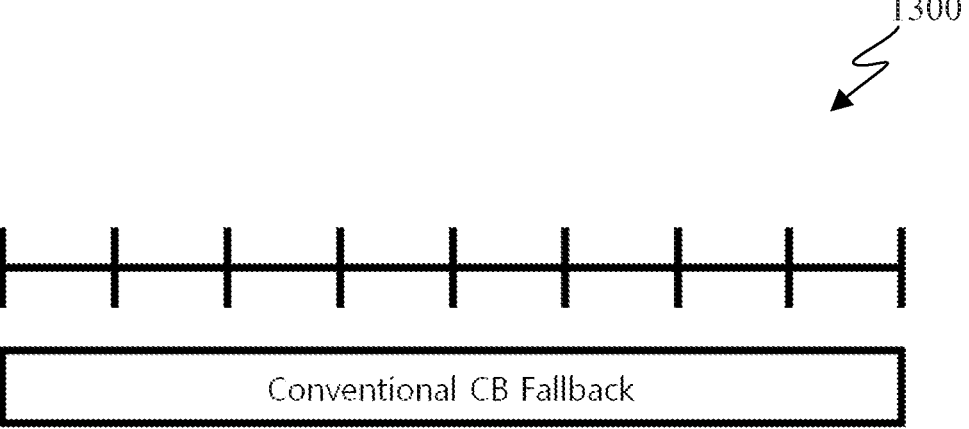
FIG. 13 illustrates an example of a new MAC CE for the conventional CSI fallback report according to embodiments of the present disclosure.

FIG. 13 illustrates an example 1300 of a new MAC CE for the conventional CSI fallback report according to embodiments of the present disclosure. The embodiment of the example 1300 of a new MAC CE for the conventional CSI fallback report illustrated in FIG. 13 is for illustration only. FIG. 13 does not limit the scope of this disclosure to any particular implementation of the example 1300 of a new MAC CE for the conventional CSI fallback report.

As illustrated in FIG. 13, the Conventional CB Fallback field has a length of 8 bits.

Figure 14:
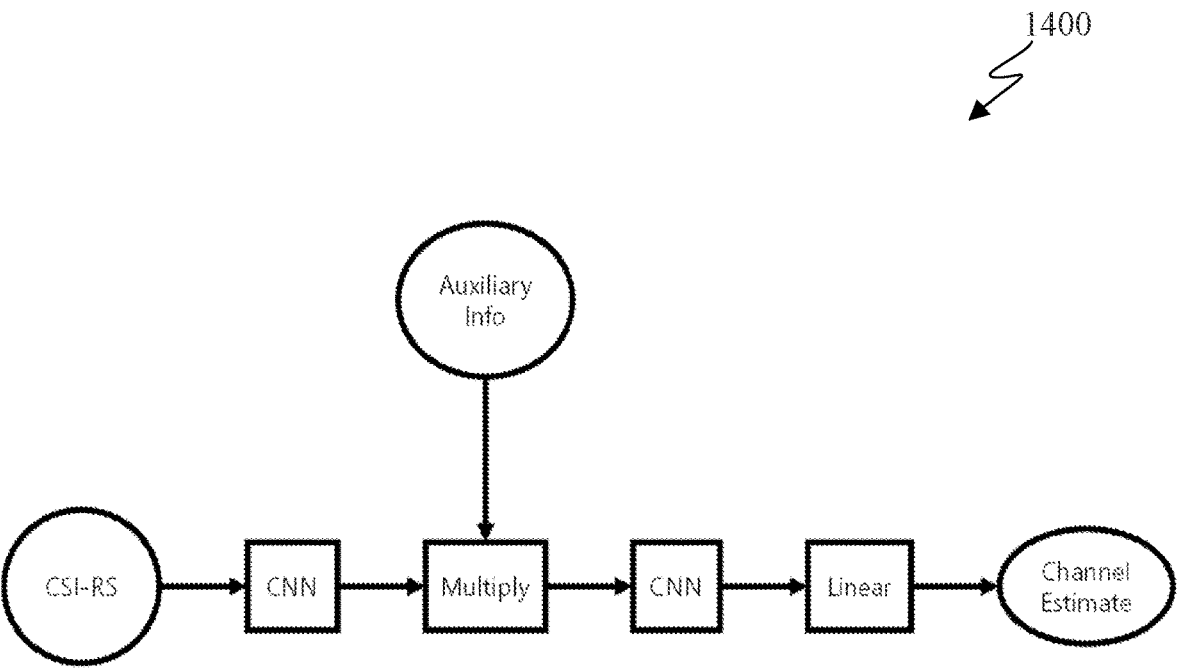
FIG. 14 illustrates an example of an AI/ML model architecture to support a subtype of a conventional codebook according to embodiments of the present disclosure.

FIG. 14 illustrates an example 1400 of an AI/ML model architecture to support a subtype of a conventional codebook according to embodiments of the present disclosure. The embodiment of the example 1400 of an AI/ML model architecture to support a subtype of a conventional codebook illustrated in FIG. 14 is for illustration only. FIG. 14 does not limit the scope of this disclosure to any particular implementation of the example 1400 of an AI/ML model architecture to support a subtype of a conventional codebook.

FIG. 14 illustrates an example of an AI/ML model architecture that can support training/inference of a subtype of a conventional codebook. A standard CNN can be augmented in this example with auxiliary information; examples of auxiliary information are included below.

In each slot, the full two-dimensional (number of Rx dimensions by number of Tx dimensions) channel over all subcarriers and OFDM symbols is provided as input to this AI/ML model architecture, where all REs that do not contain CSI-RS are filled with zeros.

Examples of inputs to an AI/ML model that can support training/inference of a subtype of a conventional codebook include:

Full two-dimensional received channel over all subcarriers and OFDM symbols for one slot All REs that do not contain CSI-RS are filled with zeros Ground truth of full two-dimensional channel over all subcarriers and OFDM symbols for one slot For example, this can be obtained via ideal channel estimation In another example, this can be obtained via a realistic channel estimation method (e.g., LS, LMMSE)

This can be a training label

Auxiliary information

UE speed

UE acceleration/deceleration

UE trajectory

UE location

Coherence time

Coherence bandwidth

Delay spread

Doppler spread

Block error rate

Throughput

Examples of outputs from an AI/ML model that can support training/inference of a subtype of a conventional codebook include:

Full two-dimensional estimated channel over all subcarriers and OFDM symbols for one slot Parameters for a subtype of a conventional codebook These parameters can be determined from the "Linear" layer in the architecture in FIG. 14

SD basis type (e.g., orthogonal DFT or non-orthogonal DFT, oversampling/rotation factor of DFT basis, DCT, Eigen/SVD-basis)

FD basis type (e.g., orthogonal DFT or non-orthogonal DFT, oversampling/rotation factor of DFT basis, DCT, Eigen/SVD-basis)

DD basis type (e.g., orthogonal DFT or non-orthogonal DFT, oversampling/rotation factor of DFT basis, DCT, Eigen/SVD-basis)

Number of SD beams or basis vectors

Number of FD beams or basis vectors

Number of time domain (TD) or Doppler domain (DD) beams or basis vectors

Whether separate SD/FD/TD/DD basis or joint basis across 2 or 3 of (SD, FD, TD/DD).

Number of nonzero coefficients

Size of PSK alphabet for coefficient phase

Resolution or size (number of bits) of coefficient amplitude codebook

Number of layers (rank value) or max number of layers (or max rank value)

In one example, a BS can configure a UE to report its current resource utilization (e.g., FLOPs, memory usage, power consumption). Given the reported resource utilization, a BS can configure a UE to apply either an AI/ML-based CSI feedback/report method (e.g., a BS can select from among several candidate AI/ML-based CSI feedback/report methods, where each method corresponds to a certain resource utilization level) or a conventional CSI feedback/report method.

In another example, a BS can include a resource utilization threshold in configuration information for a UE. If a UE determines that the resource utilization is equal or higher than the resource utilization threshold, then the UE may use a conventional method to determine the CSI report to not exacerbate its resource utilization (as using an ML-based method may be resource-intensive). On the other hand, if the UE determines that the resource utilization is lower than the resource utilization threshold, then the UE may use an ML-based method to determine the CSI report.

In another example, a BS can configure a UE to select either an AI/ML-based CSI feedback/report method from among several candidate AI/ML-based CSI feedback/report methods (where each method corresponds to a certain resource utilization level) or a conventional CSI feedback/report method. A BS can also configure a UE to report its current resource utilization along with an indication of its selected method.

In another example, a BS can configure a UE with a set of resource utilization levels, e.g., {25%, 50%, 75%, 100%}, and a UE reports a single value from that set. Based on the reported value, a BS can configure a UE to apply either an AI/ML-based CSI feedback/report method (e.g., a BS can select from among several candidate AI/ML-based CSI feedback/report methods, where each method corresponds to a certain resource utilization level) or a conventional CSI feedback/report method.

In another example, a BS can configure a UE to measure and report several DL channel statistics (e.g., coherence bandwidth, coherence distance). Based on the reported DL channel statistics, a BS can configure a UE to apply either an AI/ML-based CSI feedback/report method or a conventional CSI feedback/report method (e.g., if the coherence bandwidth of the DL channel is small, then the frequency-domain compression performance of an AI/ML-based CSI feedback/report method may be limited).

In another example, a BS can configure a UE with threshold values for several DL channel statistics; a UE can then apply either an AI/ML-based CSI feedback/report method or a conventional CSI feedback/report method, depending on its measured DL channel statistics relative to the configured thresholds (e.g., if the coherence bandwidth of the DL channel lies below the corresponding configured threshold, then a UE can apply a conventional CSI feedback/report method).

In another example, BS can include a channel similarity threshold in configuration information for a UE. If a UE determines that the channel similarity value is equal to or higher than the channel similarity threshold, then the UE may use a conventional method to determine the CSI report. On the other hand, if the UE determines that the channel similarity value is lower than the channel similarity threshold, then the UE may use an ML-based method to determine the CSI report, as an ML-based method can outperform conventional methods in predicting the channel behavior when the channels are dissimilar or non-linear.

In another example, a BS can configure a UE with a set of reference channels (e.g., each element of that set can be an N-by-K complex matrix, where N corresponds to the number of antennas, and K corresponds to the number of SBs), a similarity metric (e.g., NMSE), and a similarity threshold. A UE can then compute the similarity between its measured DL channel and each of the elements in the set of reference channels; if any of these similarity values exceeds the similarity threshold, then a UE can apply an AI/ML-based CSI feedback/report method (otherwise, a UE can apply a conventional CSI feedback/report method). A BS can also configure a UE to report its computed similarity values along with the CSI feedback/report method that it has selected.

In other embodiments, for illustrative purposes, a term "AI/ML-based CSI configuration recommender" is used to refer to a method for generating CSI configuration recommendations, where:

the "AI/ML-based CSI configuration recommender" can utilize a machine which utilizes pre-calculated and/or pre-stored CSI for the purpose of offline training the "AI/ML-based CSI configuration recommender" can also utilize a machine which utilizes newly-collected CSI for the purpose of online training the "AI/ML-based CSI configuration recommender" can also utilize multiple machines, e.g., a gNB and multiple UEs, for the purpose of federated learning.

In terms of AI/ML model architecture, the "AI/ML-based CSI configuration recommender" can utilize a single- or multiple-layer of a CNN. The "AI/ML-based CSI configuration recommender" can also utilize an RNN. The "AI/ML-based CSI configuration recommender" can also utilize a TNN.

Other terms that refer to a same method can also be used.

FIG. 15 illustrates an example method 1500 for operations at a BS to support a UE-assisted CSI configuration recommendation according to embodiments of the present disclosure. The embodiment of the example method 1500 for operations at a BS to support a UE-assisted CSI configuration recommendation illustrated in FIG. 15 is for illustration only. FIG. 15 does not limit the scope of this disclosure to any particular implementation of the example method 1500 for operations at a BS to support a UE-assisted CSI configuration recommendation.

As illustrated in FIG. 15, the method 1500 begins at operation 1502, where a BS (such as the BS 102) receives UE capability information from a UE, including the support of a method for generating a CSI configuration recommendation for CSI feedback. In one example, this method can correspond to an ML approach. At operation 1504, the BS sends configuration information to the UE, which can include configuration information such as enabling/disabling of a method for generating a CSI configuration recommendation, a method to be used, method parameters, and/or whether method parameter updates reported by the UE will be used or not. In one example, this method can correspond to an ML approach. At operation 1506, the BS sends a conventional CSI feedback configuration message to the UE. In one example, this message can correspond to the CSI feedback based on the Type II codebook (cf. 5.2.2.2.3/4/5/6/7, [4]). In one example, this message can correspond to the CSI feedback based on the Type I codebook (cf. 5.2.2.2.1/2, [4]) or the Type II codebook (cf. 5.2.2.2.3/4/5/6/7, [4]). At operation 1508, the BS receives a CSI report from the UE that has been generated based on a conventional feedback/report method. In one example, this method can correspond to the CSI feedback based on the Type II codebook. In one example, this method can correspond to the CSI feedback based on the Type I codebook or the Type II codebook. At operation 1510, the BS receives a message from the UE that indicates a CSI configuration recommendation for subsequent CSI reports. One example of a CSI configuration recommendation is a bitmap for a coefficient matrix, which will be described in the "Bitmap variations" section later in this disclosure. In one example, a dedicated/new MAC CE can be used for this message (which will be described in the "UE assistance information" section later in this disclosure), or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback as, e.g., a 1-bit indication in a CSI report. In another example, this message can be sent independent of a CSI report. At operation 1512, the BS sends a message to the UE that indicates a response to a CSI configuration recommendation for subsequent CSI reports. In one example, a dedicated/new MAC CE can be used for this message (which will be described in the "UE assistance information" section later in this disclosure), or an existing MAC CE can be used for this message. In another example, this message can be sent on the PDCCH, where a new DCI format can be defined for this message, or an existing DCI format can be used for this message. If an existing DCI format is used for this message, this indication can be included as a part of DCI as, e.g., a 1-bit indication. At operation 1514, the BS receives a CSI report from the UE where the UE has applied a CSI configuration recommendation to generate this report.

In another example, at operation 1512, the BS can send an ACK/NACK to the UE in response to a CSI configuration recommendation for subsequent CSI reports. If the BS sends an ACK, then the BS receives a CSI report from the UE where the UE has applied a CSI configuration recommendation to generate this report in operation 1514. If the BS sends a NACK, then the BS receives a conventional CSI report from the UE in operation 1514.

In another example, the BS does not respond to a CSI configuration recommendation for subsequent CSI reports. In this case, operation 1512 does not need to be performed. In one example, the UE does not apply its CSI configuration recommendation for subsequent CSI reports in operation 1514. In another example, the BS can configure the UE to automatically apply its CSI configuration recommendations for subsequent CSI reports; in this case, a UE will apply its CSI configuration recommendation for subsequent CSI reports in operation 1514.

In another example, the BS can include a configuration message regarding a conventional CSI feedback/report method to a UE in operation 1504. In this case, operation 1506 does not need to be performed; the BS can begin receiving conventional CSI reports from the UE in operation 1508.

In another example, the BS can enable/disable operations 1510 and 1514, e.g., via RRC configuration. If these operations are disabled, then the BS continues receiving conventional CSI reports from the UE in operation 1508.

FIG. 16 illustrates an example method 1600 for operations at a UE to support a UE-assisted CSI configuration recommendation according to embodiments of the present disclosure. The embodiment of the example method 1600 for operations at a UE to support a UE-assisted CSI configuration recommendation illustrated in FIG. 16 is for illustration only. FIG. 16 does not limit the scope of this disclosure to any particular implementation of the example method 1600 for operations at a UE to support a UE-assisted CSI configuration recommendation.

As illustrated in FIG. 16, the method 1600 begins at operation 1602, where a UE (such as the UE 116) reports capability information to a BS, including the support of a method for generating a CSI configuration recommendation for CSI feedback. In one example, this method can correspond to an ML approach. At operation 1604, the UE receives configuration information from the BS, which can include configuration information such as enabling/disabling of a method for generating a CSI configuration recommendation, a method to be used, method parameters, and/or whether method parameter updates reported by the UE will be used or not. In one example, this method can correspond to an ML approach. At operation 1606, the UE receives a conventional CSI feedback configuration message from the BS. In one example, this message can correspond to the CSI feedback based on the Type II codebook. In one example, this message can correspond to the CSI feedback based on the Type I codebook or the Type II codebook. At operation 1608, the UE sends CSI reports to the BS that have been generated by a conventional feedback/report method. In one example, this method can correspond to the CSI feedback based on the Type II codebook. In one example, this method can correspond to the CSI feedback based on the Type I codebook or the Type II codebook. At operation 1610, the UE sends a message to the BS that indicates a CSI configuration recommendation for subsequent CSI reports. One example of a CSI configuration recommendation is a bitmap for a coefficient matrix, which will be described in the "Bitmap variations" section later in this disclosure. In one example, a dedicated/new MAC CE can be used for this message (which will be described in the "UE assistance information" section later in this disclosure), or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. In another example, this message can be sent independent of a CSI report. At operation 1612, the UE receives a message from the BS that indicates a response to a CSI configuration recommendation for subsequent CSI reports. In one example, a dedicated/new MAC CE can be used for this message (which will be described in the "UE assistance information" section later in this disclosure), or an existing MAC CE can be used for this message. In another example, this message can be sent on the PDCCH, where a new DCI format can be defined for this message, or an existing DCI format can be used for this message. If an existing DCI format is used for this message, this indication can be included as a part of DCI as, e.g., a 1-bit indication. At operation 1614, the UE sends a CSI report to the BS where the UE has applied a CSI configuration recommendation to generate this report.

In another example, at operation 1612, the UE can receive an ACK/NACK from the BS in response to a CSI configuration recommendation for subsequent CSI reports. If the UE receives an ACK, then the UE sends a CSI report to the BS where the UE has applied a CSI configuration recommendation to generate this report in operation 1614. If the UE receives a NACK, then the UE sends a conventional CSI report to the BS in operation 1614.

In another example, the BS does not respond to a CSI configuration recommendation for subsequent CSI reports. In this case, operation 1612 does not need to be performed. In one example, the UE does not apply its CSI configuration recommendation for subsequent CSI reports in operation 1614. In another example, the BS can configure the UE to automatically apply its CSI configuration recommendations for subsequent CSI reports; in this case, the UE will apply its CSI configuration recommendation for subsequent CSI reports in operation 1614.

In another example, the UE can receive a configuration message regarding a conventional CSI feedback/report method from the BS in operation 1604. In this case, operation 1606 does not need to be performed; the UE can begin sending conventional CSI reports to the BS in operation 1608.

In another example, the BS can enable/disable operations 1610 and 1614, e.g., via RRC configuration. If these operations are disabled, then the UE continues sending conventional CSI reports to the BS in operation 1608.

FIG. 17 illustrates an example method 1700 for operations at a BS to support a UE-initiated fallback to a conventional CSI feedback/report method according to embodiments of the present disclosure. The embodiment of the example method 1700 for operations at a BS to support a UE-initiated fallback to a conventional CSI feedback/report method illustrated in FIG. 17 is for illustration only. FIG. 17 does not limit the scope of this disclosure to any particular implementation of the example method 1700 for operations at a BS to support a UE-initiated fallback to a conventional CSI feedback/report method.

As illustrated in FIG. 17, the method 1700 begins at operation 1702, where a BS (such as the BS 102) receives UE capability information from a UE, including the support of a method for generating a CSI configuration recommendation for CSI feedback. In one example, this method can correspond to an ML approach. At operation 1704, the BS sends configuration information to the UE, which can include configuration information such as enabling/disabling of a method for generating a CSI configuration recommendation, a method to be used, method parameters, and/or whether method parameter updates reported by the UE will be used or not. In one example, this method can correspond to an ML approach. At operation 1706, the BS sends a conventional CSI feedback configuration message to the UE. In one example, this message can correspond to the CSI feedback based on the Type II codebook (cf. 5.2.2.2.3/ 4/5/6/7, [4]). In one example, this message can correspond to the CSI feedback based on the Type I codebook (cf. 5.2.2.2.1/2, [4]) or the Type II codebook (cf. 5.2.2.2.3/4/5/ 6/7, [4]). At operation 1708, the BS receives a CSI report from the UE that has been generated based on a conventional feedback/report method. In one example, this method can correspond to the CSI feedback based on the Type II codebook. In one example, this method can correspond to the CSI feedback based on the Type I codebook or the Type II codebook. At operation 1710, the BS receives a message from the UE that indicates a CSI configuration recommendation for subsequent CSI reports. One example of a CSI configuration recommendation is a bitmap for a coefficient matrix, which will be described in the "Bitmap variations" section later in this disclosure. In one example, a dedicated/ new MAC CE can be used for this message (which will be described in the "UE assistance information" section later in this disclosure), or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback as, e.g., a 1-bit indication in a CSI report. In another example, this message can be sent independent of a CSI report. At operation 1712, the BS sends a message to the UE that indicates a response to a CSI configuration recommendation for subsequent CSI reports. In one example, a dedicated/new MAC CE can be used for this message (which will be described in the "UE assistance information" section later in this disclosure), or an existing MAC CE can be used for this message. In another example, this message can be sent on the PDCCH, where a new DCI format can be defined for this message, or an existing DCI format can be used for this message. If an existing DCI format is used for this message, this indication can be included as a part of DCI as, e.g., a 1-bit indication. At operation 1714, the BS receives a CSI report from the UE where the UE has applied a CSI configuration recommendation to generate this report. At operation 1716, the BS receives a message from the UE that corresponds to a request to fall back to a conventional CSI feedback/report method, which will be described in the "Conventional CSI fallback request" section later in this disclosure. In one example, this method can correspond to the CSI feedback based on the Type II codebook. In one example, this method can correspond to the CSI feedback based on the Type I codebook or the Type II codebook. At operation 1718, the BS sends a conventional CSI feedback configuration message to the UE. In one example, this message can correspond to the CSI feedback based on the Type II codebook. In one example, this message can correspond to the CSI feedback based on the Type I codebook or the Type II codebook. At operation 1720, a BS receives CSI reports from the UE that have been generated by a conventional feedback/report method. In one example, this method can correspond to the CSI feedback based on the Type II codebook. In one example, this method can correspond to the CSI feedback based on the Type I codebook or the Type II codebook.

In another example, at operation 1712, the BS can send an ACK/NACK to the UE in response to a CSI configuration recommendation for subsequent CSI reports. If the BS sends an ACK, then the BS receives a CSI report from the UE where the UE has applied a CSI configuration recommendation to generate this report in operation 1714. If the BS sends a NACK, then the BS receives a conventional CSI report from the UE in operation 1714.

In another example, the BS does not respond to a CSI configuration recommendation for subsequent CSI reports. In this case, operation 1712 does not need to be performed. In one example, the UE does not apply its CSI configuration recommendation for subsequent CSI reports in operation 1714. In another example, the BS can configure the UE to automatically apply its CSI configuration recommendations for subsequent CSI reports; in this case, the UE will apply its CSI configuration recommendation for subsequent CSI reports in operation 1714.

In another example, the BS can include a configuration message regarding a conventional CSI feedback/report method to the UE in operation 1704. In this case, operation 1706 does not need to be performed; the BS can begin receiving conventional CSI reports from the UE in operation 1708.

In another example, the BS can enable/disable operations 1710 and 11714, e.g., via RRC configuration. If these operations are disabled, then the BS continues receiving conventional CSI reports from the UE in operation 1708.

FIG. 18 illustrates an example method 1800 for operations at a UE to support a UE-initiated fallback to a conventional CSI feedback/report method according to embodiments of the present disclosure. The embodiment of the example method 1800 for operations at a UE to support a UE-initiated fallback to a conventional CSI feedback/report method illustrated in FIG. 18 is for illustration only. FIG. 18 does not limit the scope of this disclosure to any particular implementation of the example method 1800 for operations at a UE to support a UE-initiated fallback to a conventional CSI feedback/report method.

As illustrated in FIG. 18, the method 1800 begins at operation 1802, where a UE (such as the UE 116) reports capability information to a BS, including the support of a method for generating a CSI configuration recommendation for CSI feedback. In one example, this method can correspond to an ML approach. At operation 1804, the UE receives configuration information from the BS, which can include configuration information such as enabling/disabling of a method for generating a CSI configuration recommendation, a method to be used, method parameters, and/or whether method parameter updates reported by the UE will be used or not. In one example, this method can correspond to an ML approach. At operation 1806, the UE receives a conventional CSI feedback configuration message from the BS. In one example, this message can correspond to the CSI feedback based on the Type II codebook. In one example, this message can correspond to the CSI feedback based on the Type I codebook or the Type II codebook. At operation 1808, the UE sends CSI reports to the BS that have been generated by a conventional feedback/report method. In one example, this method can correspond to the CSI feedback based on the Type II codebook. In one example, this method can correspond to the CSI feedback based on the Type I codebook or the Type II codebook. At operation 1810, the UE sends a message to the BS that indicates a CSI configuration recommendation for subsequent CSI reports. One example of a CSI configuration recommendation is a bitmap for a coefficient matrix, which will be described in the "Bitmap variations" section later in this disclosure. In one example, a dedicated/new MAC CE can be used for this message (which will be described in the "UE assistance information" section later in this disclosure), or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. In another example, this message can be sent independent of a CSI report. At operation 1812, the UE receives a message from the BS that indicates a response to a CSI configuration recommendation for subsequent CSI reports. In one example, a dedicated/new MAC CE can be used for this message (which will be described in the "UE assistance information" section later in this disclosure), or an existing MAC CE can be used for this message. In another example, this message can be sent on the PDCCH, where a new DCI format can be defined for this message, or an existing DCI format can be used for this message. If an existing DCI format is used for this message, this indication can be included as a part of DCI as, e.g., a 1-bit indication. At operation 1814, a UE sends a CSI report to the BS where the UE has applied a CSI configuration recommendation to generate this report. At operation 1816, the UE sends a message to the BS that corresponds to a request to fall back to a conventional CSI feedback/report method, which will be described in the "Conventional CSI fallback request" section later in this disclosure. In one example, this method can correspond to the CSI feedback based on the Type II codebook. In one example, this method can correspond to the CSI feedback based on the Type I codebook or the Type II codebook. At operation 1818, the UE receives a conventional CSI feedback configuration message from the BS. In one example, this message can correspond to the CSI feedback based on the Type II codebook. In one example, this message can correspond to the CSI feedback based on the Type I codebook or the Type II codebook. At operation 1820, the UE sends CSI reports to the BS that have been generated by a conventional feedback/report method. In one example, this method can correspond to the CSI feedback based on the Type II codebook. In one example, this method can correspond to the CSI feedback based on the Type I codebook or the Type II codebook.

In another example, at operation 1812, the UE can receive an ACK/NACK from the BS in response to a CSI configuration recommendation for subsequent CSI reports. If the UE receives an ACK, then the UE sends a CSI report to the BS where the UE has applied a CSI configuration recommendation to generate this report in operation 1814. If the UE receives a NACK, then the UE sends a conventional CSI report to the BS in operation 1814.

In another example, the BS does not respond to a CSI configuration recommendation for subsequent CSI reports. In this case, operation 1812 does not need to be performed. In one example, the UE does not apply its CSI configuration recommendation for subsequent CSI reports in operation 1814. In another example, the BS can configure the UE to automatically apply its CSI configuration recommendations for subsequent CSI reports; in this case, the UE will apply its CSI configuration recommendation for subsequent CSI reports in operation 1814.

In another example, the UE can receive a configuration message regarding a conventional CSI feedback/report method from the BS in operation 1804. In this case, operation 1806 does not need to be performed; the UE can begin sending conventional CSI reports to the BS in operation 1808.

In another example, the BS can enable/disable operations 1810 and 1814, e.g., via RRC configuration. If these operations are disabled, then the UE continues sending conventional CSI reports to the BS in operation 1808.

Figure 19:
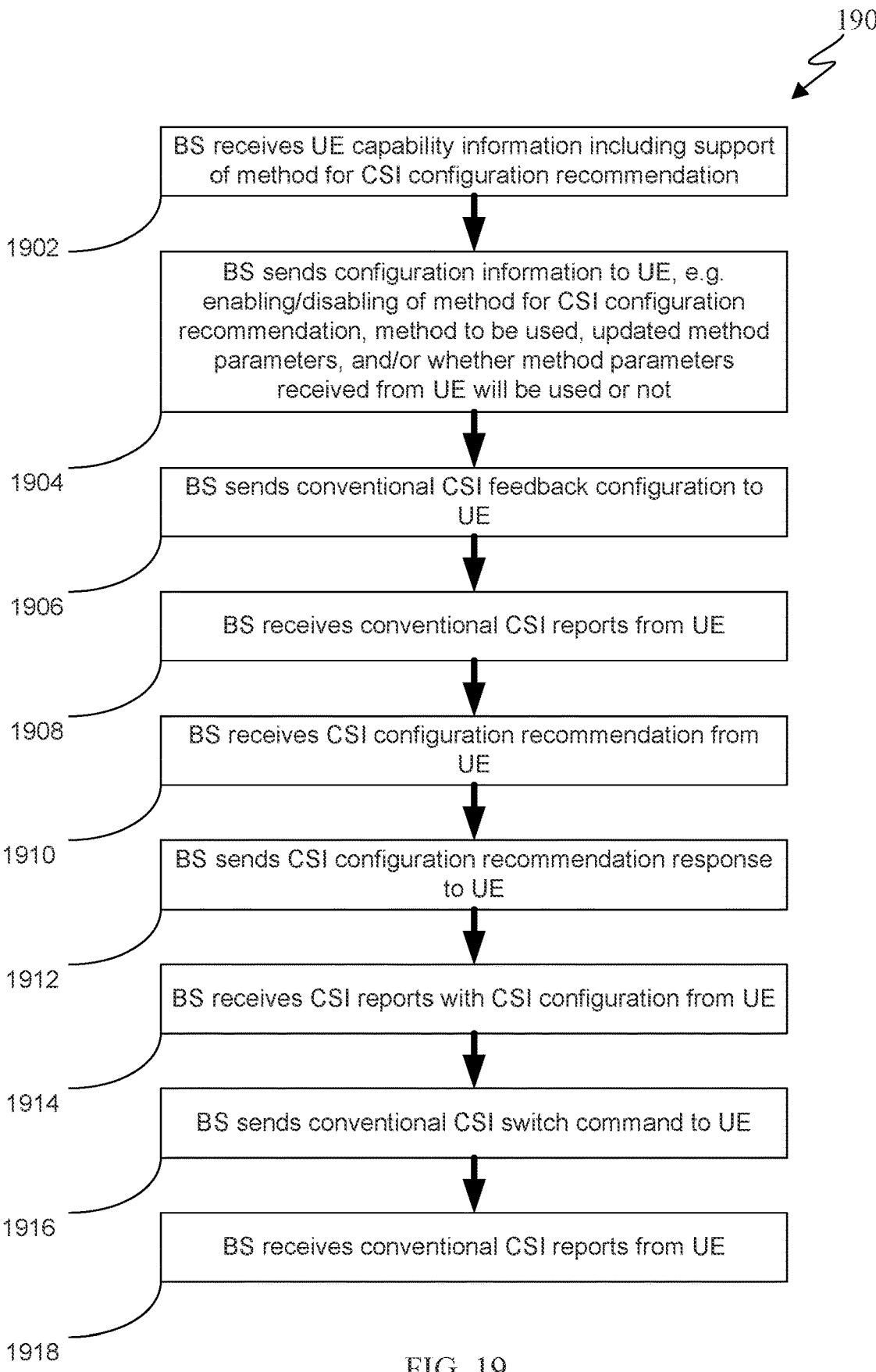
FIG. 19 illustrates an example method for operations at a BS to support a BS-initiated or BS-controlled fallback to a conventional CSI feedback/report method according to embodiments of the present disclosure.

FIG. 19 illustrates an example method 1900 for operations at a BS to support a BS-initiated or BS-controlled fallback to a conventional CSI feedback/report method according to embodiments of the present disclosure. The embodiment of the example method 1900 for operations at a BS to support a BS-initiated or BS-controlled fallback to a conventional CSI feedback/report method illustrated in FIG. 19 is for illustration only. FIG. 19 does not limit the scope of this disclosure to any particular implementation of the example method 1900 for operations at a BS to support a BS-initiated or BS-controlled fallback to a conventional CSI feedback/report method.

As illustrated in FIG. 19, the method 1900 begins at operation 1902, where a BS (such as the BS 102) receives UE capability information from a UE, including the support of a method for generating a CSI configuration recommendation for CSI feedback. In one example, this method can correspond to an ML approach. At operation 1904, the BS sends configuration information to the UE, which can include ML-related configuration information such as enabling/disabling of a method for generating a CSI configuration recommendation, a method to be used, method parameters, and/or whether method parameter updates reported by the UE will be used or not. In one example, this method can correspond to an ML approach. At operation 1906, the BS sends a conventional CSI feedback configuration message to the UE. In one example, this message can correspond to the CSI feedback based on the Type II codebook. In one example, this message can correspond to the CSI feedback based on the Type I codebook or the Type II codebook. At operation 1908, the BS receives CSI reports from the UE that have been generated by a conventional feedback/report method. In one example, this method can correspond to the CSI feedback based on the Type II codebook. In one example, this method can correspond to the CSI feedback based on the Type I codebook or the Type II codebook. At operation 1910, the BS receives a message from the UE that indicates a CSI configuration recommendation for subsequent CSI reports. One example of a CSI configuration recommendation is a bitmap for a coefficient matrix, which will be described in the "Bitmap variations" section later in this disclosure. In one example, a dedicated/new MAC CE can be used for this message (which will be described in the "UE assistance information" section later in this disclosure), or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback as, e.g., a 1-bit indication in a CSI report. In another example, this message can be sent independent of a CSI report. At operation 1912, the BS sends a message to the UE that indicates a response to a CSI configuration recommendation for subsequent CSI reports. In one example, a dedicated/new MAC CE can be used for this message (which will be described in the "UE assistance information" section later in this disclosure), or an existing MAC CE can be used for this message. In another example, this message can be sent on the PDCCH, where a new DCI format can be defined for this message, or an existing DCI format can be used for this message. If an existing DCI format is used for this message, this indication can be included as a part of DCI as, e.g., a 1-bit indication. At operation 1914, the BS receives a CSI report from the UE where a CSI configuration recommendation has been applied. At operation 1916, the BS sends a message to the UE that corresponds to a command to fall back to a conventional CSI feedback/report method. In one example, this method can correspond to the CSI feedback based on the Type II codebook. In one example, this method can correspond to the CSI feedback based on the Type I codebook or the Type II codebook. At operation 1918, the BS receives CSI reports from the UE that have been generated by a conventional feedback/report method. In one example, this method can correspond to the CSI feedback based on the Type II codebook. In one example, this method can correspond to the CSI feedback based on the Type I codebook or the Type II codebook.

In another example, at operation 1912, the BS can send an ACK/NACK to the UE in response to a CSI configuration recommendation for subsequent CSI reports. If the BS sends an ACK, then the BS receives a CSI report from the UE where a CSI configuration recommendation has been applied in operation 1914. If the BS sends a NACK, then the BS receives a conventional CSI report from the UE in operation 1914.

In another example, the BS does not respond to a CSI configuration recommendation for subsequent CSI reports. In this case, operation 1912 does not need to be performed. In one example, the UE does not apply its CSI configuration recommendation for subsequent CSI reports in operation 1914. In another example, the BS can configure the UE to automatically apply its CSI configuration recommendations for subsequent CSI reports; in this case, the UE will apply its CSI configuration recommendation for subsequent CSI reports in operation 1914.

In another example, the BS can include a configuration message regarding a conventional CSI feedback/report method to the UE in operation 1904. In this case, operation 1906 does not need to be performed; the BS can begin receiving conventional CSI reports from the UE in operation 1908.

In another example, the BS can enable/disable operations 1910 and 1914, e.g., via RRC configuration. If these operations are disabled, then the BS continues receiving conventional CSI reports from the UE in operation 1908.

Figure 20:
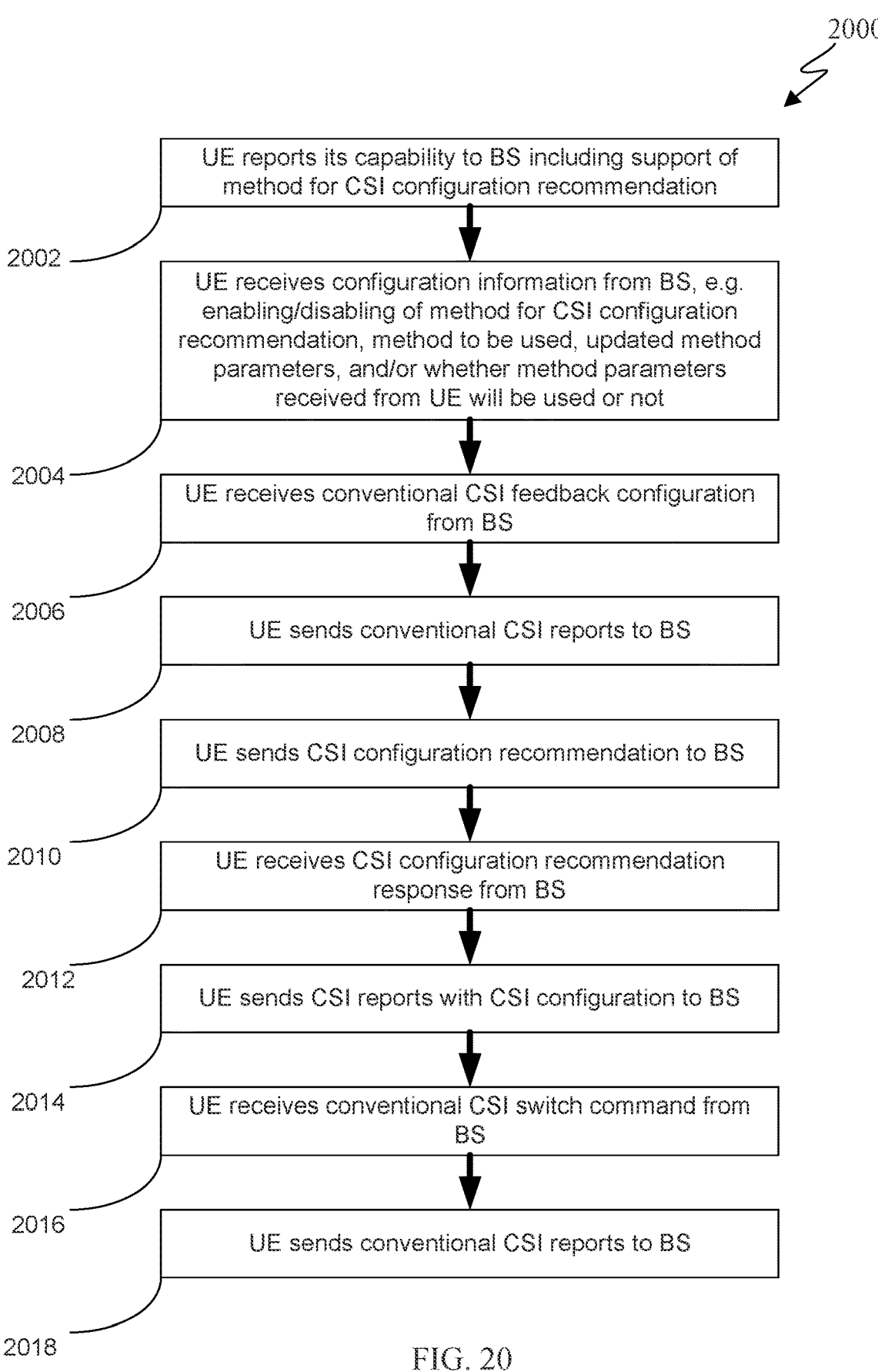
FIG. 20 illustrates an example method for operations at a UE to support a BS-initiated or BS-controlled fallback to a conventional CSI feedback/report method according to embodiments of the present disclosure.

FIG. 20 illustrates an example method 2000 for operations at a UE to support a BS-initiated or BS-controlled fallback to a conventional CSI feedback/report method according to embodiments of the present disclosure. The embodiment of the example method 2000 for operations at a UE to support a BS-initiated or BS-controlled fallback to a conventional CSI feedback/report method illustrated in FIG. 20 is for illustration only. FIG. 20 does not limit the scope of this disclosure to any particular implementation of the example method 2000 for operations at a UE to support a BS-initiated or BS-controlled fallback to a conventional CSI feedback/report method.

As illustrated in FIG. 20, the method 2000 begins at operation 2002, where a UE (such as the UE 116) reports capability information to a BS, including the support of a method for generating a CSI configuration recommendation for CSI feedback. In one example, this method can correspond to an ML approach. At operation 2004, the UE receives configuration information from the BS, which can include configuration information such as enabling/disabling of a method for generating a CSI configuration recommendation, a method to be used, method parameters, and/or whether method parameter updates reported by a UE will be used or not. In one example, this method can correspond to an ML approach. At operation 2006, the UE receives a conventional CSI feedback configuration message from the BS. In one example, this message can correspond to the CSI feedback based on the Type II codebook. In one example, this message can correspond to the CSI feedback based on the Type I codebook or the Type II codebook. At operation 2008, the UE sends CSI reports to the BS that have been generated by a conventional feedback/report method. In one example, this method can correspond to the CSI feedback based on the Type II codebook. In one example, this method can correspond to the CSI feedback based on the Type I codebook or the Type II codebook. At operation 2010, the UE sends a message to the BS that indicates a CSI configuration recommendation for subsequent CSI reports. One example of a CSI configuration recommendation is a bitmap for a coefficient matrix, which will be described in the "Bitmap variations" section later in this disclosure. In one example, a dedicated/new MAC CE can be used for this message (which will be described in the "UE assistance information" section later in this disclosure), or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. In another example, this message can be sent independent of a CSI report. At operation 2012, the UE receives a message from the BS that indicates a response to a CSI configuration recommendation for subsequent CSI reports. In one example, a dedicated/new MAC CE can be used for this message (which will be described in the "UE assistance information" section later in this disclosure), or an existing MAC CE can be used for this message. In another example, this message can be sent on the PDCCH, where a new DCI format can be defined for this message, or an existing DCI format can be used for this message. If an existing DCI format is used for this message, this indication can be included as a part of DCI as, e.g., a 1-bit indication. At operation 2014, the UE sends a CSI report to the BS where the UE has applied a CSI configuration recommendation to generate this report. At operation 2016, the UE receives a message from the BS that corresponds to a command to fall back to a conventional CSI feedback/report method. In one example, this method can correspond to the CSI feedback based on the Type II codebook. In one example, this method can correspond to the CSI feedback based on the Type I codebook or the Type II codebook. At operation 2018, the UE sends CSI reports to the BS that have been generated by a conventional feedback/report method. In one example, this method can correspond to the CSI feedback based on the Type II codebook. In one example, this method can correspond to the CSI feedback based on the Type I codebook or the Type II codebook.

In another example, at operation 2012, the UE can receive an ACK/NACK from the BS in response to a CSI configuration recommendation for subsequent CSI reports. If the UE receives an ACK, then the UE sends a CSI report to the BS where the UE has applied a CSI configuration recommendation to generate this report in operation 2014. If the UE receives a NACK, then the UE sends a conventional CSI report to the BS in operation 2014.

In another example, the BS does not respond to a CSI configuration recommendation for subsequent CSI reports. In this case, operation 2012 does not need to be performed. In one example, a UE does not apply its CSI configuration recommendation for subsequent CSI reports in operation 2014. In another example, the BS can configure the UE to automatically apply its CSI configuration recommendations for subsequent CSI reports; in this case, the UE will apply its CSI configuration recommendation for subsequent CSI reports in operation 2014.

In another example, the UE can receive a configuration message regarding a conventional CSI feedback/report method from the BS in operation 2004. In this case, operation 2006 does not need to be performed; the UE can begin sending conventional CSI reports to the BS in operation 2008.

In another example, the BS can enable/disable operations 2010 and 2014, e.g., via RRC configuration. If these operations are disabled, then the UE continues sending conventional CSI reports to the BS in operation 2008.

When a UE generates CSI feedback based on the Type II codebook, it uses a bitmap to identify non-zero coefficients in a coefficient matrix C that it reports. The dimensions of this bitmap are identical to the dimensions of C.

A CSI configuration recommendation can include a bitmap for C that can differ from the bitmap for the Type II codebook. In one embodiment, a bitmap can consist of a set of columns (or rows) of C. A BS can configure a UE with this set of columns (or rows) of C, or a UE can recommend this set of columns (or rows) of C to a BS.

In one embodiment, a bitmap can consist of multiple sets of columns (or rows) of C. A BS can configure a UE with these sets of columns (or rows) of C, or a UE can recommend these sets of columns (or rows) of C to a BS. Switching between these sets of columns (or rows) of C can be configured as periodic, semi-persistent, or aperiodic. A UE can also recommend a switching configuration between these sets of columns (or rows) of C to a BS.

In one embodiment, a bitmap can consist of a set of indices of C. A BS can configure a UE with this set of indices of C, or a UE can recommend this set of indices of C to a BS.

In one embodiment, a bitmap can consist of multiple sets of indices of C. A BS can configure a UE with these sets of indices of C, or a UE can recommend these sets of indices of C to a BS. Switching between these sets of indices of C can be configured as periodic, semi-persistent, or aperiodic. A UE can also recommend a switching configuration between these sets of indices of C to a BS.

In one embodiment, a BS can configure a UE to send an indication of switching to a CSI configuration recommender via RRC configuration. Table 8 is an example of modifying an IE PUCCH-Config to configure a UE to send this switching indication. In this example, format5, if present, corresponds to a new PUCCH format for this switching indication. CSICfgRecSwitchResourceToAddModList and CSICfgRecSwitchResourceToReleaseList, if present, correspond to PUCCH resources that can be added or released, respectively, for this switching indication. In one example, an existing PUCCH format (e.g., format 3 or 4) can be used for this indication.

TABLE 8

PUCCH-Config ::= SEQUENCE {
  ...
  format5        SetupRelease { PUCCH-FormatConfig } OPTIONAL, -- Need
M
    CSICfgRecSwitchResourceToAddModList      SEQUENCE    (SIZE
(1..maxNrofCSICfgRec-Resources)) of CSICfgRecSwitchResourceConfig OPTIONAL,
-- Need N
    CSICfgRecSwitchResourceToReleaseList      SEQUENCE    (SIZE
(1..maxNrofCSICfgRec-Resources)) of CSICfgRecSwitchResourceId OPTIONAL, --
Need N
  ...
}

In one embodiment, a BS can configure a UE to send an indication of switching to a CSI configuration recommender via MAC CE activation command.

In one embodiment, a BS can configure a UE to send an indication of switching to a CSI configuration recommender via DCI.

In another embodiment, a BS can configure a UE to use a CSI configuration recommender via a PDCCH order, where a new DCI format can be defined and this PDCCH order can be triggered by this new DCI format.

In another example, a BS can configure a UE to use a CSI configuration recommender via MAC CE activation command.

In another example, a BS can configure a UE to use a CSI configuration recommender via RRC configuration. Table 9 is an example of modifying an IE CodebookConfig to configure a UE to use a CSI configuration recommender for generating/reporting CSI feedback. In this example, CSI configuration recommendation(s) can be applied to the Rel-16 subtype of the Type II codebook. For CodebookConfig, enabledRecs, if present, determines which CSI configuration recommenders are enabled; switchSlot, if present, determines the set of slots where these CSI configuration recommenders are enabled. csi-ResourceConfigId, if present, corresponds to the IDs of these CSI configuration recommenders. In one example, one CSI configuration recommender is defined for each CSI-ResourceConfig (with a corresponding entry in csi-ResourceConfigId). In another example, one CSI configuration recommender is defined for all CSI-ResourceConfigs (where each CSI-ResourceConfig has an entry in csi-ResourceConfigId).

reporting CSI feedback. In one example, one CSI configuration recommender can be defined for each supported number of SBs (and/or size of each SB in PRBs). In another example, one CSI configuration recommender can be defined for all supported numbers of SBs (and/or size of each SB in PRBs), where appropriate pre-processing can be performed on the input to this CSI configuration recommender. In another example, all supported numbers of SBs (and/or size of each SB in PRBs) can be split into disjoint sets; one CSI configuration recommender can be defined for each set, where appropriate pre-processing can be performed on the input to this CSI configuration recommender.

The CodebookConfig IE can also be modified to configure a UE to use CSI configuration recommenders for generating/reporting CSI feedback in a multi-TRP system, wherein the UE can receive DL reception from or transmit UL transmission to multiple TRPs. In one example, a TRP is functionally equivalent to (or corresponds to) a NZP CSI-RS resource, or a CSI-RS resource set, or a group of antenna ports. In one example, one CSI configuration recommender is defined for each TRP (where each TRP can belong to a particular CORESET pool; each codebook can have a corresponding CORESET Pool ID). In another example, one CSI configuration recommender is defined for all TRPs (where the CORESET Pool ID for each TRP is mapped to this codebook).

In another embodiment, a BS can configure a UE to support frequency hopping for CSI configuration recommenders via RRC configuration, where this BS has already configured frequency hopping for CSI-RS to this UE. Table 10 is an example of modifying an IE CodebookConfig to

TABLE 9

```
CodebookConfig ::= SEQUENCE {
    codebookType    CHOICE {
        type1    SEQUENCE {
            ...
        },
        type2    SEQUENCE {
            subtype    CHOICE {
                typeII-r16    SEQUENCE {
                    ...
                    CSICfgParams    SEQUENCE {
                        enabledRecs    SEQUENCE (SIZE (1..NrRecs)) OF BOOLEAN OPTIONAL,
-- Need M
                        switchSlot    SEQUENCE (SIZE (1..NrRecs)) OF INTEGER (0..numSlots-
1) OPTIONAL, -- Need M
                        csi-ResourceConfigId    SEQUENCE (SIZE (1..NrCsiResourceConfigs)) OF
INTEGER (1..NrRecs) OPTIONAL, -- Need M
                        ...
                    },
                },
                ...
            },
        ...
    },
}
```

Let (n1, n2) represent the number of antenna ports in the first (n1) and second (n2) dimensions. In one example, one CSI configuration recommender can be defined for each supported combination of (n1, n2). In another example, one CSI configuration recommender can be defined for all supported combinations of (n1, n2), where appropriate pre-processing can be performed on the input to this CSI configuration recommender. In another example, all supported combinations of (n1, n2) can be split into disjoint sets; one CSI configuration recommender can be defined for each set, where appropriate pre-processing can be performed on the input to this CSI configuration recommender.

The CSI-ReportConfig IE includes a field, csi-ReportingBand, that configures the number of SBs for generating/ configure a CSI configuration recommender for generating/reporting CSI feedback that supports frequency hopping for CSI-RS. In this example, CSI configuration recommendation(s) can be applied to the Rel-16 subtype of the Type II codebook. For CodebookConfig, frequencyHopping, if present, determines whether a CSI-RS pattern that corresponds to this CSI configuration recommender hops within a slot or between slots; frequencyHoppingOffset, if present, determines the hopping pattern of this CSI-RS pattern across the available SBs. In another example, the frequency hopping can be configured via IE NZP-CSI-RS-Resource that configures a NZP CSI-RS resource, or via IE CSI-ResourceConfig that configures S≥1 CSI resource sets, or via IE CSI-ReportConfig that configures a CSI report.

TABLE 10

```
CodebookConfig ::= SEQUENCE {
  codebookType   CHOICE {
    type1   SEQUENCE {
      ...
    },
    type2   SEQUENCE {
      subtype   CHOICE {
        typeII-r16   SEQUENCE {
          ...
          CSICfgParams   SEQUENCE {
            frequencyHopping   ENUMERATED {intraSlot, interSlot} OPTIONAL, --
Need S
            frequencyHoppingOffset   SEQUENCE (SIZE(1..numHops)) OF INTEGER
(1..numSubBands) OPTIONAL, -- Need M
          ...
        },
      },
      ...
    },
}
```

In another embodiment, a BS can configure a UE to train an AI/ML-based CSI configuration recommender via RRC configuration. Table 11 is an example of modifying an IE PDSCH-ServingCellConfig to configure training of an AI/ML-based CSI configuration recommender. For PDSCH-ServingCellConfig, mlCSICfgParams, if present, can include at least one set of mlCSICfgTrainParams; each set of mlCSICfgTrainParams can include trained weights and biases for another UE that has trained an AI-based CSI configuration recommender. These trained weights and biases can assist this UE in training an AI/ML-based CSI configuration recommender. The information in mlC-SICfgParams can be tagged with the ID for the corresponding codebook, e.g., the ID of the corresponding CSI-ResourceConfig, the ID of the corresponding CORESET pool, etc.

can be commanded to report a model for coefficient recovery (including trained parameters and model structure) to a BS.

In another example, a BS can train both a model for coefficient puncturing and a model for coefficient recovery for an AI/ML-based CSI configuration recommender. A BS can then signal trained parameters for a model for coefficient puncturing to a UE, along with instructions for operating a model for coefficient puncturing in inference mode (e.g., instructions related to dropout, batch normalization, etc.). A BS can also signal a model for coefficient puncturing (including trained parameters and model structure) to a UE.

In one embodiment, a new MAC CE can be defined for the UE assistance information report. This MAC CE can be identified by a MAC subheader with a logical channel ID that can be specified in Table 6.2.1-2 in [3]. This MAC CE can have a variable size and consist of the following fields:

TABLE 11

```
PDSCH-ServingCellConfig ::= SEQUENCE {
  codebookType   CHOICE {
    ...
    pdsch-MlCSICfg          SEQUENCE {
      mlEnabled             BOOLEAN
      mlAlgorithm           INTEGER (1..M)
      mlCSICfgParams        SEQUENCE (SIZE (1..numUEs)) of mlCSICfgTrainParams
OPTIONAL, -- Need N
    },
  }
}
```

In one example, the PDSCH-ServingCellConfig IE can include training/inference assistance information from other UEs, including training error (e.g., cosine similarity, NMSE, etc.), hyperparameters (e.g., learning rate, number of training epochs, split between training and testing data, etc.), etc. In another example, the PDSCH-ServingCellConfig IE can include training instructions, including a command for a UE to train both a model for coefficient puncturing and a model for coefficient recovery for an AI/ML-based CSI configuration recommender and then report trained parameters for both models to a BS; a UE can also be commanded to only train a model for coefficient puncturing for an AI/ML-based CSI configuration recommender (and use the parameters for a trained model for coefficient recovery from a BS).

If a UE is commanded to report trained parameters for a model for coefficient recovery to a BS, these parameters can serve as recommendations to a BS. In another example, a UE Block Error Rate: This field indicates the observed block error rate of the UE, e.g., the block error rate that has been computed over the last 1000 received transport blocks.

Throughput: This field indicates the observed throughput of the UE, e.g., the throughput in megabits/second that has been computed over the last 1000 received transport blocks.

Estimated Coherence Time: This field indicates the UE's estimate of the DL channel coherence time in milliseconds.

Estimated Coherence Bandwidth: This field indicates the UE's estimate of the DL channel coherence bandwidth in kilohertz.

IR1: This field indicates the presence of the octet(s) containing the Recommended Bitmap field. If the IR1 field is set to 1, the octet(s) containing the Recommended Bitmap field is (are) present. If the IR1 field is set to 0, the octet(s) containing the Recommended Bitmap field is (are) not present.

Recommended Bitmap: This field indicates the UE's recommended bitmap for generating/reporting CSI feedback, e.g., a set of columns of the coefficient matrix.

IR2: This field indicates the presence of the octet containing the Recommended Beams field. If the IR2 field is set to 1, the octet containing the Recommended Beams field is present. If the IR2 field is set to 0, the octet containing the Recommended Beams field is not present.

Recommended Beams: This field indicates the UE's recommended (SD, FD, and/or TD/DD) beams, e.g., a set of beam indices.

IR3: This field indicates the presence of the octet containing the Recommended Layers field. If the IR3 field is set to 1, the octet containing the Recommended Layers field is present. If the IR3 field is set to 0, the octet containing the Recommended Layers field is not present.

Recommended Layers: This field indicates the UE's recommended layers for generating/reporting CSI feedback, e.g., a set of indices of layers.

IR4: This field indicates the presence of the octet containing the Recommended Configuration Type field. If the IR4 field is set to 1, the octet containing the Recommended Configuration Type field is present. If the IR4 field is set to 0, the octet containing the Recommended Configuration Type field is not present.

Recommended Configuration Type: This field indicates the UE's recommended configuration type for generating/reporting CSI feedback with a CSI configuration recommendation, e.g., aperiodic, semi-persistent, periodic. In one example, this recommendation can be based on a UE's prediction of its trajectory (e.g., a UE recommends that a CSI configuration recommendation be triggered only when it will have an LOS path to a BS).

In another example, a UE can generate multiple CSI configuration recommendations (e.g., multiple recommended bitmaps) and recommend periodically applying a particular CSI configuration recommendation when generating/reporting CSI feedback (e.g., apply bitmap #1 when a UE has an LOS path to a BS, apply bitmap #2 when a UE does not have an LOS path to a BS).

IR5: This field indicates the presence of the octet containing the Recommended Basis field. If the IR5 field is set to 1, the octet containing the Recommended Basis field is present. If the IR5 field is set to 0, the octet containing the Recommended Basis field is not present.

Recommended Basis: This field indicates the UE's recommended (SD, FD, and/or TD/DD) basis for generating/reporting CSI feedback, e.g., orthogonal/non-orthogonal DFT, oversampling/rotation factor of DFT, DCT. In one example, a set of (SD, FD, and/or TD/DD) bases can be pre-defined, and a UE can signal a recommended index in that set.

In another example, a UE can recommend a joint basis across (SD, FD, and/or TD/DD) for generating/reporting CSI feedback. This recommendation can be based on a UE's observations of the statistical properties of the space-time-frequency channel. In one example, options for joint bases across (SD, FD, and/or TD/DD) can be included in a pre-defined set, and a UE can signal a recommended index for one of those options in that set.

Figure 21A:
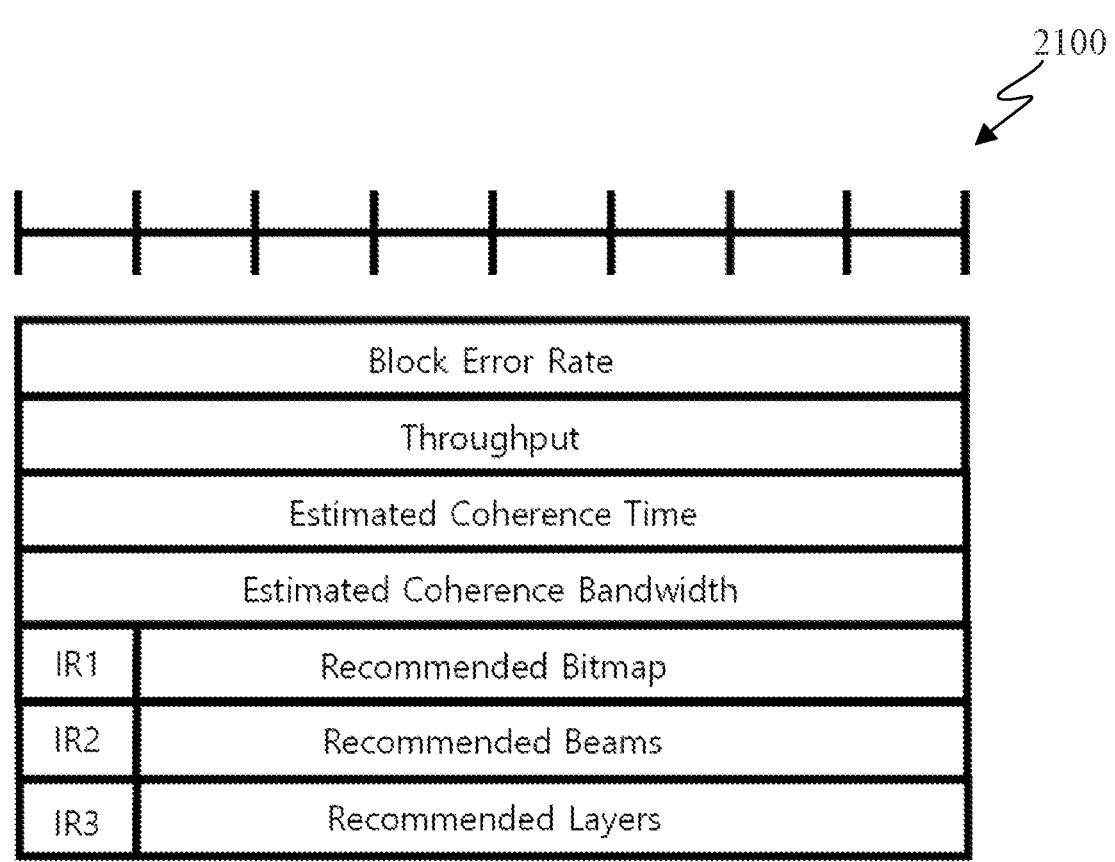
FIG. 21A illustrates an example of a new MAC CE for the UE assistance information report according to embodiments of the present disclosure.

FIG. 21A illustrates an example 2100 of a new MAC CE for the UE assistance information report according to embodiments of the present disclosure. The embodiment of the example 2100 of a new MAC CE for the UE assistance information report illustrated in FIG. 21A is for illustration only. FIG. 21A does not limit the scope of this disclosure to any particular implementation of the example 2100 of a new MAC CE for the UE assistance information report.

FIG. 21A illustrates an example of a new MAC CE for the UE assistance information report, where the Block Error Rate, UE Throughput, Estimated Coherence Time, and Estimated Coherence Bandwidth fields each have a length of 8 bits. The Recommended Bitmap, Recommended Beams, and the Recommended Layers fields each have a length of 7 bits.

Figure 21B:
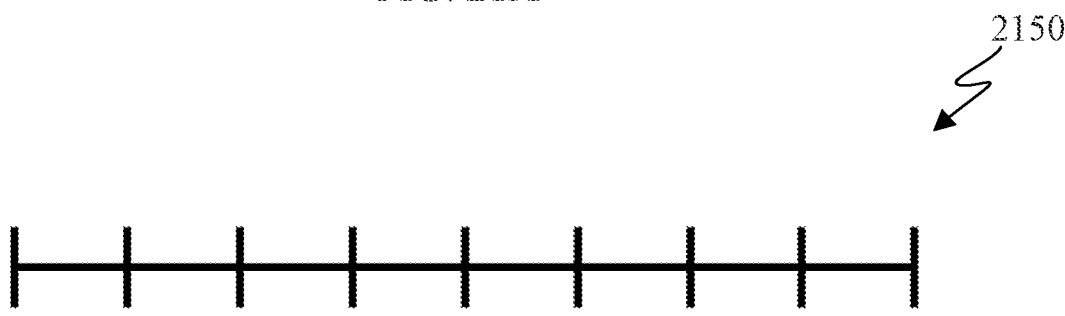
FIG. 21B illustrates an example of a new MAC CE for a response from a BS to the UE assistance information report according to embodiments of the present disclosure.

FIG. 21B illustrates an example 2150 of a new MAC CE for a response from a BS to the UE assistance information report according to embodiments of the present disclosure. The embodiment of the example 2150 of a new MAC CE for a response from a BS to the UE assistance information report illustrated in FIG. 21B is for illustration only. FIG. 21B does not limit the scope of this disclosure to any particular implementation of the example 2150 of a new MAC CE for a response from a BS to the UE assistance information report.

FIG. 21B illustrates an example of a new MAC CE for a response from a BS to the UE assistance information report, where the Selected Bitmap, Selected Beams, and the Selected Layers fields each have a length of 7 bits.

In one embodiment, a new MAC CE can be defined for the conventional CSI fallback request. This MAC CE can be identified by a MAC subheader with a logical channel ID that can be specified in Table 6.2.1-2 in [3]. This MAC CE can have a variable size and consist of the following fields:

Conventional CB Fallback: This field can include one or more of the following information:

Indication of disabling of a recommended bitmap for generating/reporting CSI feedback, e.g., a set of columns of the coefficient matrix Indication of a requested index to a table of parameters for a conventional codebook (e.g., paramCombination-r16 in Table 5.2.2.2.5-1 in [4])

For example, if one codebook has been configured for each CSI-ResourceConfig, then the Conventional CB Fallback field can include the ID of the conventional codebook for a particular CSI-ResourceConfig. In another example, if one codebook has been configured for each CORESET pool, then the Conventional CB Fallback field can include the ID of the conventional codebook for a particular CORESET pool.

Figure 22:
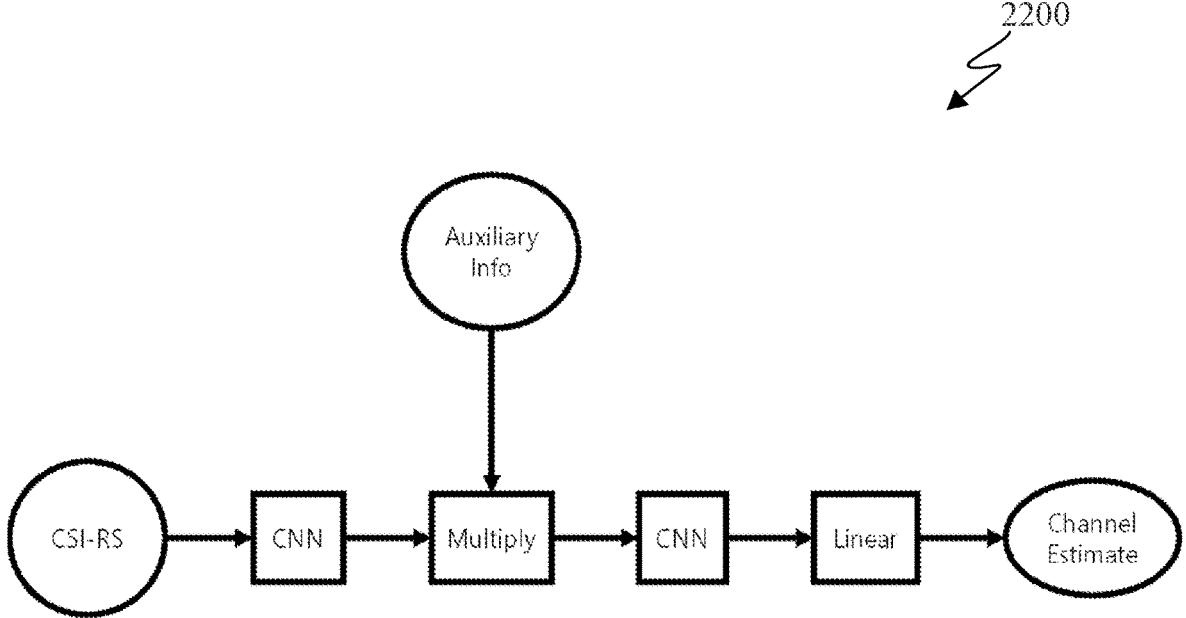
FIG. 22 illustrates an example of an AI/ML model architecture to support a CSI configuration recommender according to embodiments of the present disclosure.

FIG. 22 illustrates an example 2200 of an AI/ML model architecture to support a CSI configuration recommender according to embodiments of the present disclosure. The embodiment of the example 2200 of an AI/ML model architecture to support a CSI configuration recommender illustrated in FIG. 22 is for illustration only. FIG. 22 does not limit the scope of this disclosure to any particular implementation of the example 2200 of an AI/ML model architecture to support a CSI configuration recommender.

FIG. 22 illustrates an example of an AI/ML model architecture that can support training/inference of a CSI configuration recommender. A standard CNN can be augmented in this example with auxiliary information; examples of auxiliary information are included below.

In each slot, the full two-dimensional (number of Rx dimensions by number of Tx dimensions) channel over all subcarriers and OFDM symbols is provided as input to this AI/ML model architecture, where all REs that do not contain CSI-RS are filled with zeros. Examples of inputs to an AI/ML model that can support training/inference of a CSI configuration recommender include:

Full two-dimensional received channel over all subcarriers and OFDM symbols for one slot All REs that do not contain CSI-RS are filled with zeros Ground truth of full two-dimensional channel over all subcarriers and OFDM symbols for one slot For example, this can be obtained via ideal channel estimation In another example, this can be obtained via a realistic channel estimation method (e.g., LS, LMMSE)

This can be a training label

Auxiliary information

UE speed

UE acceleration/deceleration

UE trajectory

UE location

Coherence time

Coherence bandwidth

Delay spread

Doppler spread

Block error rate

Throughput

Examples of outputs from an AI/ML model that can support training/inference of a CSI configuration recommender include:

SD basis type (e.g., orthogonal DFT or non-orthogonal DFT, oversampling/rotation factor of DFT basis, DCT, Eigen/SVD-basis)

FD basis type (e.g., orthogonal DFT or non-orthogonal DFT, oversampling/rotation factor of DFT basis, DCT, Eigen/SVD-basis)

DD basis type (e.g., orthogonal DFT or non-orthogonal DFT, oversampling/rotation factor of DFT basis, DCT, Eigen/SVD-basis)

Number of SD beams or basis vectors

Number of FD beams or basis vectors

Number of TD or DD beams or basis vectors

Whether separate SD/FD/TD/DD basis or joint basis across 2 or 3 of (SD, FD, TD/DD)

Bitmap of nonzero coefficients or number of nonzero coefficients

Size of PSK alphabet for coefficient phase

Resolution or size (number of bits) of coefficient amplitude codebook

Number of layers (rank value) or max number of layers (or max rank value)

In other embodiments, the "AI/ML-based CSI feedback/report" processes one CSI observation when generating/reporting CSI feedback, and this CSI feedback corresponds to that CSI observation.

A term "AI/ML-based multi-time CSI feedback/report" is used to refer to a method for generating CSI reports different from the conventional CSI that utilizes a fixed/pre-determined codebook of precoding vectors/matrices enumerated by a PMI. The "AI/ML-based multi-time CSI feedback/report" method can utilize the aforementioned machines, auto-encoders, and neural networks that can be utilized by the "AI/ML-based CSI feedback/report" method.

The "AI/ML-based multi-time CSI feedback/report" supports either 1) processing multiple CSI observations when generating/reporting CSI feedback, 2) generating/reporting CSI feedback that corresponds to one or more future CSI observations, or 3) both (1) and (2).

Other terms that refer to a same method can also be used.

FIG. 23 illustrates an example method 2300 for operations at a BS to support a UE-initiated switch to an AI/ML-based multi-time CSI feedback/report method according to embodiments of the present disclosure. The embodiment of the example method 2300 for operations at a BS to support a UE-initiated switch to an AI/ML-based multi-time CSI feedback/report method illustrated in FIG. 23 is for illustration only. FIG. 23 does not limit the scope of this disclosure to any particular implementation of the example method 2300 for operations at a BS to support a UE-initiated switch to an AI/ML-based multi-time CSI feedback/report method.

As illustrated in FIG. 23, the method 2300 begins at operation 2302, where a BS (such as the BS 102) receives UE capability information from a UE, including the support of an ML approach for generating/reporting multi-time CSI feedback. At operation 2304, the BS sends configuration information to the UE, which can include ML-related configuration information such as enabling/disabling of an ML approach for generating/reporting multi-time CSI feedback, an ML model to be used, trained model parameters, and/or whether model parameter updates reported by the UE will be used or not. At operation 2306, the BS sends an AI/ML-based CSI feedback configuration message to the UE. At operation 2308, the BS receives a CSI report from the UE that has been generated based on an AI/ML-based feedback/report method. At operation 2310, the BS receives a message from the UE that indicates a switch to an AI/ML-based multi-time CSI feedback/report method. In one example, a dedicated/new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback as, e.g., a 1-bit indication in a CSI report. At operation 2312, the BS receives a CSI report from the UE that has been generated based on an AI/ML-based multi-time feedback/report method.

In another example, the BS can pre-determine/configure information about the switching time to an AI/ML-based multi-time CSI feedback/report method. In this case, operation 2310 does not need to be performed; the BS can receive AI/ML-based multi-time CSI reports from the UE at a pre-determined/configured time in operation 2312.

In another example, between operation 2310 and operation 2312, the BS can perform an operation 2311. In operation 2311, the BS can send an ACK/NACK to the UE in response to a received message from the UE that indicates a switch to an AI/ML-based multi-time CSI feedback/report method. If the BS sends an ACK, then the UE switches to an AI/ML-based multi-time CSI feedback/report method; the BS receives AI/ML-based multi-time CSI reports from the UE in operation 2312. If the BS sends a NACK, then the BS receives AI/ML-based CSI reports from the UE in operation 2312. In operation 2311, in another example, the BS can send a configuration message for an AI/ML-based multi-time CSI feedback/report method to the UE.

In another example, the BS can include a configuration message regarding an AI/ML-based CSI feedback/report method to the UE in operation 2304. In this case, operation 2306 does not need to be performed; the BS can begin receiving AI/ML-based CSI reports from the UE in operation 2308.

In another example, the BS can enable/disable operations 2310, 2311, and 2312, e.g., via RRC configuration. If these operations are disabled, then the BS continues receiving AI/ML-based CSI reports from the UE in operation 2308.

In another example, an AI/ML-based CSI feedback/report method can be replaced by a conventional CSI feedback/report method in the preceding examples. In one example, this conventional CSI feedback/report method can correspond to the CSI feedback based on the Type I codebook (cf. 5.2.2.1/2, [4]) or the Type II codebook (cf. 5.2.2.3/4/5/6/7, [4]).

FIG. 24 illustrates an example method 2400 for operations at a UE to support a UE-initiated switch to an AI/ML-based multi-time CSI feedback/report method according to embodiments of the present disclosure. The embodiment of the example method 2400 for operations at a UE to support a UE-initiated switch to an AI/ML-based multi-time CSI feedback/report method illustrated in FIG. 24 is for illustration only. FIG. 24 does not limit the scope of this disclosure to any particular implementation of the example method 2400 for operations at a UE to support a UE-initiated switch to an AI/ML-based multi-time CSI feedback/report method.

As illustrated in FIG. 24, the method 2400 begins at operation 2402, where a UE (such as the UE 116) reports capability information to a BS, including the support of an ML approach for generating/reporting multi-time CSI feedback. At operation 2404, the UE receives configuration information from the BS, which can include ML-related configuration information such as enabling/disabling of an ML approach for generating/reporting multi-time CSI feedback, an ML model to be used, trained model parameters, and/or whether model parameter updates reported by the UE will be used or not. At operation 2406, the UE receives an AI/ML-based CSI feedback configuration message from the BS. At operation 2408, the UE sends CSI reports to the BS that have been generated by an AI/ML-based CSI feedback/report method. At operation 2410, the UE sends a message to the BS that indicates a switch to an AI/ML-based multi-time CSI feedback/report method. In one example, a dedicated/new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. At operation 2412, the UE sends CSI reports to the BS that have been generated by an AI/ML-based multi-time feedback/report method.

In another example, the BS can pre-determine/configure information about the switching time to an AI/ML-based multi-time CSI feedback/report method. In this case, operation 2410 does not need to be performed; the UE can send AI/ML-based multi-time CSI reports to the BS at a pre-determined/configured time in operation 2412.

In another example, between operation 2410 and operation 2412, the UE can perform an operation 2411. In operation 2411, the UE can receive an ACK/NACK from the BS in response to a received message from the UE that indicates a switch to an AI/ML-based multi-time CSI feedback/report method. If the UE receives an ACK, then the UE switches to an AI/ML-based multi-time CSI feedback/report method; the UE sends AI/ML-based multi-time CSI reports to the BS in operation 2412. If the UE receives a NACK, then the UE sends AI/ML-based CSI reports to the BS in operation 2412. In operation 2411, in another example, the UE can receive a configuration message for an AI/ML-based multi-time CSI feedback/report method from the BS.

In another example, the UE can receive a configuration message regarding an AI/ML-based CSI feedback/report method from the BS in operation 2404. In this case, operation 2406 does not need to be performed; the UE can begin sending AI/ML-based CSI reports to the BS in operation 2408.

In another example, the BS can enable/disable operations 2410, 2411, and 2412, e.g., via RRC configuration. If these operations are disabled, then the UE continues sending AI/ML-based CSI reports to the BS in operation 2408.

In another example, an AI/ML-based CSI feedback/report method can be replaced by a conventional CSI feedback/report method in the preceding examples. In one example, this conventional CSI feedback/report method can correspond to the CSI feedback based on the Type I codebook or the Type II codebook.

FIG. 25 illustrates an example method 2500 for operations at a BS to support a BS-initiated or BS-controlled switch to an AI/ML-based multi-time CSI feedback/report method according to embodiments of the present disclosure. The embodiment of the example method 2500 for operations at a BS to support a BS-initiated or BS-controlled switch to an AI/ML-based multi-time CSI feedback/report method illustrated in FIG. 25 is for illustration only. FIG. 25 does not limit the scope of this disclosure to any particular implementation of the example method 2500 for operations at a BS to support a BS-initiated or BS-controlled switch to an AI/ML-based multi-time CSI feedback/report method.

As illustrated in FIG. 25, the method 2500 begins at operation 2502, where a BS (such as the BS 102) receives UE capability information from a UE, including the support of an ML approach for generating/reporting multi-time CSI feedback. At operation 2504, the BS sends configuration information to the UE, which can include ML-related configuration information such as enabling/disabling of an ML approach for generating/reporting multi-time CSI feedback, an ML model to be used, trained model parameters, and/or whether model parameter updates reported by a UE will be used or not. At operation 2506, the BS sends an AI/ML-based CSI feedback configuration message to the UE. At operation 2508, the BS receives CSI reports from the UE that have been generated by an AI/ML-based feedback/report method. At operation 2510, the BS receives assistance information from the UE; the assistance information can include a recommendation for switching to an AI/ML-based multi-time CSI feedback/report method, which will be described in the "UE assistance information" section later in this disclosure. At operation 2512, the BS sends an AI/ML-based multi-time CSI feedback configuration message to the UE. At operation 2514, the BS receives CSI reports from the UE that have been generated by an AI/ML-based multi-time feedback/report method.

In another example, the BS can include a configuration message regarding an AI/ML-based CSI feedback/report method to the UE in operation 2504. In this case, operation 2506 does not need to be performed; the BS can begin receiving AI/ML-based CSI reports from the UE in operation 2508.

In another example, an AI/ML-based CSI feedback/report method can be replaced by a conventional CSI feedback/report method in the preceding examples. In one example, this conventional CSI feedback/report method can correspond to the CSI feedback based on the Type I codebook or the Type II codebook.

Figure 26:
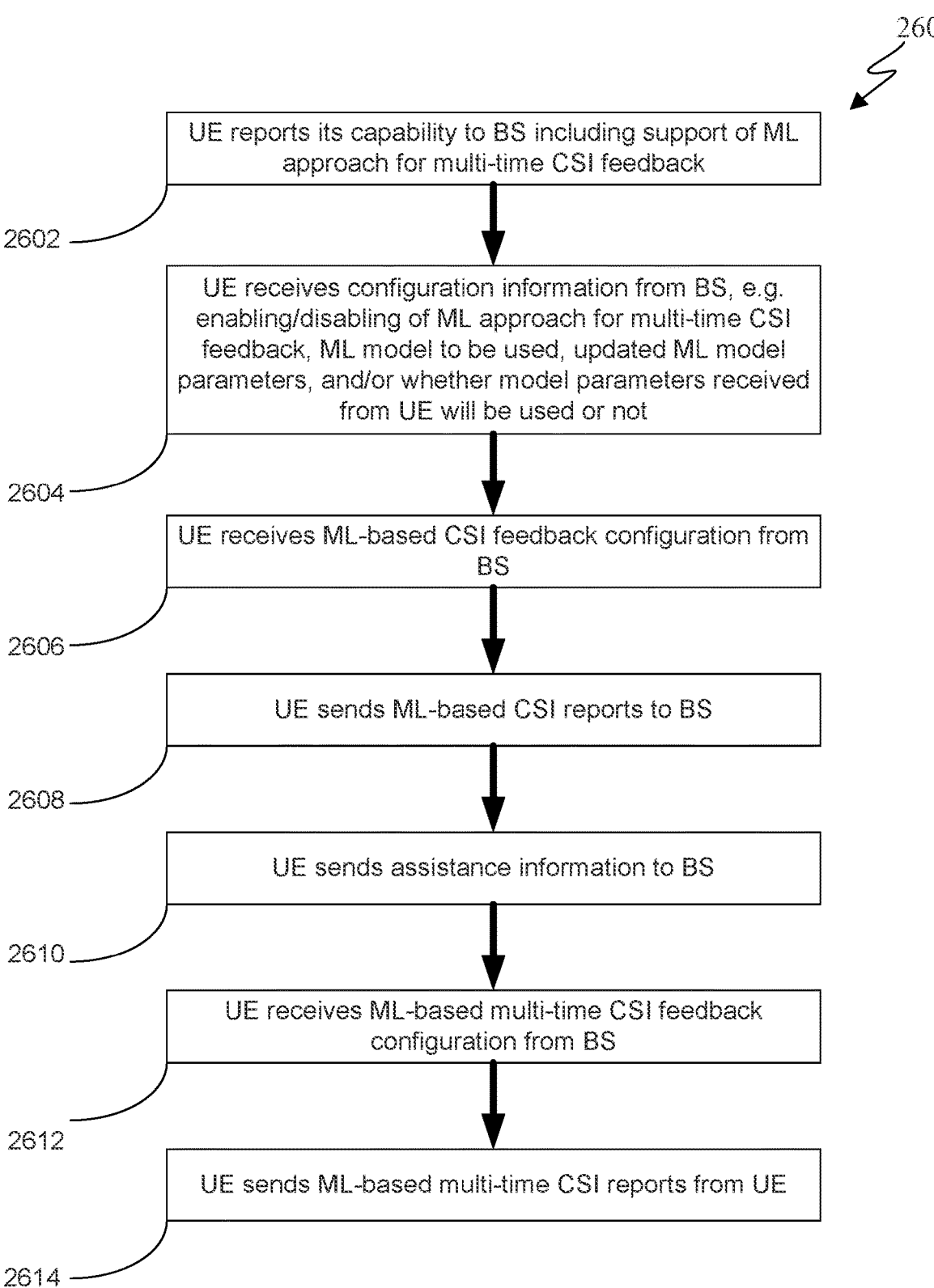
FIG. 26 illustrates an example method for operations at a UE to support a BS-initiated or BS-controlled switch to an AI/ML-based multi-time CSI feedback/report method according to embodiments of the present disclosure.

FIG. 26 illustrates an example method 2600 for operations at a UE to support a BS-initiated or BS-controlled switch to an AI/ML-based multi-time CSI feedback/report method according to embodiments of the present disclosure. The embodiment of the example method 2600 for operations at a UE to support a BS-initiated or BS-controlled switch to an AI/ML-based multi-time CSI feedback/report method illustrated in FIG. 26 is for illustration only. FIG. 26 does not limit the scope of this disclosure to any particular implementation of the example method 2600 for operations at a UE to support a BS-initiated or BS-controlled switch to an AI/ML-based multi-time CSI feedback/report method.

As illustrated in FIG. 26, the method 2600 begins at operation 2602, where a UE (such as the UE 116) reports capability information to a BS, including the support of an ML approach for generating/reporting multi-time CSI feedback. At operation 2604, the UE receives configuration information from the BS, which can include ML-related configuration information such as enabling/disabling of an ML approach for generating/reporting multi-time CSI feedback, an ML model to be used, trained model parameters, and/or whether model parameter updates reported by a UE will be used or not. At operation 2606, the UE receives an AI/ML-based CSI feedback configuration message from the BS. At operation 2608, the UE sends CSI reports to the BS that have been generated by an AI/ML-based feedback/report method. At operation 2610, the UE sends assistance information to the BS; the assistance information can include a recommendation for switching to an AI/ML-based multi-time CSI feedback/report method, which will be described in the "UE assistance information" section later in this disclosure. At operation 2612, the UE receives an AI/ML-based multi-time CSI feedback configuration message from the BS. At operation 2614, the UE sends CSI reports to the BS that have been generated by an AI/ML-based multi-time feedback/report method.

In another example, the UE can receive a configuration message regarding an AI/ML-based CSI feedback/report method from the BS in operation 2604. In this case, operation 2606 does not need to be performed; the UE can begin sending an AI/ML-based CSI reports to the BS in operation 2608.

In another example, an AI/ML-based CSI feedback/report method can be replaced by a conventional CSI feedback/report method in the preceding examples. In one example, this conventional CSI feedback/report method can correspond to the CSI feedback based on the Type I codebook or the Type II codebook.

FIG. 27 illustrates an example method 2700 for operations at a BS to support a UE-initiated fallback from an AI/ML-based multi-time CSI feedback/report method to an AI/ML-based CSI feedback/report method according to embodiments of the present disclosure. The embodiment of the example method 2700 for operations at a BS to support a UE-initiated fallback from an AI/ML-based multi-time CSI feedback/report method illustrated in FIG. 27 is for illustration only. FIG. 27 does not limit the scope of this disclosure to any particular implementation of the example method 2700 for operations at a BS to support a UE-initiated fallback from an AI/ML-based multi-time CSI feedback/report method.

As illustrated in FIG. 27, the method 2700 begins at operation 2702, where a BS (such as the BS 102) receives UE capability information from a UE, including the support of an ML approach for generating/reporting multi-time CSI feedback. At operation 2704, the BS sends configuration information to the UE, which can include ML-related con-figuration information such as enabling/disabling of an ML approach for generating/reporting multi-time CSI feedback, an ML model to be used, trained model parameters, and/or whether model parameter updates reported by a UE will be used or not. At operation 2706, the BS sends an AI/ML-based CSI feedback configuration message to the UE. At operation 2708, the BS receives CSI reports from the UE that have been generated by an AI/ML-based feedback/report method. At operation 2710, the BS receives a message from the UE that indicates a switch to an AI/ML-based multi-time CSI feedback/report method. In one example, a dedicated/new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. At operation 2712, the BS receives CSI reports from the UE that have been generated by an AI/ML-based multi-time feedback/report method. At operation 2714, the BS receives a message from the UE that corresponds to a request to fall back to an AI/ML-based CSI feedback/report method, which will be described in the "AI/ML-based CSI fallback request" section later in this disclosure. At operation 2716, the BS sends an AI/ML-based CSI feedback configuration message to the UE. At operation 2718, the BS receives CSI reports from the UE that have been generated by an AI/ML-based feedback/report method.

In another example, the BS can pre-determine/configure information about the switching time to an AI/ML-based multi-time CSI feedback/report method. In this case, operation 2710 does not need to be performed; the BS can receive AI/ML-based multi-time CSI reports from the UE at a pre-determined/configured time in operation 2712.

In another example, between operation 2710 and operation 2712, the BS can perform an operation 2711. In operation 2711, the BS can send an ACK/NACK to the UE in response to a received message from the UE that indicates a switch to an AI/ML-based multi-time CSI feedback/report method. If the BS sends an ACK, then the UE switches to an AI/ML-based multi-time CSI feedback/report method; the BS receives AI/ML-based multi-time CSI reports from a UE in operation 2712. If the BS sends a NACK, then the BS receives AI/ML-based CSI reports from the UE in operation 2712. In operation 2711, in another example, the BS can send a configuration message for an AI/ML-based multi-time CSI feedback/report method to the UE.

In another example, the BS can include a configuration message regarding an AI/ML-based CSI feedback/report method to the UE in operation 2704. In this case, operation 2706 does not need to be performed; the BS can begin receiving AI/ML-based CSI reports from the UE in operation 2708.

In another example, the BS can enable/disable operations 2710, 2711, and 2712, e.g., via RRC configuration. If these operations are disabled, then the BS continues receiving AI/ML-based CSI reports from a UE in operation 2708.

In another example, an AI/ML-based CSI feedback/report method can be replaced by a conventional CSI feedback/report method in the preceding examples. In one example, this conventional CSI feedback/report method can correspond to the CSI feedback based on the Type I codebook or the Type II codebook.

FIG. 28 illustrates an example method 2800 for operations at a UE to support a UE-initiated fallback from an AI/ML-based multi-time CSI feedback/report method to an AI/ML-based CSI feedback/report method according to embodiments of the present disclosure. The embodiment of the example method 2800 for operations at a UE to support a UE-initiated fallback from an AI/ML-based multi-time CSI feedback/report method illustrated in FIG. 28 is for illustration only. FIG. 28 does not limit the scope of this disclosure to any particular implementation of the example method 2800 for operations at a UE to support a UE-initiated fallback from an AI/ML-based multi-time CSI feedback/report method.

As illustrated in FIG. 28, the method 2800 begins at operation 2802, where a UE (such as the UE 116) reports capability information to a BS, including the support of an ML approach for generating/reporting multi-time CSI feedback. At operation 2804, the UE receives configuration information from the BS, which can include ML-related configuration information such as enabling/disabling of an ML approach for generating/reporting multi-time CSI feedback, an ML model to be used, trained model parameters, and/or whether model parameter updates reported by a UE will be used or not. At operation 2806, the UE receives an AI/ML-based CSI feedback configuration message from the BS. At operation 2808, the UE sends CSI reports to the BS that have been generated by an AI/ML-based feedback/report method. At operation 2810, the UE sends a message to the BS that indicates a switch to an AI/ML-based multi-time CSI feedback/report method. In one example, a dedicated/new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. At operation 2812, the UE sends CSI reports to the BS that have been generated by an AI/ML-based multi-time feedback/report method. At operation 2814, the UE sends a message to the BS that corresponds to a request to fall back to an AI/ML-based CSI feedback/report method, which will be described in the "AI/ML-based CSI fallback request" section later in this disclosure. At operation 2816, the UE receives an AI/ML-based CSI feedback configuration message from the BS. At operation 2818, the UE sends CSI reports to the BS that have been generated by an AI/ML-based feedback/report method.

In another example, the BS can pre-determine/configure information about the switching time to an AI/ML-based multi-time CSI feedback/report method. In this case, operation 2810 does not need to be performed; the UE can send AI/ML-based multi-time CSI reports to the BS at a pre-determined/configured time in operation 2812.

In another example, between operation 2810 and operation 2812, the UE can perform an operation 2811. In operation 2811, the UE can receive an ACK/NACK from the BS in response to a received message from the UE that indicates a switch to an AI/ML-based multi-time CSI feedback/report method. If the UE receives an ACK, then the UE switches to an AI/ML-based multi-time CSI feedback/report method; the UE sends AI/ML-based multi-time CSI reports to the BS in operation 2812. If the UE receives a NACK, then the UE sends AI/ML-based CSI reports to the BS in operation 2812. In operation 2811, in another example, the UE can receive a configuration message for an AI/ML-based multi-time CSI feedback/report method from the BS.

In another example, the UE can receive a configuration message regarding an AI/ML-based CSI feedback/report method from the BS in operation 2804. In this case, operation 2806 does not need to be performed; the UE can begin sending AI/ML-based CSI reports to the BS in operation 2808.

In another example, the BS can enable/disable operations 2810, 2811, and 2812, e.g., via RRC configuration. If these operations are disabled, then the UE continues sending AI/ML-based CSI reports to the BS in operation 2808.

In another example, an AI/ML-based CSI feedback/report method can be replaced by a conventional CSI feedback/report method in the preceding examples. In one example, this conventional CSI feedback/report method can correspond to the CSI feedback based on the Type I codebook or the Type II codebook.

Figure 29:
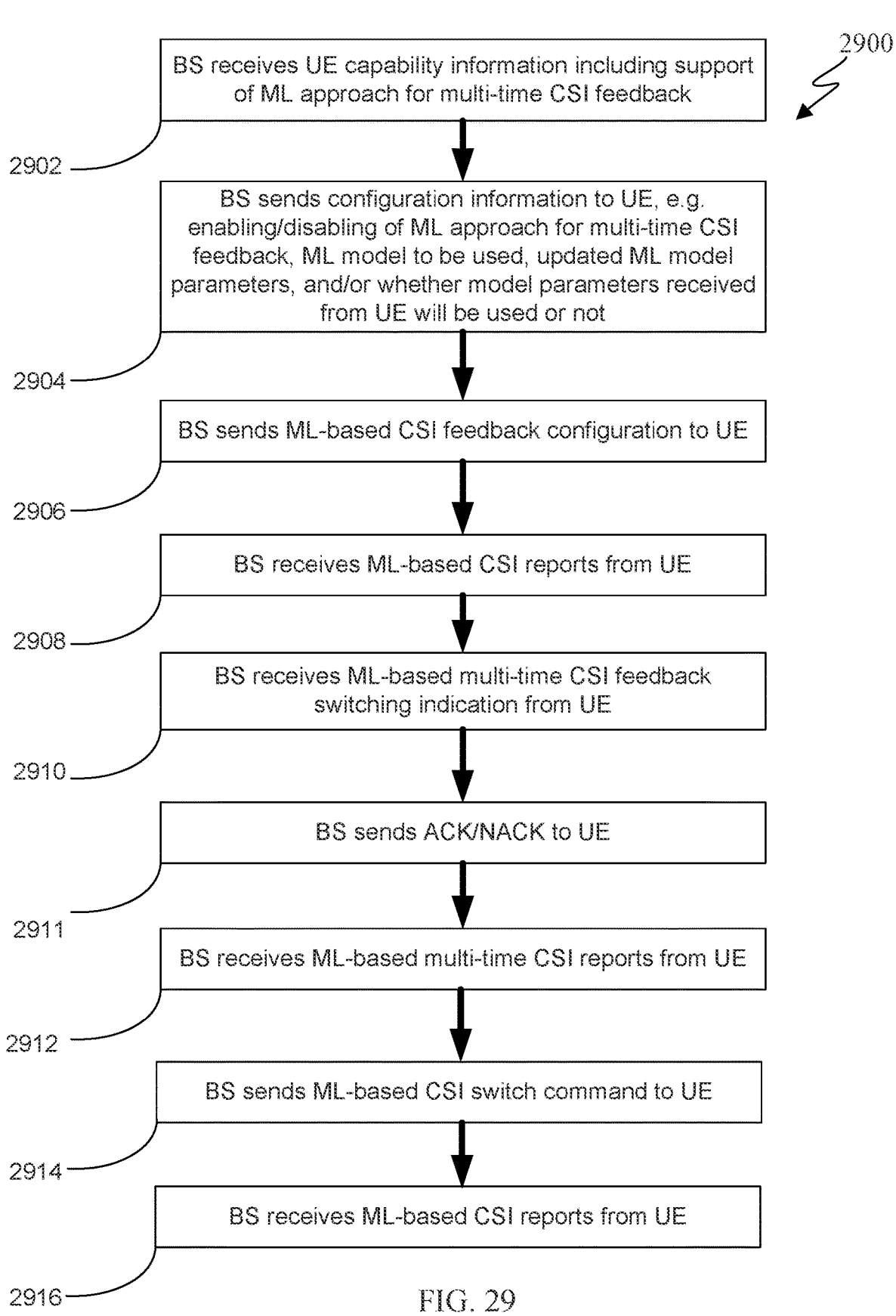
FIG. 29 illustrates an example method for operations at a BS to support a BS-initiated or BS-controlled fallback from an AI/ML-based multi-time CSI feedback/report method to an AI/ML-based CSI feedback/report method according to embodiments of the present disclosure.

FIG. 29 illustrates an example method 2900 for operations at a BS to support a BS-initiated or BS-controlled fallback from an AI/ML-based multi-time CSI feedback/report method to an AI/ML-based CSI feedback/report method according to embodiments of the present disclosure. The embodiment of the example method 2900 for operations at a BS to support a BS-initiated or BS-controlled fallback from an AI/ML-based multi-time CSI feedback/report method to an AI/ML-based CSI feedback/report method illustrated in FIG. 29 is for illustration only. FIG. 29 does not limit the scope of this disclosure to any particular implementation of the example method 2900 for operations at a BS to support a BS-initiated or BS-controlled fallback from an AI/ML-based multi-time CSI feedback/report method to an AI/ML-based CSI feedback/report method.

As illustrated in FIG. 29, the method 2900 begins at operation 2902, where a BS (such as the BS 102) receives UE capability information from a UE, including the support of an ML approach for generating/reporting multi-time CSI feedback. At operation 2904, the BS sends configuration information to the UE, which can include ML-related configuration information such as enabling/disabling of an ML approach for generating/reporting multi-time CSI feedback, an ML model to be used, trained model parameters, and/or whether model parameter updates reported by the UE will be used or not. At operation 2906, the BS sends an AI/ML-based CSI feedback configuration message to the UE. At operation 2908, the BS receives CSI reports from the UE that have been generated by an AI/ML-based feedback/report method. At operation 2910, the BS receives a message from the UE that indicates a switch to an AI/ML-based multi-time CSI feedback/report method. In one example, a dedicated/new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. At operation 2912, the BS receives CSI reports from a UE that have been generated by an AI/ML-based multi-time feedback/report method. At operation 2914, the BS sends a message to the UE that corresponds to a command to fall back to an AI/ML-based CSI feedback/report method. At operation 2916, the BS receives CSI reports from the UE that have been generated by an AI/ML-based feedback/report method.

In another example, the BS can pre-determine/configure information about the switching time to an AI/ML-based multi-time CSI feedback/report method. In this case, operation 2910 does not need to be performed; the BS can receive AI/ML-based multi-time CSI reports from the UE at a pre-determined/configured time in operation 2912.

In another example, between operation 2910 and operation 2912, the BS can perform an operation 2911. In operation 2911, the BS can send an ACK/NACK to the UE in response to a received message from the UE that indicates a switch to an AI/ML-based multi-time CSI feedback/report method. If the BS sends an ACK, then the UE switches to an AI/ML-based multi-time CSI feedback/report method; the BS receives AI/ML-based multi-time CSI reports from the UE in operation 2912. If the BS sends a NACK, then the BS receives AI/ML-based CSI reports from the UE in operation 2912. In operation 2911, in another example, the BS can send a configuration message for an AI/ML-based multi-time CSI feedback/report method to the UE.

In another example, the BS can include a configuration message regarding an AI/ML-based CSI feedback/report method to the UE in operation 2904. In this case, operation 2906 does not need to be performed; the BS can begin receiving AI/ML-based CSI reports from the UE in operation 2908.

In another example, the BS can enable/disable operations 2910, 2911, and 2912, e.g., via RRC configuration. If these operations are disabled, then the BS continues receiving AI/ML-based CSI reports from the UE in operation 2908.

In another example, an AI/ML-based CSI feedback/report method can be replaced by a conventional CSI feedback/report method in the preceding examples. In one example, this conventional CSI feedback/report method can correspond to the CSI feedback based on the Type I codebook or the Type II codebook.

Figure 30:
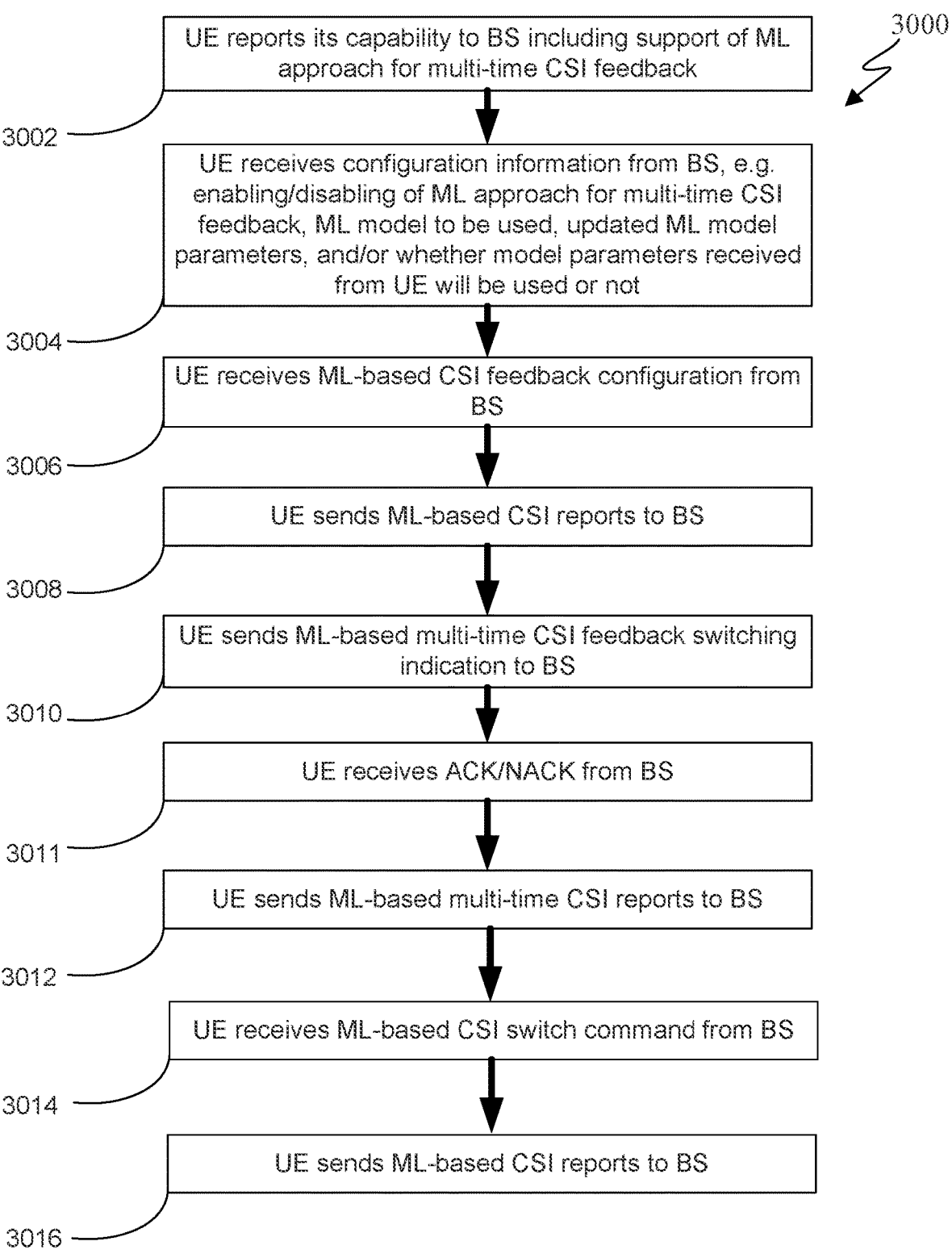
FIG. 30 illustrates an example method for operations at a UE to support a BS-initiated or BS-controlled fallback from an AI/ML-based multi-time CSI feedback/report method to an AI/ML-based CSI feedback/report method according to embodiments of the present disclosure.

FIG. 30 illustrates an example method 3000 for operations at a UE to support a BS-initiated or BS-controlled fallback from an AI/ML-based multi-time CSI feedback/report method to an AI/ML-based CSI feedback/report method according to embodiments of the present disclosure. The embodiment of the example method 3000 for operations at a UE to support a BS-initiated or BS-controlled fallback from an AI/ML-based multi-time CSI feedback/report method to an AI/ML-based CSI feedback/report method illustrated in FIG. 30 is for illustration only. FIG. 30 does not limit the scope of this disclosure to any particular implementation of the example method 3000 for operations at a UE to support a BS-initiated or BS-controlled fallback from an AI/ML-based multi-time CSI feedback/report method to an AI/ML-based CSI feedback/report method.

As illustrated in FIG. 30, the method 3000 begins at operation 3002, where a UE (such as the UE 116) reports capability information to a BS, including the support of an ML approach for generating/reporting multi-time CSI feedback. At operation 3004, the UE receives configuration information from the BS, which can include ML-related configuration information such as enabling/disabling of an ML approach for generating/reporting multi-time CSI feedback, an ML model to be used, trained model parameters, and/or whether model parameter updates reported by the UE will be used or not. At operation 3006, the UE receives an AI/ML-based CSI feedback configuration message from the BS. At operation 3008, the UE sends CSI reports to the BS that have been generated by an AI/ML-based feedback/report method. At operation 3010, the UE sends a message to the BS that indicates a switch to an AI/ML-based multi-time CSI feedback/report method. In one example, a dedicated/new MAC CE can be used for this message, or an existing MAC CE can be used for this message. In another example, this message can be sent on the PUCCH or the PUSCH, where a new UCI format can be defined for this message, or an existing UCI format can be used for this message. If an existing UCI format is used for this message, this indication can be included as a part of UCI and therefore reported together with CSI feedback, e.g., a 1-bit indication in a CSI report. At operation 3012, the UE sends CSI reports to the BS that have been generated by an AI/ML-based multi-time feedback/report method. At operation 3014, the UE receives a message from the BS that corresponds to a command to fall back to an AI/ML-based CSI feedback/report method. At operation 3016, the UE sends CSI reports to the BS that have been generated by an AI/ML-based feedback/report method.

In another example, the BS can pre-determine/configure information about the switching time to an AI/ML-based CSI feedback/report method. In this case, operation 3010 does not need to be performed; the UE can send AI/ML-based CSI reports to the BS at a pre-determined/configured time in operation 3012.

In another example, between operation 3010 and operation 3012, the UE can perform an operation 3011. In operation 3011, the UE can receive an ACK/NACK from the BS in response to a received message from the UE that indicates a switch to an AI/ML-based multi-time CSI feedback/report method. If the UE receives an ACK, then the UE switches to an AI/ML-based multi-time CSI feedback/report method; the UE sends AI/ML-based multi-time CSI reports to the BS in operation 3012. If the UE receives a NACK, then the UE sends AI/ML-based CSI reports to the BS in operation 3012. In operation 3011, in another example, the UE can receive a configuration message for an AI/ML-based multi-time CSI feedback/report method from the BS.

In another example, the UE can receive a configuration message regarding an AI/ML-based CSI feedback/report method from the BS in operation 3004. In this case, operation 3006 does not need to be performed; the UE can begin sending AI/ML-based CSI reports to the BS in operation 3008.

In another example, the BS can enable/disable operations 3010, 3011, and 3012, e.g., via RRC configuration. If these operations are disabled, then the UE continues sending AI/ML-based CSI reports to the BS in operation 3008.

In another example, an AI/ML-based CSI feedback/report method can be replaced by a conventional CSI feedback/report method in the preceding examples. In one example, this conventional CSI feedback/report method can correspond to the CSI feedback based on the Type I codebook or the Type II codebook.

In one embodiment, a BS can configure a UE to send an indication of switching to an AI/ML-based multi-time CSI feedback/report method via RRC configuration. Table 12 is an example of modifying an IE PUSCH-Config to configure a UE to send this switching indication. In this example, multTimeMLCBSwitch, if present, corresponds to this switching indication. In another example, an IE PUCCH-Config can be modified to configure a UE to send this switching indication.

TABLE 12

```
PUSCH-Config ::= SEQUENCE {
    ...
    multTimeMLCBSwitch BOOLEAN OPTIONAL, -- Need M
    ...
}
```

In one embodiment, a BS can configure a UE to send an indication of switching to an AI/ML-based multi-time CSI feedback/report method via MAC CE activation command.

In one embodiment, a BS can configure a UE to send an indication of switching to an AI/ML-based multi-time CSI feedback/report method via DCI.

In another embodiment, a BS can configure a UE to use an AI/ML-based multi-time CSI feedback/report method via a PDCCH order, where a new DCI format can be defined and this PDCCH order can be triggered by this new DCI format.

In another example, a BS can configure a UE to use an AI/ML-based multi-time CSI feedback/report method via MAC CE activation command.

In another example, a BS can configure a UE to use an AI/ML-based multi-time CSI feedback/report method via RRC configuration. Table 13 is an example of modifying an IE CodebookConfig to configure a UE to use AI/ML-based codebooks for generating/reporting multi-time CSI feedback. For CodebookConfig, enabledCodebooks, if present, determines which AI/ML-based codebooks are enabled; switchSlot, if present, determines the set of slots where these AI/ML-based codebooks are enabled. csi-ResourceConfigId, if present, corresponds to the IDs of these AI/ML-based codebooks. numInpCSI, if present, corresponds to the number of past CSI instances that should be processed by these AI/ML-based codebooks. numOutCSI, if present, corresponds to the number of present/future CSI instances that should be output by these AI/ML-based codebooks. In one example, one AI/ML-based codebook is defined for each CSI-ResourceConfig (with a corresponding entry in csi-ResourceConfigId). In another example, one AI/ML-based codebook is defined for all CSI-ResourceConfigs (where each CSI-ResourceConfig has an entry in csi-ResourceConfigId).

numOutCSI are specified as sets of values, then a UE can be configured to select a value from that set and report it. A gNB can also configure a value from that set as aperiodic, semi-persistent, or periodic. In one example, a UE can cycle through the values in that set, where the periodicity for each value is configured by a gNB. In another example, numInpCSI and/or numOutCSI can be specified as slot indices or sets of slot indices.

In another example, the set of all CSI-ResourceConfigs can be partitioned into disjoint subsets, and one AI/ML-based codebook can be mapped to one of these subsets. This partition can be configured as aperiodic, semi-persistent, or periodic.

Let (n1, n2) represent the number of antenna ports in the first (n1) and second (n2) dimensions. In one example, one AI/ML-based codebook can be defined for each supported combination of (n1, n2). In another example, one AI/ML-based codebook can be defined for all supported combinations of (n1, n2), where appropriate pre-processing can be performed on the input to this AI/ML-based codebook.

The CodebookConfig IE can also be modified to configure a UE to use AI/ML-based codebooks for generating/reporting multi-time CSI feedback in a multi-TRP system, wherein the UE can receive DL reception from or transmit UL transmission to multiple TRPs. In one example, a TRP is functionally equivalent to (or corresponds to) a NZP CSI-RS resource, or a CSI-RS resource set, or a group of antenna ports. In one example, one AI/ML-based codebook is defined for each TRP (where each TRP can belong to a particular CORESET pool; each codebook can have a corresponding CORESET Pool ID). In another example, one AI/ML-based codebook is defined for all TRPs (where the CORESET Pool ID for each TRP is mapped to this codebook).

TABLE 13

```
CodebookConfig ::= SEQUENCE {
    codebookType          CHOICE {
        ...
        typeAI            SEQUENCE {
            ...
        },
        typeMultTimeAI        SEQUENCE {
            enabledCodebooks        SEQUENCE (SIZE (1..NrMTAICodebooks)) OF BOOLEAN
OPTIONAL, -- Need M
            switchSlot            SEQUENCE (SIZE (1..NrMTAICodebooks)) OF INTEGER
(0..numSlots-1) OPTIONAL, -- Need M
            csi-ResourceCfgId        SEQUENCE (SIZE (1..NrCsiResourceCfgs)) OF INTEGER
(1..NrMTAiCodebooks) OPTIONAL, -- Need M
            numInpCSI                SEQUENCE (SIZE (1..NrMTAICodebooks)) of INTEGER
(1..maxNumInpCSI) OPTIONAL, -- Need M
            numOutCSI                SEQUENCE (SIZE (1..NrMTAICodebooks)) of INTEGER
(1..maxNumOutCSI) OPTIONAL, -- Need M
            ...
        },
    }
}
```

In one example, numInpCSI and/or numOutCSI can be configured as aperiodic, semi-persistent, or periodic. This can facilitate adaptation to time-varying channel statistics. If one AI/ML-based codebook is defined for each CSI-ResourceConfig, then this can facilitate adaptation to frequency-varying channel statistics.

In one example, numInpCSI and/or numOutCSI can be specified as constants. In another example, numInpCSI and/or numOutCSI can be specified as sets of values (e.g., all values in a set, a 3-tuple such as (starting value, ending value, difference value), etc.). If numInpCSI and/or In another embodiment, a BS can configure a UE to use AI/ML-based multi-time CSI component(s) of a codebook via RRC configuration. In one example, the codebook can include AI/ML-based multi-time CSI component(s) and conventional codebook component(s). Table 14 is an example of modifying an IE CodebookConfig to configure a UE to use an AI/ML-based component of a conventional codebook for generating/reporting multi-time CSI feedback. typeII-AI-r16 corresponds to an AI/ML-based component of type2, which corresponds to the Type II codebook. If typeII-AI-r16 is enabled, then an AI/ML-based method is used to determine the output of the Type II codebook, given a particular input. In one example, an AI/ML-based component of a conventional codebook can be configured to learn the number of SD beams and perform SD beam group selection; it can also be configured to learn the number of FD beams and perform FD beam group selection. In another example, an AI/ML-based component of a conventional codebook can be configured to jointly learn the number of SD/FD beams and perform SD/FD beam group selection. An AI/ML-based component of a conventional codebook can also be configured to learn the number of nonzero coefficients for computing a linear combination of SD and FD beams. An AI/ML-based component of a conventional codebook can also be configured to learn the size of the PSK alphabet (e.g., QPSK or 8-PSK). numOutCSI corresponds to the number of present/future CSI instances that are output by this conventional codebook; if numOutCSI is greater than 1, then reporting of future CSI is supported.

TABLE 14

```
CodebookConfig ::= SEQUENCE {
    codebookType                CHOICE {
        type 1    SEQUENCE {
            ...
        },
        type2    SEQUENCE {
            subtype                 CHOICE {
                typeII-r16              SEQUENCE {
                    ...
                },
                typeII-PortSelect-r16 SEQUENCE {
                    ...
                },
                typeII-AI-r16           SEQUENCE {
                    ...
                    numOutCSI               INTEGER (1..maxNumOutCSI),
                },
            },
        },
    }
}
```

In one example, for each CSI-ResourceConfig, one of the following options can be configured: 1) a conventional codebook (e.g., a conventional component, an AI-based component that supports reporting of future CSI), 2) an AI/ML-based codebook that generates/reports CSI feedback, or 3) an AI/ML-based codebook that generates/reports multi-time CSI feedback. This configuration can be periodic, semi-persistent, or aperiodic.

In another example, for each CSI-ResourceConfig, if either a conventional codebook or an AI/ML-based codebook that generates/reports CSI feedback has been configured, one of the following options can be additionally configured: 1) a conventional CSI predictor or 2) an AI/ML-based CSI predictor. The output of this configured predictor can be input to this configured codebook. This predictor can be configured as periodic, semi-persistent, or aperiodic. Table 15 is an example of modifying an IE CSI-ReportConfig to configure a UE to use an AI/ML-based CSI predictor. mlAlgParams, if present, can include parameters for trained AI/ML-based CSI predictors from other UEs.

TABLE 15

```
CSI-ReportConfig ::= SEQUENCE {
    predictorType           CHOICE {
        ...
        MlPredictor             SEQUENCE {
            mlEnabled               BOOLEAN
```

TABLE 15-continued

```
        mlAlgorithm             INTEGER (1..M)
        mlAlgParams             SEQUENCE (SIZE (1..numUEs)) of
mlAlgParams OPTIONAL, -- Need N
    },
    }
}
```

In another embodiment, a BS can configure a UE to include CQI when generating AI/ML-based multi-time CSI feedback via RRC configuration. Table 16 is an example of modifying an IE CodebookConfig to configure an AI/ML-based codebook that includes CQI when generating/reporting multi-time CSI feedback. For CodebookConfig, encodeInpCQI, if present, determines whether CQI for past CSI should be included when multi-time CSI feedback is generated. In one example, a subset of past CSI can be configured, where CQI for past CSI in that subset should be included when multi-time CSI feedback is generated. encodeOutCQI, if present, determines whether CQI for present/future CSI should be included when multi-time CSI feedback is generated. In one example, a subset of present/future CSI can be configured, where CQI for present/future CSI in that subset should be included when multi-time CSI feedback is generated.

TABLE 16

```
CodebookConfig ::= SEQUENCE {
    codebookType            CHOICE {
        type1    SEQUENCE {
            ...
        },
        type2    SEQUENCE {
            ...
        },
        typeAI                  SEQUENCE {
            encodeInpCQI            BOOLEAN OPTIONAL, -- Need M
            encodeOutCQI            BOOLEAN OPTIONAL, -- Need M
            ...
        },
    }
}
```

In another embodiment, a BS can configure a UE to train AI/ML-based codebooks via RRC configuration. Table 17 is an example of modifying an IE PDSCH-ServingCellConfig to configure training of AI/ML-based codebooks. For PDSCH-ServingCellConfig, NumInpCSI (corresponding to the number of past CSI instances that should be processed by an AI/ML-based codebook) and NumOutCSI (corresponding to the number of present/future CSI instances that should be output by an AI/ML-based codebook) can include trained values for other UEs that have trained an AI-based codebook. These trained values can assist this UE in training an AI/ML-based codebook. The information in NumInpCSI and NumOutCSI can be tagged with the ID for the corresponding codebook, e.g., the ID of the corresponding CSI-ResourceConfig, the ID of the corresponding CORESET pool, etc.

TABLE 17

```
PDSCH-ServingCellConfig ::= SEQUENCE {
   codebookType   CHOICE {
      ...
      pdsch-MultTimeMlCodebook   SEQUENCE {
         NumInpCSI                  SEQUENCE (SIZE (1..numUEs)) of INTEGER
(1..maxNumInpCSI)
         NumOutCSI                  SEQUENCE (SIZE (1..numUEs)) of INTEGER
(1..maxNumOutCSI)
         ...
      },
   }
}
```

In one embodiment, a new MAC CE can be defined for the AI/ML-based CSI fallback request. This MAC CE can be identified by a MAC subheader with a logical channel ID that can be specified in Table 6.2.1-2 in [3]. This MAC CE can have a variable size and consist of the following fields:

AI-based CB Fallback: This field can include one or more of the following information:

AI/ML-based codebook type (where this codebook does not generate/report multi-time CSI feedback)

Conventional codebook sub-type, e.g., an AI/ML-based component of a conventional codebook (where this component does not generate/report multi-time CSI feedback)

For example, if one AI/ML-based codebook has been configured for each CSI-ResourceConfig, then the AI-based CB Fallback field can include the ID of the AI/ML-based codebook for a particular CSI-ResourceConfig. In another example, if one codebook has been configured for each CORESET pool, then the AI-based CB Fallback field can include the ID of the AI/ML-based codebook for a particular CORESET pool.

Figure 31:
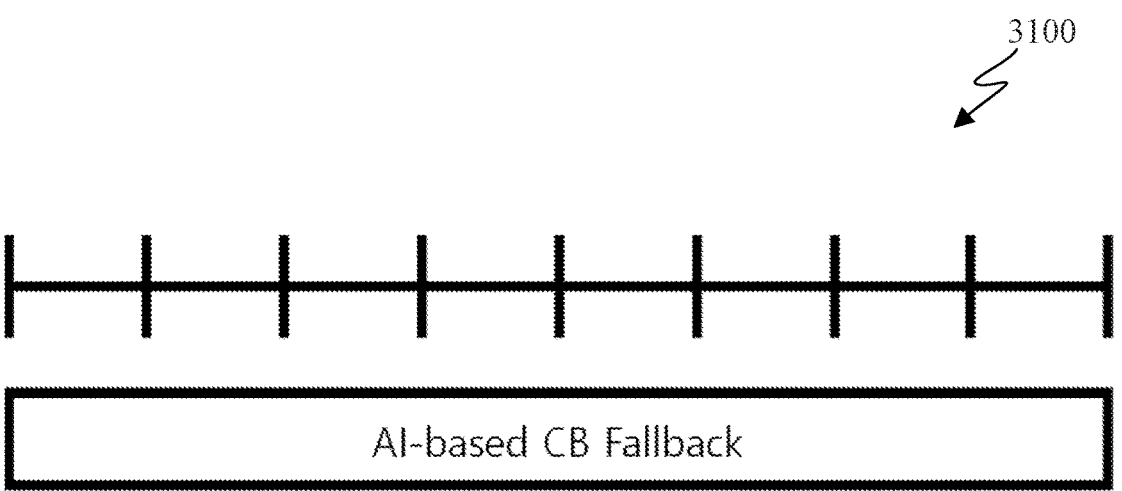
FIG. 31 illustrates an example of a new MAC CE for an AI/ML-based CSI fallback request according to embodiments of the present disclosure.

FIG. 31 illustrates an example 3100 of a new MAC CE for an AI/ML-based CSI fallback request according to embodiments of the present disclosure. The embodiment of the example 3100 of a new MAC CE for an AI/ML-based CSI fallback request illustrated in FIG. 31 is for illustration only. FIG. 31 does not limit the scope of this disclosure to any particular implementation of the example 3100 of a new MAC CE for an AI/ML-based CSI fallback request.

FIG. 31 illustrates an example of a new MAC CE for the AI/ML-based CSI fallback request, where the AI-based CB Fallback field has a length of 8 bits.

In another example, a new MAC CE can be defined for a request to directly fall back to a conventional codebook (bypassing an AI/ML-based codebook).

Figure 32:
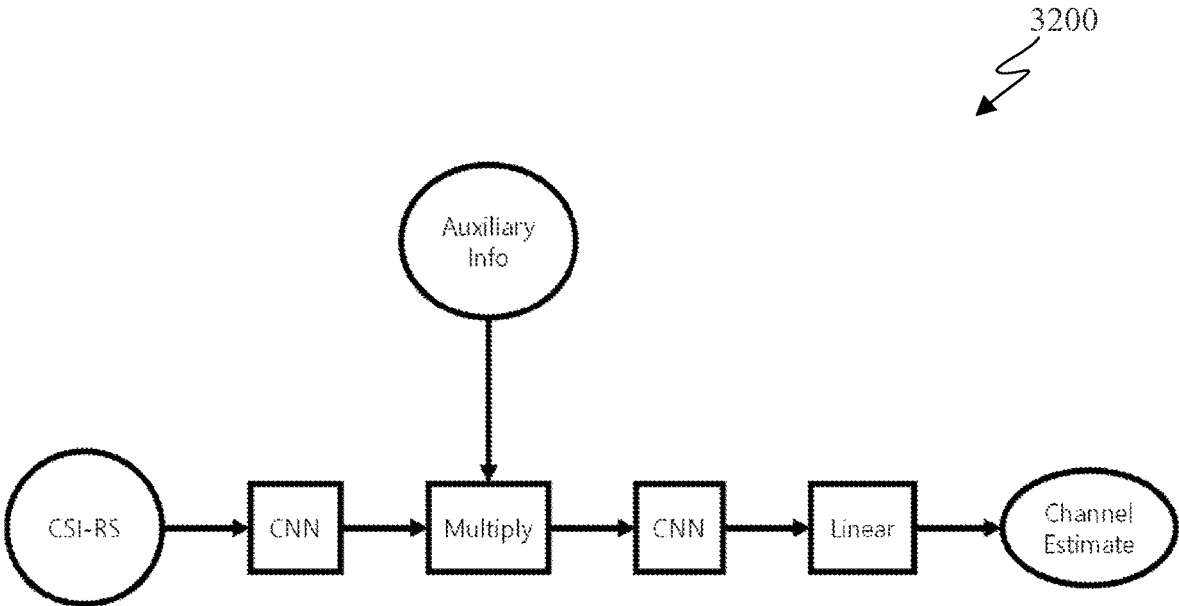
FIG. 32 illustrates an example of an AI/ML model architecture to support a subtype of a conventional codebook according to embodiments of the present disclosure.

FIG. 32 illustrates an example 3200 of an AI/ML model architecture to support a subtype of a conventional codebook according to embodiments of the present disclosure. The embodiment of the example 3200 of an AI/ML model architecture to support a subtype of a conventional codebook illustrated in FIG. 32 is for illustration only. FIG. 32 does not limit the scope of this disclosure to any particular implementation of the example 3200 of an AI/ML model architecture to support a subtype of a conventional codebook.

FIG. 32 illustrates an example of an AI/ML model architecture that can support training/inference of a subtype of a conventional codebook (which can generate/report multi-time CSI feedback). A standard CNN can be augmented in this example with auxiliary information; examples of auxiliary information are included below.

In each slot, the full two-dimensional (number of Rx dimensions by number of Tx dimensions) channel over all subcarriers and OFDM symbols is provided as input to this AI/ML model architecture, where all REs that do not contain CSI-RS are filled with zeros. Examples of inputs to an AI/ML model that can support training/inference of a subtype of a conventional codebook include:

Full two-dimensional received channel over all subcarriers and OFDM symbols for one or more slots All REs that do not contain CSI-RS are filled with zeros If this input contains CSI for more than one slot, then temporal-domain compression is supported Ground truth of full two-dimensional channel over all subcarriers and OFDM symbols for one or more slots For example, this can be obtained via ideal channel estimation In another example, this can be obtained via a realistic channel estimation method (e.g., LS, LMMSE)

This can be a training label

Auxiliary information

UE speed

UE acceleration/deceleration

UE trajectory

UE location

Coherence time

Coherence bandwidth

Delay spread

Doppler spread

Block error rate

Throughput

Examples of outputs from an AI/ML model that can support training/inference of a subtype of a conventional codebook include:

Full two-dimensional estimated channel over all subcarriers and OFDM symbols for one or more slots If at least one of these slots occurs after the current slot, then channel prediction is supported Parameters for a subtype of a conventional codebook These parameters can be determined from the "Linear" layer in the architecture in FIG. 14

SD basis type (e.g., orthogonal DFT or non-orthogonal DFT, oversampling/rotation factor of DFT basis, DCT, Eigen/SVD-basis)

FD basis type (e.g., orthogonal DFT or non-orthogonal DFT, oversampling/rotation factor of DFT basis, DCT, Eigen/SVD-basis)

DD basis type (e.g., orthogonal DFT or non-orthogonal DFT, oversampling/rotation factor of DFT basis, DCT, Eigen/SVD-basis)

Number of SD beams or basis vectors

Number of FD beams or basis vectors

Number of TD or DD beams or basis vectors

Whether separate SD/FD/TD/DD basis or joint basis across 2 or 3 of (SD, FD, TD/DD).

Number of nonzero coefficients

Size of PSK alphabet for coefficient phase

Resolution or size (number of bits) of coefficient amplitude codebook

Number of layers (rank value) or max number of layers (or max rank value)

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
    transmit capability information indicating a capability of the UE to support a machine learning (ML) based parameter configuration associated with channel state information (CSI) reports,
    receive configuration information that indicates parameters for the ML based parameter configuration associated with the CSI reports, and
    receive CSI reference signals (RSS); and
a processor operably coupled to the transceiver, the processor configured to:
    measure the CSI-RSs,
    determine, based on the configuration information, the measured CSI-RSs, and information related to localized observations of channel statistics in one or more domains, configuration parameters in the one or more domains for the CSI reports, and
    determine, based on the configuration parameters in the one or more domains, a CSI report,
    wherein the transceiver is configured to transmit the CSI report;
    wherein the parameters include at least one of (i) a resource utilization threshold, (ii) a channel similarity threshold, and (iii) a channel similarity metric;
    wherein, when the parameters include the resource utilization threshold:
        when a resource utilization level is equal to or higher than the resource utilization threshold, the processor is further configured to determine the CSI report based on a first method, and
        when the resource utilization level is lower than the resource utilization threshold, the processor is further configured to determine the CSI report based on a second method;

wherein, when the parameters include at least one of the channel similarity threshold and the channel similarity metric:
    the processor is further configured to determine, based on the channel similarity metric, a channel similarity value,
    when the channel similarity value is equal to or higher than the channel similarity threshold, the processor is further configured to determine the CSI report based on the first method, and
    when the channel similarity value is lower than the channel similarity threshold, the processor is further configured to determine the CSI report based on the second method; and
wherein the first method is a non-ML-based method and the second method is a ML-based method.

2. The UE of claim 1, wherein:
the one or more domains include a spatial domain or a frequency domain,
the parameters include a command to indicate a number of spatial-domain vectors or a number of frequency-domain vectors associated with the CSI report,
the processor is further configured to determine the number of spatial-domain vectors or the number of frequency-domain vectors, and
the CSI report includes an indication of the number of spatial-domain vectors or the number of frequency-domain vectors.

3. The UE of claim 1, wherein:
the parameters include a command to indicate a number of non-zero coefficients or a size of a phase codebook associated with spatial-domain vectors or frequency-domain vectors,
the processor is further configured to determine the number of non-zero coefficients or the size of the phase codebook, and
the CSI report includes an indication of the number of nonzero coefficients or the size of the phase codebook.

4. The UE of claim 1, wherein:
the parameters include a command to indicate a size of a port selection codebook or a restriction for rank indication,
the processor is further configured to determine the size of the port selection codebook or the restriction for rank indication, and
the CSI report includes an indication of the size of the port selection codebook or the restriction for rank indication.

5. The UE of claim 1, wherein:
the parameters include a command to recommend a bitmap for non-zero coefficients associated with spatial-domain vectors or frequency-domain vectors,
the processor is further configured to determine the recommended bitmap for the non-zero coefficients, and
the CSI report includes an indication of the recommended bitmap for the non-zero coefficients.

6. The UE of claim 1, wherein:
the parameters include a command to recommend a spatial-domain, frequency-domain, or time-domain basis associated with the CSI report,
the processor is further configured to determine the recommended spatial-domain, frequency-domain, or time-domain basis associated with the CSI report, and
the transceiver is further configured to report the recommended spatial-domain, frequency-domain, or time-domain basis.

7. The UE of claim 1, wherein:

the parameters include a command for the UE to recommend a configuration type, the recommended configuration type includes aperiodic, semi-persistent, or periodic, the processor is further configured to determine the recommended configuration type, the transceiver is further configured to report the recommended configuration type, and the processor is further configured to determine, based on the recommended configuration type and the configuration parameters, the CSI report.

8. A base station (BS), comprising:

a transceiver configured to:

receive capability information indicating a capability of a user equipment (UE) to support a machine learning (ML) based parameter configuration associated with channel state information (CSI) reports, transmit configuration information that indicates parameters for the ML based parameter configuration associated with the CSI reports, transmit CSI reference signals (RSs), and receive the CSI report associated with configuration parameters in one or more domains, the configuration parameters in the one or more domains associated with the configuration information, the CSI-RSs, and information related to localized observations of channel statistics in the one or more domains, wherein the parameters include at least one of (i) a resource utilization threshold, (ii) a channel similarity threshold, and (iii) a channel similarity metric;

wherein, when the parameters include the resource utilization threshold:

when a resource utilization level is equal to or higher than the resource utilization threshold, the CSI report is based on a first method, and when the resource utilization level is lower than the resource utilization threshold, the CSI report is based on a second method;

wherein, when the parameters include at least one of the channel similarity threshold and the channel similarity metric:

a channel similarity value is determined based on the channel similarity metric, when a channel similarity value is equal to or higher than the channel similarity threshold, the CSI report is based on the first method, and when the channel similarity value is lower than the channel similarity threshold, the CSI report is based on the second method; and wherein the first method is a non-ML-based method and the second method is a ML-based method.

9. The BS of claim 8, wherein:

the one or more domains include a spatial domain or a frequency domain, the parameters include a command to indicate a number of spatial-domain vectors or a number of frequency-domain vectors associated with the CSI report, and the CSI report includes an indication of the number of spatial-domain vectors or the number of frequency-domain vectors.

10. The BS of claim 8, wherein:

the parameters include a command to indicate a number of non-zero coefficients or a size of a phase codebook associated with spatial-domain vectors or frequency-domain vectors, and the CSI report includes an indication of the number of nonzero coefficients or the size of the phase codebook.

11. The BS of claim 8, wherein:

the parameters include a command to indicate a size of a port selection codebook or a restriction for rank indication, and the CSI report includes an indication of the size of the port selection codebook or the restriction for rank indication.

12. The BS of claim 8, wherein:

the parameters include a command to recommend a bitmap for non-zero coefficients associated with spatial-domain vectors or frequency-domain vectors, and the CSI report includes an indication of the recommended bitmap for the non-zero coefficients.

13. The BS of claim 8, wherein:

the parameters include a command to recommend a spatial-domain, frequency-domain, or time-domain basis associated with the CSI report, and the transceiver is further configured to receive a report on the recommended spatial-domain, frequency-domain, or time-domain basis.

14. The BS of claim 8, wherein:

the parameters include a command to recommend a configuration type, the recommended configuration type includes aperiodic, semi-persistent, or periodic, the transceiver is further configured to a report on the recommended configuration type, and the CSI report is associated with the recommended configuration type and the configuration parameters.

15. A method performed by a user equipment (UE), the method comprising:

transmitting capability information indicating a capability of the UE to support a machine learning (ML) based parameter configuration associated with channel state information (CSI) reports;

receiving configuration information that indicates parameters for the ML based parameter configuration associated with the CSI reports;

receiving CSI reference signals (RSS);

measuring the CSI-RSs;

determining, based on the configuration information, the measured CSI-RSs, and information related to localized observations of channel statistics in one or more domains, configuration parameters in the one or more domains for the CSI reports;

determining, based on the configuration parameters in the one or more domains, a CSI report; and transmitting the CSI report, wherein the parameters include at least one of (i) a resource utilization threshold, (ii) a channel similarity threshold, and (iii) a channel similarity metric;

wherein, when the parameters include the resource utilization threshold:

when a resource utilization level is equal to or higher than the resource utilization threshold, the method further comprises determining the CSI report based on a first method, and when the resource utilization level is lower than the resource utilization threshold, the method further comprises determining the CSI report based on a second method;

wherein, when the parameters include at least one of the channel similarity threshold and the channel similarity metric:

the method further comprises determining, based on the channel similarity metric, a channel similarity value, when the channel similarity value is equal to or higher than the channel similarity threshold, the method further comprises determining the CSI report based on the first method, and when the channel similarity value is lower than the channel similarity threshold, the method further comprises determining the CSI report based on the second method; and wherein the first method is a non-ML-based method and the second method is a ML-based method.

16. The method of claim 15, wherein:

the one or more domains include a spatial domain or a frequency domain, the parameters include a command to indicate a number of spatial-domain vectors or a number of frequency-domain vectors associated with the CSI report, the method further comprises determining the number of spatial-domain vectors or the number of frequency-domain vectors, and the CSI report includes an indication of the number of spatial-domain vectors or the number of frequency-domain vectors.

17. The method of claim 15, wherein:

the parameters include a command to indicate a number of non-zero coefficients or a size of a phase codebook associated with spatial-domain vectors or frequency-domain vectors, the method further comprises determining the number of non-zero coefficients or the size of the phase codebook, and the CSI report includes an indication of the number of nonzero coefficients or the size of the phase codebook.

18. The method of claim 15, wherein:

the parameters include a command to indicate a size of a port selection codebook or a restriction for rank indication, the method further comprises determining the size of the port selection codebook or the restriction for rank indication, and the CSI report includes an indication of the size of the port selection codebook or the restriction for rank indication.

* * * * *